US012570469B2

(12) United States Patent
Michal et al.

(10) Patent No.: US 12,570,469 B2
(45) Date of Patent: Mar. 10, 2026

(54) SYSTEMS AND METHODS FOR PROVIDING MOBILE SHUTTLE LOAD HANDLING SYSTEMS

(71) Applicant: Berkshire Grey Operating Company, Inc., Bedford, MA (US)

(72) Inventors: Joseph Corey Michal, Beverly, MA (US); William Farmer, Bolton, MA (US); Guoming Alex Long, Wexford, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 439 days.

(21) Appl. No.: 18/220,398

(22) Filed: Jul. 11, 2023

(65) Prior Publication Data

US 2024/0010428 A1    Jan. 11, 2024

Related U.S. Application Data

(60) Provisional application No. 63/463,131, filed on May 1, 2023, provisional application No. 63/462,434, filed (Continued)

(51) Int. Cl.
*B65G 47/82* (2006.01)
*B65G 1/04* (2006.01)
(Continued)

(52) U.S. Cl.
CPC ........... *B65G 1/0492* (2013.01); *B65G 1/065* (2013.01); *B65G 1/1378* (2013.01); *B65G 47/82* (2013.01); *B65G 2814/0352* (2013.01)

(58) Field of Classification Search
None
See application file for complete search history.

(56) References Cited

U.S. PATENT DOCUMENTS

| | | | |
|---|---|---|---|
| 1,030,320 A | 6/1912 | Morgan | |
| 4,508,484 A | 4/1985 | Heiz | |

(Continued)

FOREIGN PATENT DOCUMENTS

| | | | |
|---|---|---|---|
| CN | 102725213 B | 8/2016 | |
| CN | 105246802 B | 5/2018 | |

(Continued)

OTHER PUBLICATIONS

Madni et al., Solid-state six degree of freedom, motion sensor for field robotic applications, 1998, IEEE, p. 1389-1398 (Year: 1998).*

(Continued)

*Primary Examiner* — Mcdieunel Marc
(74) *Attorney, Agent, or Firm* — Gesmer Updegrove LLP

(57) ABSTRACT

An object processing system including at least one automated mobile shuttle is disclosed that includes a mobile chassis unit for moving the automated mobile shuttle in a first direction, a payload for supporting at least one object thereon, said payload including a plurality of tines, and a payload translation system for translating the payload toward a receiving surface in at least a second direction that is orthogonal with respect to the first direction, the payload translation system providing that the plurality of tines are adapted to engage recessed areas within the receiving surface.

31 Claims, 37 Drawing Sheets

Related U.S. Application Data on Apr. 27, 2023, provisional application No. 63/388,169, filed on Jul. 11, 2022.

(51) Int. Cl.
B65G 1/06 (2006.01)
B65G 1/137 (2006.01)

(56) References Cited

U.S. PATENT DOCUMENTS

| | | | |
|---|---|---|---|
| 5,352,081 A | 10/1994 | Tanaka | |
| 5,525,884 A | 6/1996 | Sugiura et al. | |
| 8,276,740 B2 | 10/2012 | Hayduchok et al. | |
| 8,446,811 B2 * | 5/2013 | Yue | H04L 1/0071 |
| | | | 370/476 |
| 8,943,500 B1 * | 1/2015 | Havemose | G06F 9/455 |
| | | | 718/1 |
| 9,111,251 B1 | 8/2015 | Brazeau | |
| 9,602,195 B2 * | 3/2017 | Hashiguchi | H04B 10/032 |
| 10,048,697 B1 | 8/2018 | Theobald | |
| 10,259,649 B2 | 4/2019 | Raizer | |
| 10,294,026 B1 | 5/2019 | Lee et al. | |
| 10,518,974 B2 | 12/2019 | Lee et al. | |
| 10,576,621 B2 | 3/2020 | Wagner et al. | |
| 10,577,180 B1 | 3/2020 | Mehta et al. | |
| 10,611,021 B2 | 4/2020 | Wagner et al. | |
| 10,850,922 B1 * | 12/2020 | Alspaugh | B65G 15/14 |
| 10,913,612 B2 | 2/2021 | Wagner et al. | |
| 11,084,660 B2 | 8/2021 | Wagner et al. | |
| 11,117,760 B2 | 9/2021 | Wagner et al. | |
| 11,325,781 B2 | 5/2022 | Zhu et al. | |
| 11,338,996 B2 | 5/2022 | Zhu et al. | |
| 11,358,175 B2 | 6/2022 | Hayduchok et al. | |
| 11,402,831 B2 | 8/2022 | Wagner et al. | |
| 11,407,587 B1 * | 8/2022 | Dwivedi | B65G 1/0435 |
| 11,618,364 B1 * | 4/2023 | Mohammed | B62B 3/002 |
| | | | 298/29 |
| 11,661,275 B2 | 5/2023 | Wagner et al. | |
| 11,780,676 B2 | 10/2023 | Stevens et al. | |
| 11,787,633 B2 | 10/2023 | Blotnik et al. | |
| 11,820,601 B2 | 11/2023 | Valinsky et al. | |
| 11,827,452 B2 | 11/2023 | Stevens et al. | |
| 12,017,855 B2 | 6/2024 | Stevens et al. | |
| 2006/0045672 A1 | 3/2006 | Maynard et al. | |
| 2011/0014021 A1 | 1/2011 | Reid et al. | |
| 2011/0061995 A1 | 3/2011 | Huff et al. | |
| 2011/0308918 A1 | 12/2011 | Schwardt et al. | |
| 2012/0185082 A1 | 7/2012 | Toebes et al. | |
| 2012/0189416 A1 | 7/2012 | Toebes et al. | |
| 2012/0195724 A1 | 8/2012 | Toebes et al. | |
| 2014/0031972 A1 | 1/2014 | DeWitt et al. | |
| 2014/0100999 A1 | 4/2014 | Mountz et al. | |
| 2014/0308098 A1 | 10/2014 | Lert et al. | |
| 2016/0137417 A1 | 5/2016 | Winkler | |
| 2016/0221757 A1 | 8/2016 | DeWitt et al. | |
| 2016/0355337 A1 | 12/2016 | Lert et al. | |
| 2017/0267452 A1 | 9/2017 | Goren et al. | |
| 2017/0305668 A1 | 10/2017 | Bestic et al. | |
| 2018/0037410 A1 | 2/2018 | DeWitt | |
| 2018/0148259 A1 | 5/2018 | Gravelle et al. | |
| 2018/0251302 A1 | 9/2018 | Valinsky et al. | |
| 2018/0265291 A1 | 9/2018 | Wagner et al. | |
| 2018/0290830 A1 | 10/2018 | Valinsky et al. | |
| 2018/0305122 A1 | 10/2018 | Moulin et al. | |
| 2019/0009985 A1 | 1/2019 | Lert, Jr. et al. | |
| 2019/0062051 A1 | 2/2019 | Warhurst | |
| 2019/0129371 A1 | 5/2019 | Wagner et al. | |
| 2019/0210803 A1 | 7/2019 | Sullivan et al. | |
| 2019/0256298 A1 | 8/2019 | Jarr et al. | |
| 2019/0337723 A1 * | 11/2019 | Wagner | B65G 43/00 |
| 2020/0087067 A1 | 3/2020 | Fosnight et al. | |
| 2020/0122923 A1 | 4/2020 | Moulin et al. | |
| 2020/0180863 A1 | 6/2020 | Moulin et al. | |
| 2020/0216298 A1 | 7/2020 | Gravelle et al. | |
| 2020/0399061 A1 | 12/2020 | Warhurst | |
| 2021/0039881 A1 | 2/2021 | Zhu et al. | |
| 2021/0039887 A1 | 2/2021 | Zhu et al. | |
| 2021/0047112 A1 | 2/2021 | Stevens et al. | |
| 2021/0090001 A1 | 3/2021 | Glass et al. | |
| 2021/0229271 A1 | 7/2021 | Fosnight et al. | |
| 2022/0055843 A1 | 2/2022 | Bair et al. | |
| 2022/0324648 A1 | 10/2022 | Valinsky et al. | |
| 2023/0050980 A1 | 2/2023 | Zahdeh et al. | |
| 2024/0010429 A1 * | 1/2024 | Michal | B65G 1/065 |
| 2024/0270494 A1 | 8/2024 | Long et al. | |
| 2024/0270495 A1 | 8/2024 | Long et al. | |

FOREIGN PATENT DOCUMENTS

| | | |
|---|---|---|
| CN | 210162598 U | 3/2020 |
| CN | 115158950 A | 10/2022 |
| CN | 217866247 U | 11/2022 |
| DE | 102008039764 A1 | 5/2010 |
| DE | 102011083095 A1 | 3/2013 |
| DE | 102020111008 A1 | 10/2021 |
| EP | 0737630 A1 | 10/1996 |
| EP | 3693297 B1 | 9/2021 |
| JP | S49110481 U | 9/1974 |
| JP | S53124872 A | 10/1978 |
| JP | S53134872 A | 11/1978 |
| JP | H07117815 A | 5/1995 |
| JP | 3924520 B2 | 6/2007 |
| JP | S924520 B2 | 6/2007 |
| JP | 7117815 B2 | 8/2022 |
| TW | I627113 B | 6/2018 |
| WO | 2016026910 A1 | 2/2016 |
| WO | 2019201764 A2 | 10/2019 |
| WO | 2022091111 A1 | 5/2022 |
| WO | 2024015343 A1 | 1/2024 |
| WO | 2024015347 A1 | 1/2024 |
| WO | 2024226936 A1 | 10/2024 |
| WO | 2024226964 A2 | 10/2024 |

OTHER PUBLICATIONS

Stieber et al., Robotic systems for the International Space Station, 1997, IEEE, p. 3068-3073 (Year: 1997).*

Wilde et al., Orion: A simulation environment for spacecraft formation flight, capture, and orbital robotics, 2016, IEEE, p. 1-14 (Year: 2016).*

Barrett et al., Autonomous Battery Exchange of UAVs with a Mobile Ground Base, 2018, IEEE, p. 699-705 (Year: 2018).*

Annex to Form PCT/ISA/206, Communication Relating to the Results of the Partial International Search issued by the International Searching Authority, the European Patente Office, in related International Application No. PCT/US2024/026496 on Jul. 25, 2024, 3 pages.

International Preliminary Report on Patentability issued by the International Bureau of WIPO in related International application No. PCT/US2023/027348 on Dec. 18, 2024, 11 pages.

International Preliminary Report on Patentability issued by the International Bureau of WIPO in related International application No. PCT/US2023/027354 on Dec. 18, 2024, 12 pages.

Notification of Transmittal of the International Search Report and the Written Opinion of the International Searching Authority along with the International Search Report and the Written Opinion of the International Searching Authority and the International Search Report and the Written Opinion of the International Searching Authority (the European Patent Office) issued in related International Application No. PCT/US2024/026458 on Jul. 26, 2024, 14 pages.

Notification of Transmittal of the International Search Report and the Written Opinion of the International Searching Authority and the International Search Report and the Written Opinion of the International Searching Authority (the European Patent Office) issued in related International Application No. PCT/US2024/026496 on Feb. 4, 2025, 22 pages.

Annex to Form Form PCT/ISA/206, Communication Relating to the Results of the Partial International Search issued by the European

(56) References Cited

OTHER PUBLICATIONS

Patent Office, as the International Searching Authority, in related International Application No. PCT/US2023/027348 on Oct. 19, 2023, 2 pages.

Annex to Form Form PCT/ISA/206, Communication Relating to the Results of the Partial International Search issued by the European Patent Office, as the International Searching Authority, in related International Application No. PCT/US2023/027354 on Oct. 19, 2023, 2 pages.

Notification of Transmittal of the International Search Report and the Written Opinion of the International Searching Authority and the International Search Report and the Written Opinion of the International Searching Authority (the European Patent Office) issued in related International Application No. PCT/US2023/027348 on Dec. 12, 2023, 19 pages.

Notification of Transmittal of the International Search Report and the Written Opinion of the International Searching Authority and the International Search Report and the Written Opinion of the International Searching Authority (the European Patent Office) issued in related International Application No. PCT/US2023/027354 on Dec. 11, 2023, 21 pages.

* cited by examiner

SYSTEMS AND METHODS FOR PROVIDING MOBILE SHUTTLE LOAD HANDLING SYSTEMS

PRIORITY

The present application claims priority to U.S. Provisional Patent Application No. 63/388,169 filed Jul. 11, 2022, U.S. Provisional Patent Application No. 63/462,434 filed Apr. 27, 2023, and U.S. Provisional Patent Application No. 63/463,131 filed May 1, 2023, the disclosures of each of which is hereby incorporated by reference in its entirety.

BACKGROUND

The present invention relates to automated storage/retrieval systems (ASRS) and other object processing systems for objects such as items, products, packages and other stock keeping unit (SKU) pieces as well as totes, bins and boxes containing such items, products, packages and SKUs. The present invention relates in particular to ASRS systems that require both long-term and medium-term storage (low throughput to storage ratios) as well as short term storage (high throughput to storage ratios), e.g., where the storage is turned over. Long-term and medium-term storage systems require access to a large number of storage locations, while short term storage systems require fast access to the storage locations.

Certain existing ASRS and other processing systems are limited by the payloads they can reliably store and pick. Reliability is a core requirement as it is commonly the case that a failure requires human intervention within the system, and human intervention has conflicting priorities of speed, safety, cost, and complexity. Failure to achieve extremely low overall system downtime numbers and very short MTTR (Mean Time To Repair) greatly affects local throughput and causes ripple effects in the rest of the system efficiency. The storage and retrieval system is often the primary source of buffering and other system buffers are kept short.

Shuttle-and-lift systems, stacker systems, and tower-bot systems, for example, are becoming common and have many benefits over more traditional crane-based systems in system-level throughput and their tolerance for a single point of failure not limiting large percentages of the system. Certain of these systems also work well with regular bin (or tray)-based storage that allow the payload interfaces to be consistently designed features in the payload acquisition and storage bins. Payload handling in these systems for example, range from controlled-lift with paired-bottom locating features style to engaged-drag style that can pull from larger distances with side engagement pockets (arguably the most common) which is drag using reach behind pull fingers.

Certain of these systems involve reaching behind objects and suggest compatibility with regular rectangular-base cardboard boxes. Applicants have discovered however, that for a variety of reasons such compatibility is not always reliable, sometimes requiring (for reliability reasons) that boxes be presented in bins or totes. Additionally, these existing systems struggle with unboxed loose items that might otherwise be conveyed, such as for example, shrink bundled beverage cases, bags of dog food, cat litter etc., all of which exhibit widely varying size, shape, material characteristics.

There remains a need therefore, for more capable, efficient and economical ASRS and other object processing systems that require accessing a wide range of geometries of objects in both long to medium storage as well as short term storage requiring high turn-over.

SUMMARY

In accordance with an aspect, the invention provides an object processing system including at least one automated mobile shuttle that includes a mobile chassis unit for moving the automated mobile shuttle in a first direction, a payload for supporting at least one object thereon, the payload including a plurality of tines, and a payload translation system for translating the payload toward a receiving surface in at least a second direction that is orthogonal with respect to the first direction, the payload translation system providing that the plurality of tines are adapted to engage recessed areas within the receiving surface.

In accordance with another aspect, the invention provides an object processing system including at least one automated mobile shuttle. The object processing system includes a mobile chassis unit for moving the automated mobile shuttle in at least one direction, a payload for supporting at least one object on a payload surface, said payload surface including a first payload surface portion and a second payload surface portion, and a segmented payload elevation system for independently raising and lowering either the first payload surface portion or the second payload surface portion along a third direction that is orthogonal with respect to the at least one direction.

In accordance with a further aspect, the invention provides a method of handling a payload of an automated mobile shuttle. The method includes providing a mobile chassis unit for moving the automated mobile shuttle in at least one horizontal direction, supporting at least one object on a payload surface of a payload, the payload surface including at least one tine, moving the payload in a second horizontal direction such that the at least one tine that moves between crests of a corrugated storage shelf of the object processing system, and independently raising and lowering either the first payload surface portion or the second payload surface portion along a third vertical direction.

BRIEF DESCRIPTION OF THE DRAWINGS

The following description may be further understood with reference to the accompanying drawings in which.

Figure 1:
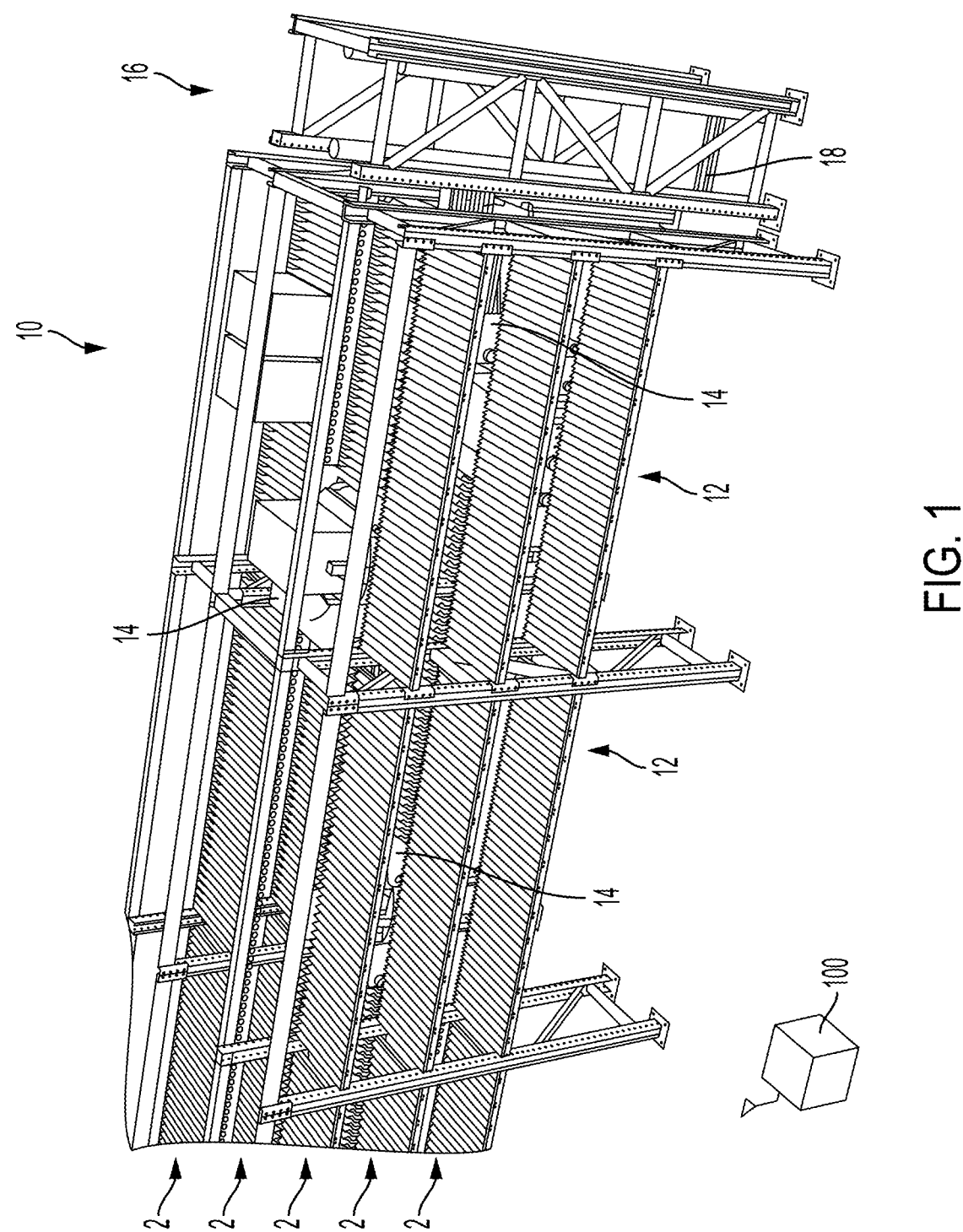
FIG. 1 shows an illustrative diagrammatic view of an object processing system in accordance with an aspect of the present invention that includes a plurality of mobile shuttle units, each associated with a level of a shelving system.

The drawings are shown for illustrative purposes only.

DETAILED DESCRIPTION

The invention provides an automated mobile shuttle for use in an ASRS or other object processing system. In accordance with an aspect, the automated mobile shuttle includes, for example, a mobile base unit for moving the automated mobile shuttle in at least one direction, a payload for supporting at least one object on a payload surface, the payload surface including at least a first payload surface portion and a second payload surface portion, a payload rotation system for rotating the payload about a first axis that is orthogonal with respect to the at least one direction a payload of the automated mobile shuttle, a payload translation system for translating the payload in at least a second direction that is orthogonal with respect to the first axis; and a segmented payload elevation system for raising and lowering either the first payload surface portion or the second payload surface portion along a third direction that is parallel with the first axis. In accordance with an aspect therefore, the system provides four major axes of motion, including drive movement of the carrier, rotation of the payload, extension of the payload and lifting of the payload. The degrees of freedom among the major axes of motion yields flexibility in providing longitudinally heterogenous storage as discussed herein.

The payload handling techniques disclosed here may be used with automated mobile carriers that move about a work environment through a variety of methodologies, including for example, a track-based system, rack and pinion, belt & pully, cable pull, or any number of other methodologies, weighing tradeoffs between speed, accuracy, cost, complexity, etc.

Mobile shuttle position feedback (sometimes referred to as localization) can be achieved by many means familiar to those in the field of mobile robotics, which include but are not limited to measures of odometry, integrated calculation using inertia feedback from measurement units (IMU), unique localization markers (sometimes referred to as fiducials), non-unique localization markers with area markers/ homing positions (e.g., counting pulses from regularly spaced flags), or even fixed point continuous measurement such as time-of-flight laser sensors, or multi-beacon triangulation.

It is further understood that even with mobile shuttles that engage a rack system, the shuttles (including in some cases shuttle-lift-transports) may leave the racks altogether to perform a package exchange or other operation outside the racks. Additionally, the choice of drive should pair with the choice of localization technology as well as the previously mentioned additional mobilities outside the captive-rails embodiment to achieve the overall system goal.

In accordance with various aspects, the system provides versatility of payload handing using a multitude of closely pitched tines that have the ability to interface favorably with almost any package wider than 2× the tine pitch. Moreover, the design can be scaled up or down to accommodate differing environments. For example, the tines may be pitched closer together to handle even small objects or significantly farther apart for consistently large objects. In accordance with an aspect, the smallest objects may be a least 3 inches or 5 inches in its shortest dimension. With this aspect smaller objects would be transportable when grouped into larger carrying units (e.g., in boxes, bins, trays or totes).

In accordance with a further aspect, the invention provides a mobile unit payload that includes a roller tip that shares the load after lift during extraction between the rollers resting on the shelf valleys and the guide or rollers within the shuttle body. The same load sharing occurs during shelf insertion and exchanges with system level induct and discharge devices. This strategy that provides support from two ends is significant with regard the components selection for a given load.

FIG. 1 shows a system 10 that includes a plurality of shelves 12 arranged in two mutually opposing arrays with a plurality of mobile shuttle units 14 therebetween. Each mobile shuttle unit may receive an object at a processing end 16 of the system, move along a row between a plurality of shelving locations, and provide the object to any of the shelves on either side along the row. The mobile shuttle units 14 are also adapted to retrieve objects from the shelves and bring the retrieved objects to the processing end 16 of the system. The system 10 may receive input objects and provide retrieved objects via an elevator platform 18 that moves among the processing ends of each of the rows (an example of which is discussed below with reference to FIG. 35). Operation of the system (and all of the systems disclosed herein) may be provided by one or more computer processing systems 100, 200 in communication with the mobile shuttle units and conveyor systems herein described. The position of the mobile shuttle unit along the shelves may be determined by any of wheel rotation monitoring, shelf markings, Global Positioning Systems, or remote (wireless) signal detection such as visual, infrared, echo-location etc.

Figure 2:
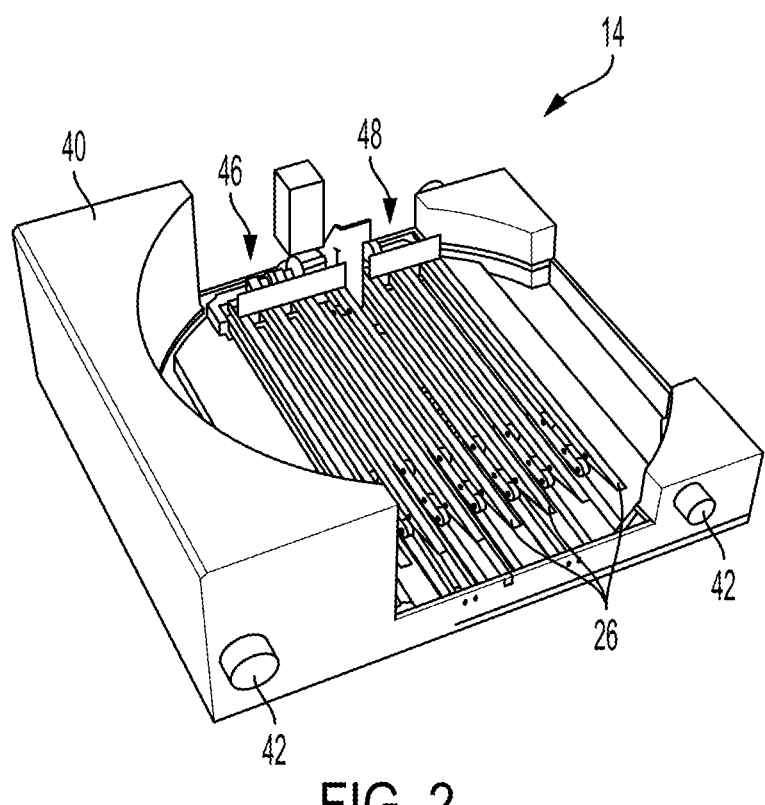
FIG. 2 shows an illustrative diagrammatic elevated side view of a mobile shuttle unit of FIG. 1.
Figure 3:
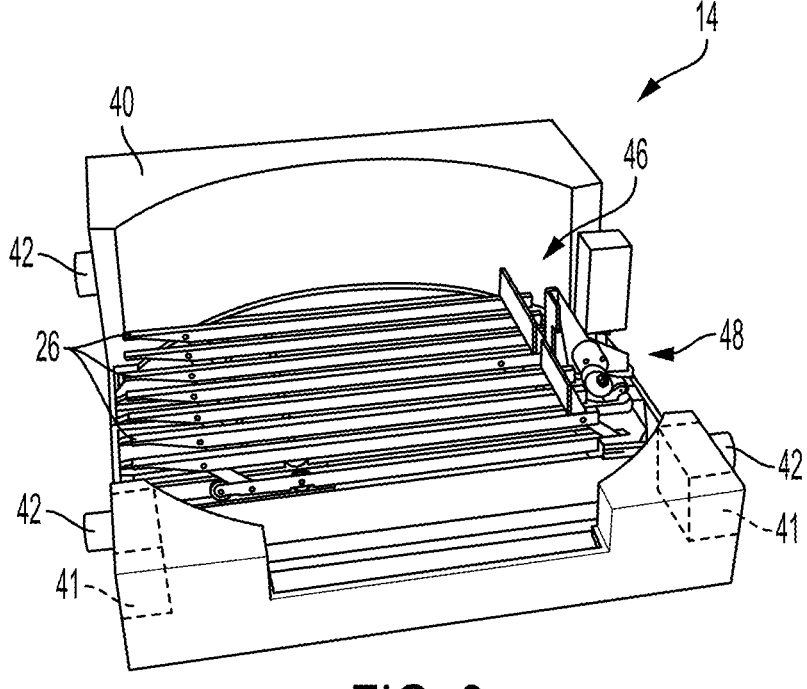
FIG. 3 shows an illustrative diagrammatic elevated end view of the mobile shuttle unit of FIG. 2.
Figure 4:
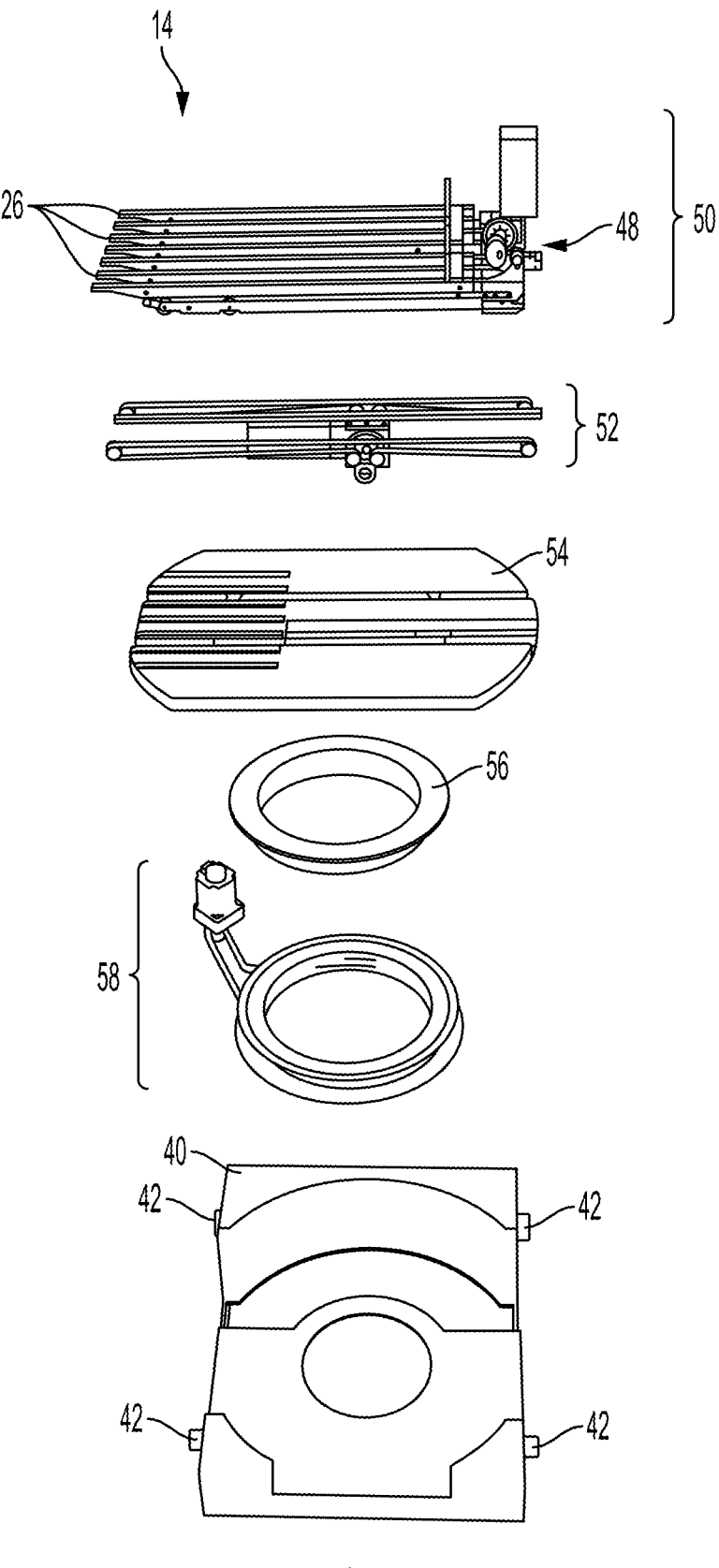
FIG. 4 shows an illustrative diagrammatic exploded view of the mobile shuttle unit of FIG. 2.

With reference to FIGS. 2 and 3, each mobile shuttle unit 14 (in accordance with an aspect of the invention) includes a mobile unit chassis 40 with four wheels 42 (e.g., two of which are powered by motors 41 within the chassis housing) for moving the unit 14 along rails 44 (shown in FIGS. 5-10) that are mounted to the inner sides of the shelves 12. FIG. 2 shows the shuttle carrier 14 from a rear view showing the leading edges of the tines 26, and FIG. 3 shows the shuttle carrier from a front view showing the tines 26 in an elevated position. The position of each mobile shuttle unit along the shelving is monitored by sensor systems on the units 14 and the shelving 12. With further reference to FIG. 4, a payload 50 that includes tines 26 is provided on a translation system 52 for moving the payload with respect to a translation base 54. In particular FIG. 4 shows an exploded view of the shuttle carrier 14 showing the payload 50 that rides along the translation system 52 with respect to the base 54, and rotates via a gear 56 and rotation system 58 with respect to the mobile unit chassis 40. The base 54 includes the attached gear 56 that is driven by the rotation system 58 with respect to the chassis 40. The tines 26 are provided as two sets, each set of which is mounted for elevational movement by independent elevation actuation systems 46, 48 (as discussed in more detail below).

In accordance with certain aspects therefore, the system provides positioning of the shuttle tines 26 such that they longitudinally aligned with valleys in the shelving 12 of the rack system. In accordance with further aspects, the system may separate areas of the racking (aisles, vertical levels, longitudinal bays) by package size and the position is less variable in the longitudinal direction. In these cases the tines must still align but the one for one relationship of tine to valley is not as important where, for example, a subset of the shuttles within the fleet may only see large packages for instance and can have wider spacing of the payload tines and interface at 5× the shelf pitch.

Figure 5:
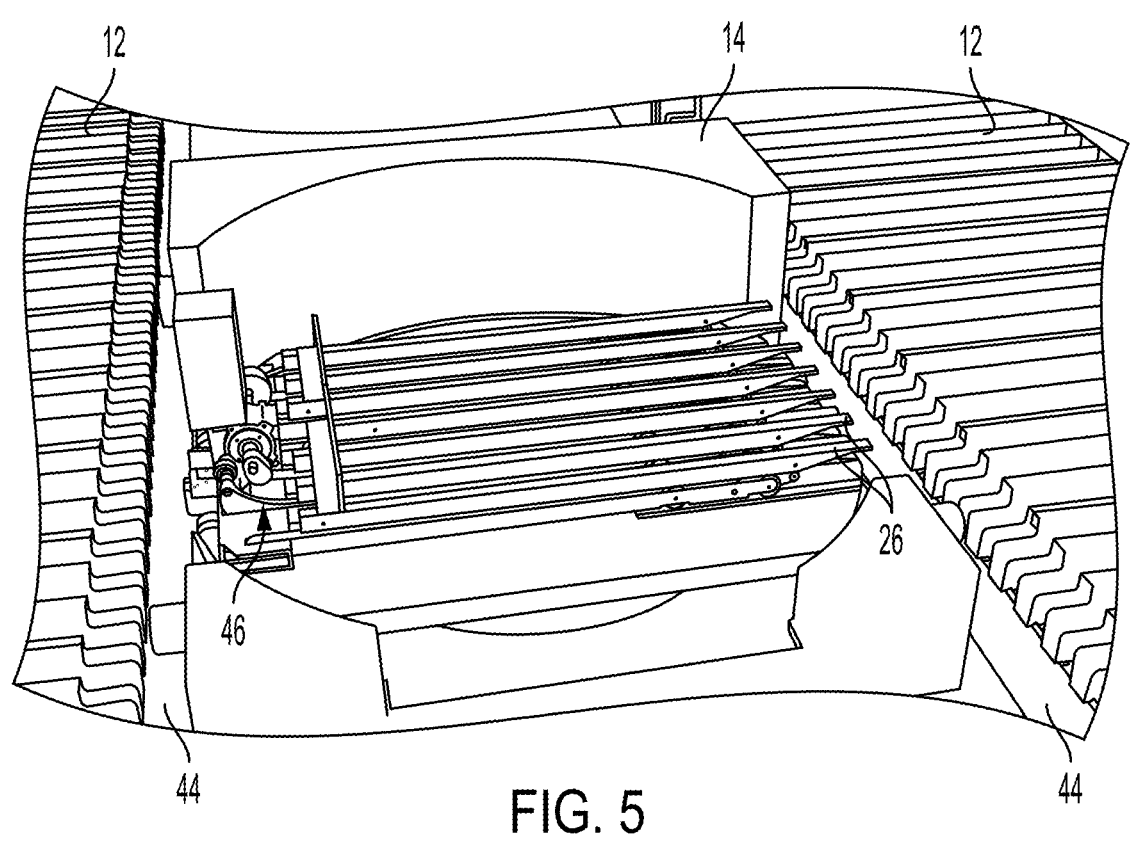
FIG. 5 shows an illustrative diagrammatic elevational view of the mobile shuttle unit of FIG. 2 with the tines in a lowered position.
Figure 6:
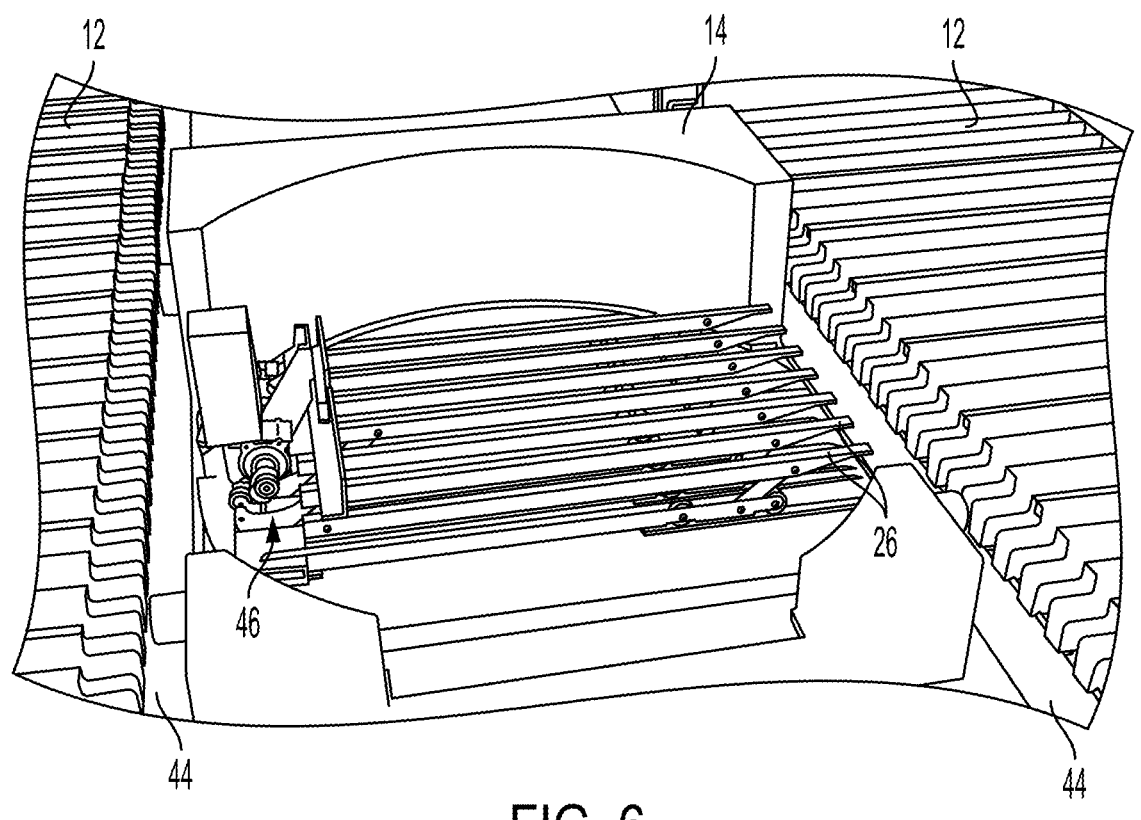
FIG. 6 shows an illustrative diagrammatic elevational view of the mobile shuttle unit of FIG. 2 with the tines in a raised position.
Figure 7:
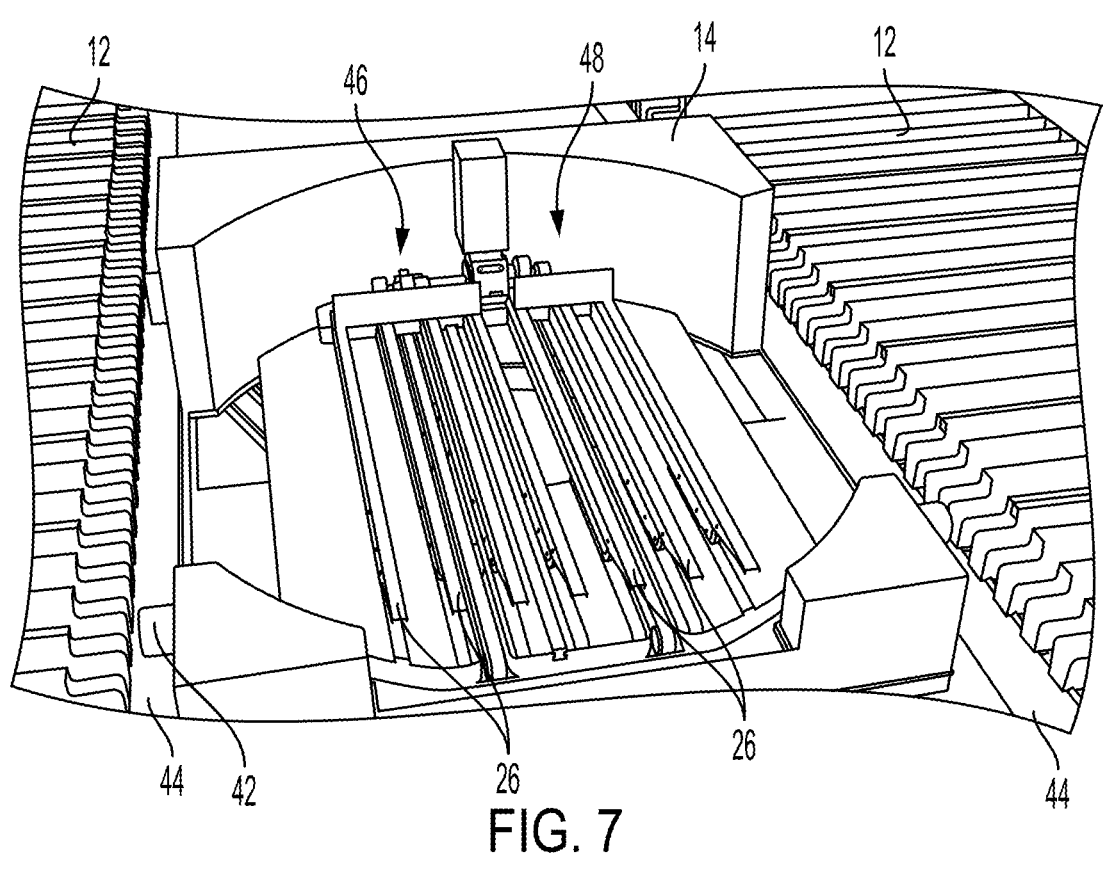
FIG. 7 shows an illustrative diagrammatic elevational view of the mobile shuttle unit of FIG. 6 with the payload rotated ninety degrees.
Figure 8:
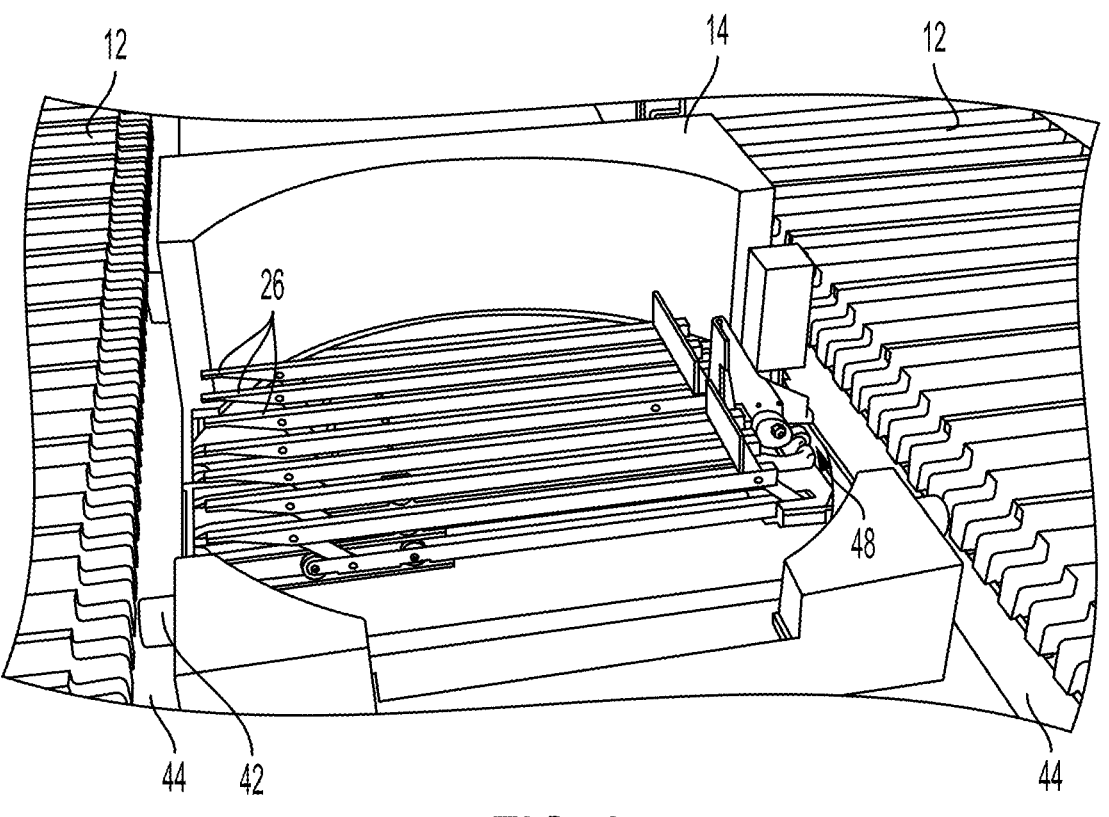
FIG. 8 shows an illustrative diagrammatic elevational view of the mobile shuttle unit of FIG. 6 with the payload rotated one hundred eighty degrees.

FIG. 5 shows the tines 26 in a lowered position and FIG. 6 shows the tines 26 as having been raised, both showing carrier 14 positioned between shelves 12. In the lowered position, the tines 26 are at an elevation below a crest height of the adjacent shelving 12, and in the raised position, the tines 25 are above the crest height of the adjacent shelving 12. The shelving may be provided in a roughly corrugated form, providing alternating crests and valleys. The translation system 52 may be engaged to extend the payload into the corrugated shelf 12 (either above the shelf or interleaved between the crests) to deposit objects onto the shelf 12 or retrieve objects from the shelf 12. FIG. 7 shows the payload rotated 90 degrees by the rotation system 58 (e.g., for loading or distribution as discussed below with reference to FIGS. 33-36), and FIG. 8 shows the payload rotated 180 degrees such that the tines 26 now face an opposing shelf 12.

Figure 9A:
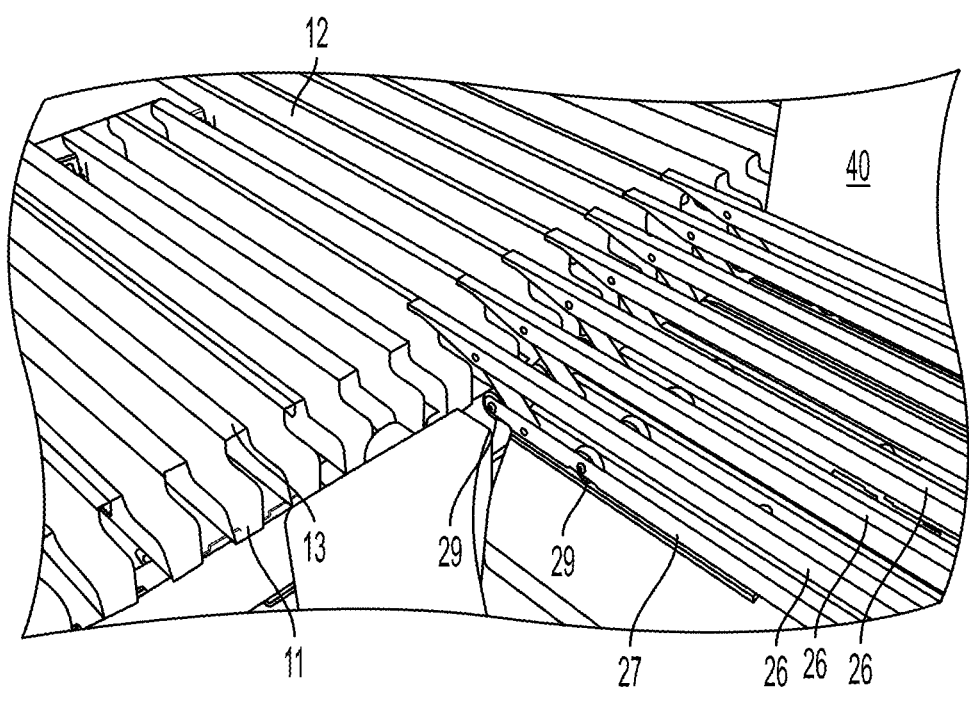
FIGS. 9A and 9B show illustrative diagrammatic enlarged views of the mobile shuttle unit of FIG. 2 with the tines lowered (FIG. 9A) and with the tines raised (FIG. 9B)
Figure 9B:
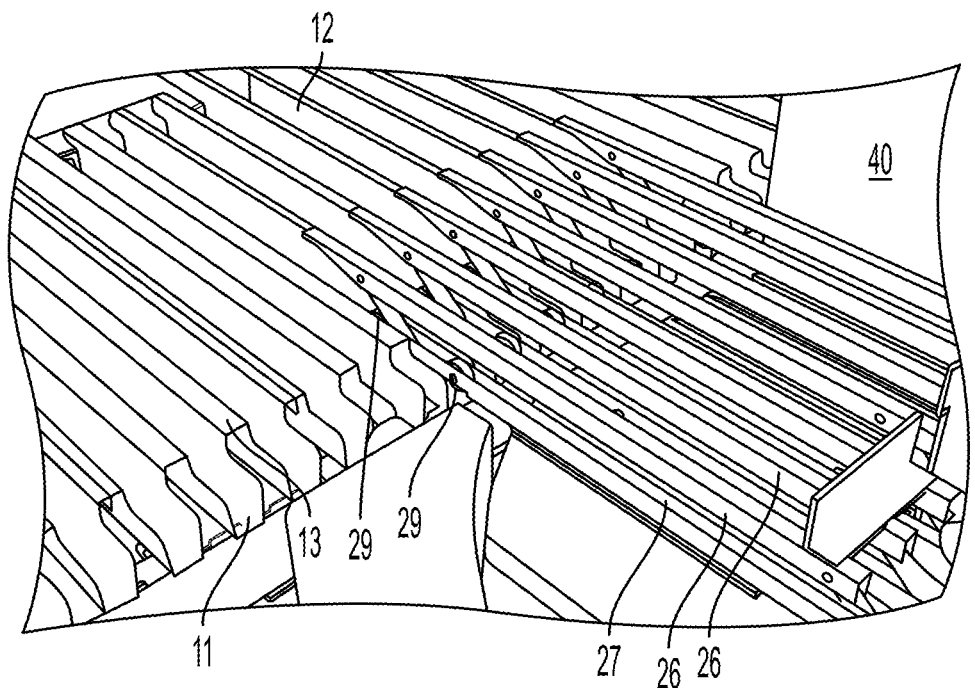
Figures 10, 11:
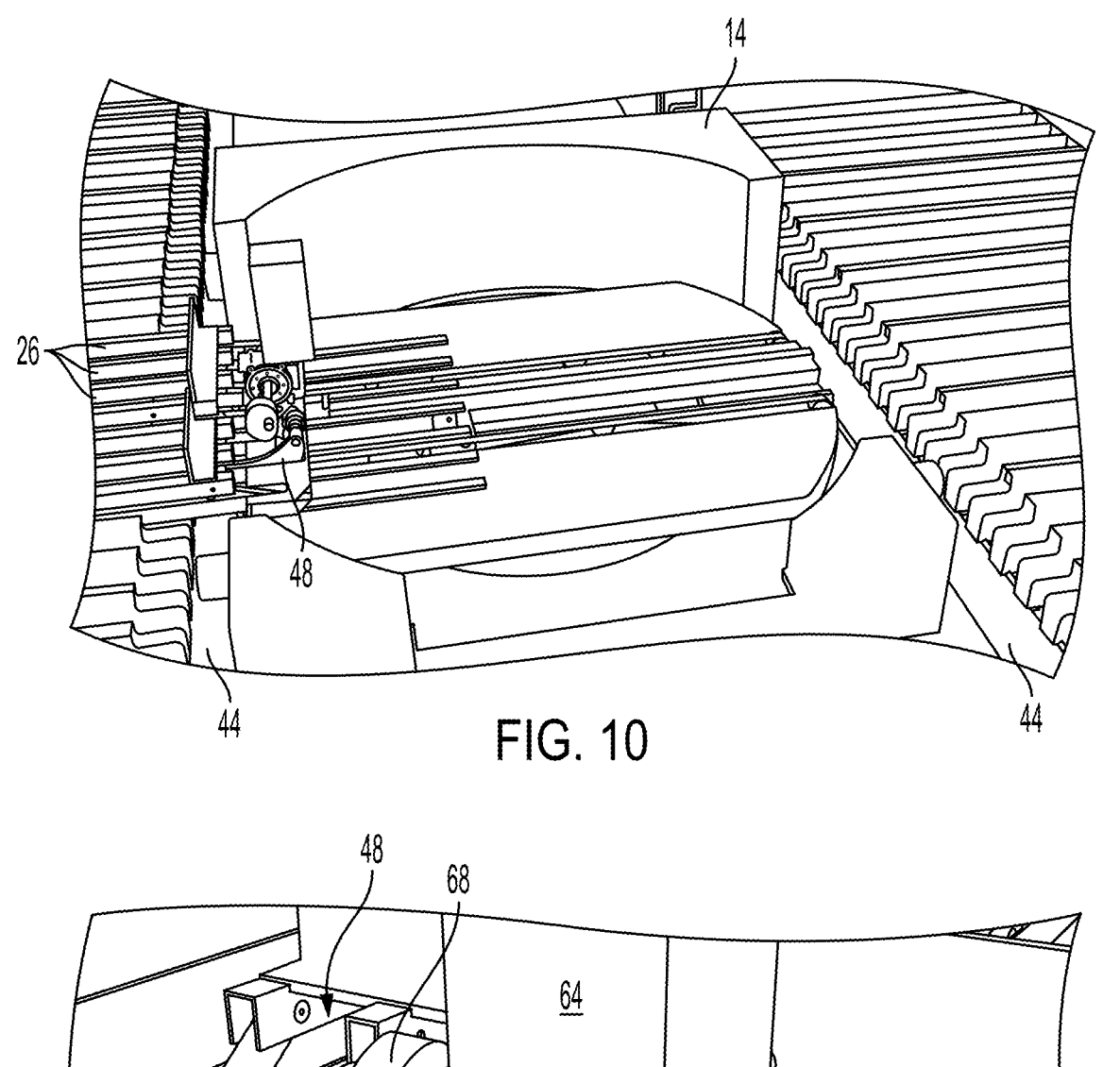
FIG. 10 shows an illustrative diagrammatic view of the mobile shuttle unit of FIG. 8 with the payload extended above a shelf.
FIG. 11 shows an illustrative diagrammatic view of a cam lifting system for use in a mobile shuttle unit showing the cams urging the rockers downward lifting the tines upward.

FIGS. 9A and 9B show the tines 26 are each supported by runners 27, and the runners each includes one or more lead rollers 29. The corrugated shelf includes crests 13 and valleys 11, and the runners are aligned with and enter the valleys 11 such that the lead roller(s) 29 enter the valleys 11 of the shelf and begin to distribute the load to the shelf during transfer. FIG. 9A shows the tines 26 in a lowered position below the height of tops of the shelf surface, and FIG. 9B shows the tines 26 in a raised position above the height of the tops of the shelf surface. The corrugated shelves may be continuous (as shown) or discontinuous (e.g., formed of disconnected u-shaped troughs) along the shelf direction. FIG. 10 shows the payload having been extended into the shelf 12 by the translation system 52. The payload may be extended in an elevated position (as shown in FIG. 10) when an object is being placed onto the shelf (and then lowered when withdrawn), or may be extended in a lowered position when removing an object from the shelf (and then raised when withdrawn).

Figure 12:
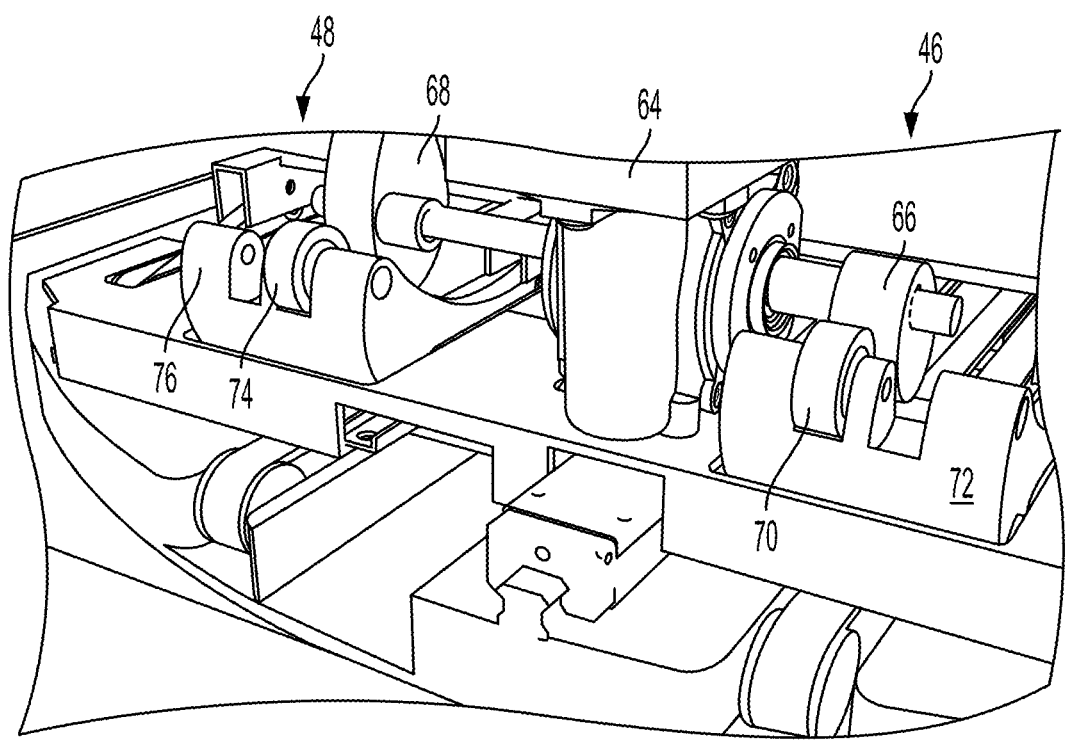
FIG. 12 shows an illustrative diagrammatic view of the cam lifting system of FIG. 11 with the cams rotated such that the rockers are raised permitting the tines to rest in a lowered position.
Figure 13:
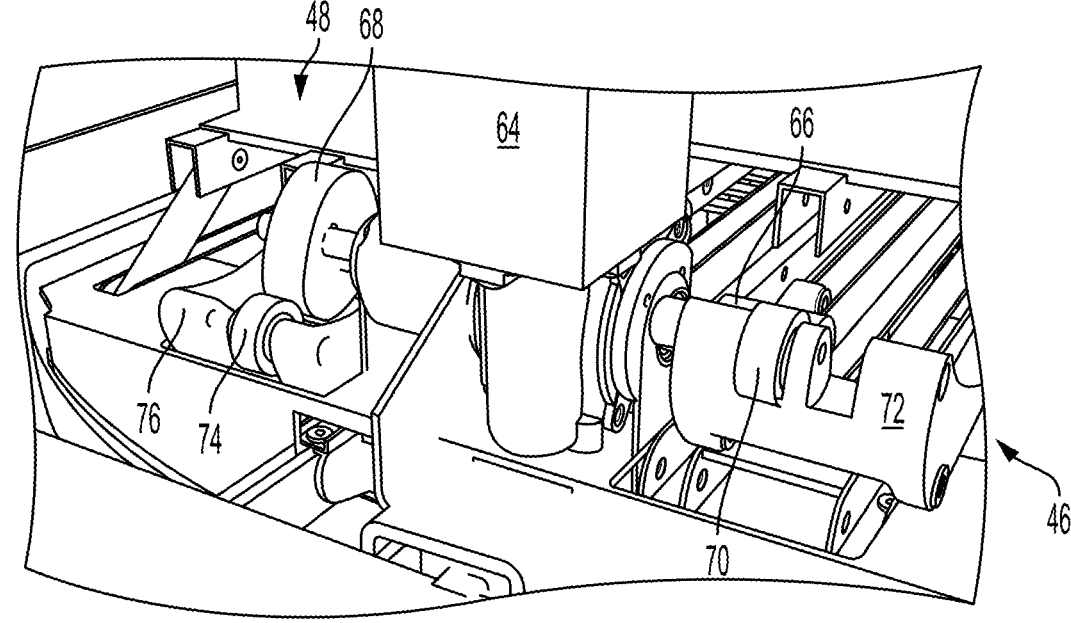
FIG. 13 shows an illustrative diagrammatic view of the cam lifting system of FIG. 11 with one cam urging a first rocker downward lifting a first set of tines upward, and showing another cam rotated such that another rocker is raised permitting a second set of tines to rest in a lowered position.
Figure 14:
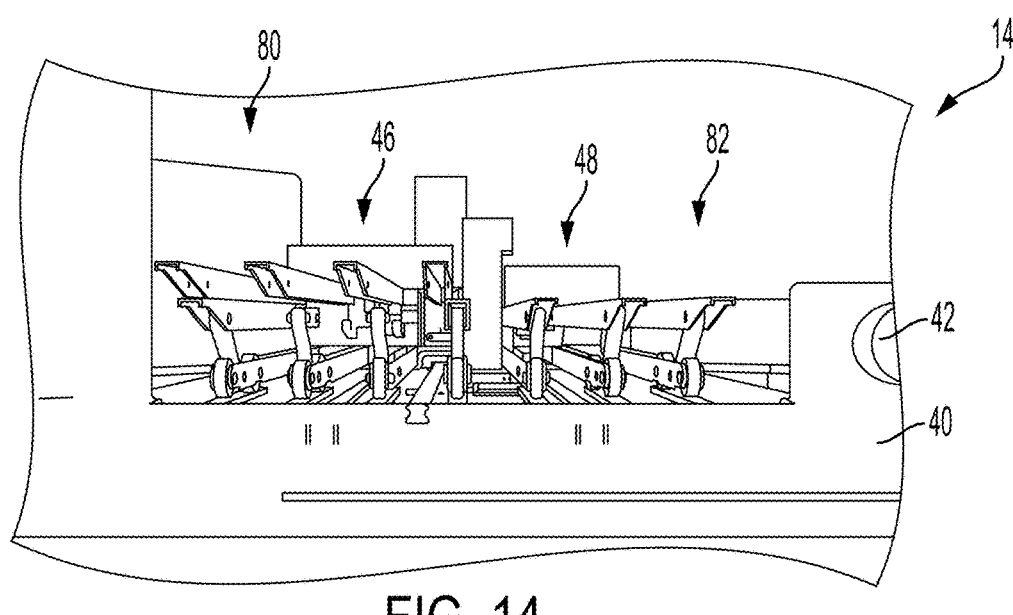
FIG. 14 shows an illustrative diagrammatic side view of the mobile shuttle unit of FIG. 13 with one set of tines raised and with one set of tines lowered.

As mentioned above, the elevation actuation systems 46, 48 are independently actuatable to raise either a first set of tines (shown at 80 in FIG. 14) or a second set of tines (shown at 82 in FIG. 14). The actuation is provided by a pair of cams 66, 68, one of which (66) may be urged against a first cam follower 70 of a first rocker base 72, and the other of which may be urged against a second cam follower 74 of a second rocker base 76. When a rocker base is pushed down, an associated set of tines is raised. FIG. 11 shows both cams 66, 68 having been rotated such that both rockers 72, 74 are urged downward lifting all tines. FIG. 12 shows both cams 66, 68 having been rotated further such that neither rocker 72, 74 is engaged by a cam, causing all tines to be lowered. FIG. 13 shows one cam 68 having been rotated such that rockers 74 is urged downward lifting the associated tines (e.g., 80 as shown in FIG. 14), while differently shaped cam 66 is not in a position to contact the cam follower 70, so rocker 72 is not lowered and its associated tines (e.g., 82 as shown in FIG. 14) are not raised.

Each mobile shuttle unit therefore provides rotational adjustment of its payload, segmented elevational adjustment of its payload and translational adjustment of its payload in accordance with the systems of FIGS. 1-14. Because the system records where objects are placed, the system has a record at all times of all objects locations on the shelves. One payload elevation system for example, may be used with multi-position cams to provide segmented elevation of the payload tines. This permits greater flexibility in handling and placing differently sized objects onto the shelfs, freeing the system from using oversized designated discrete storage locations. Smaller objects may thereby be stored closer together. This concept can be referred to as longitudinally heterogeneous storage.

Figure 15:
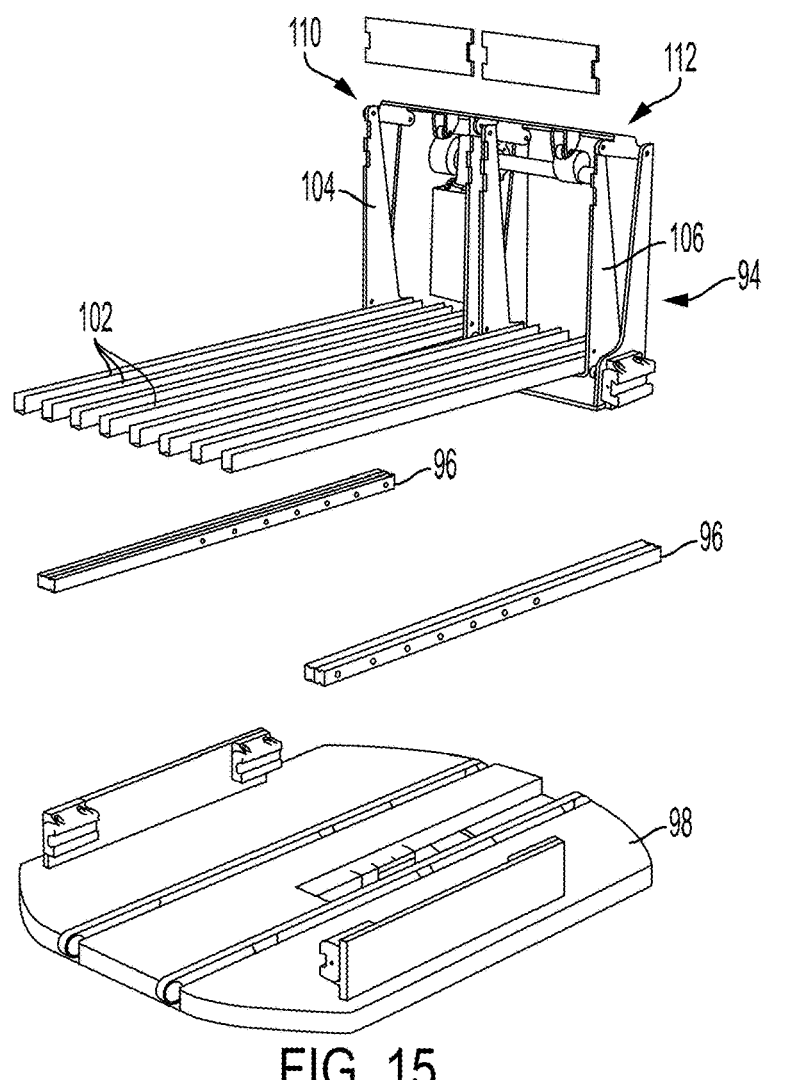
FIG. 15 shows an illustrative diagrammatic exploded view of a payload portion of a mobile shuttle unit in accordance with another aspect of the present invention that includes a suspended cam system.
Figure 19:
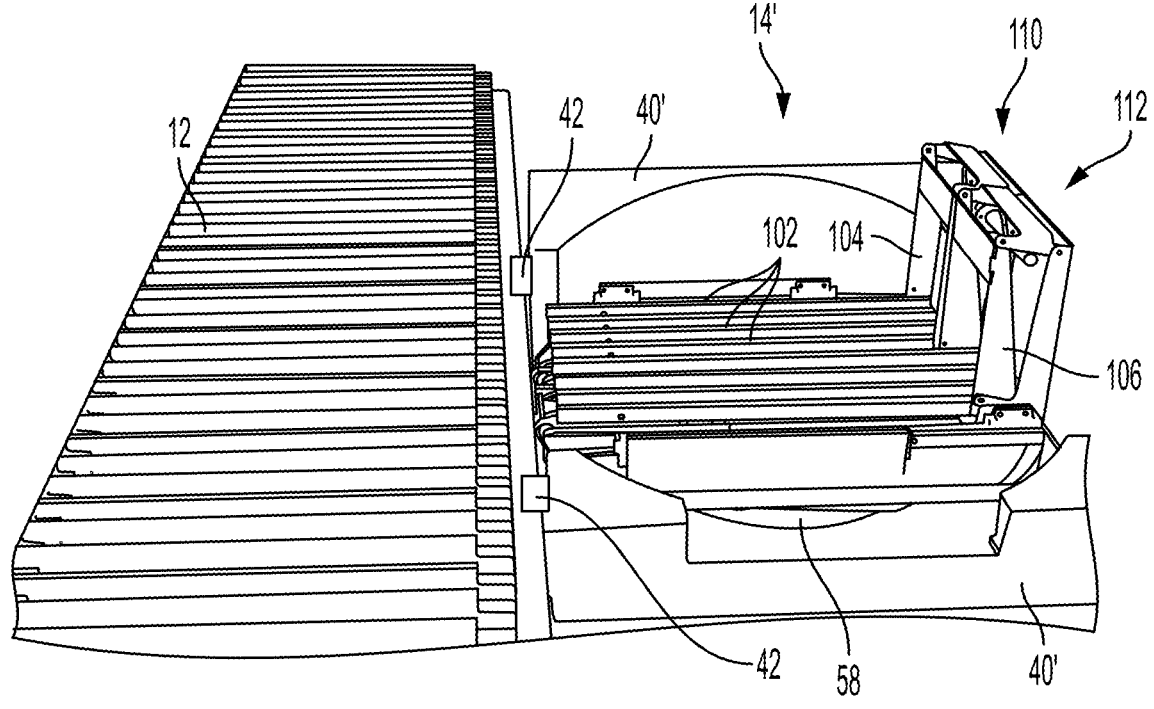
FIG. 19 shows an illustrative diagrammatic view of the mobile shuttle unit of FIG. 17 adjacent a shelving system.
Figures 20, 21:
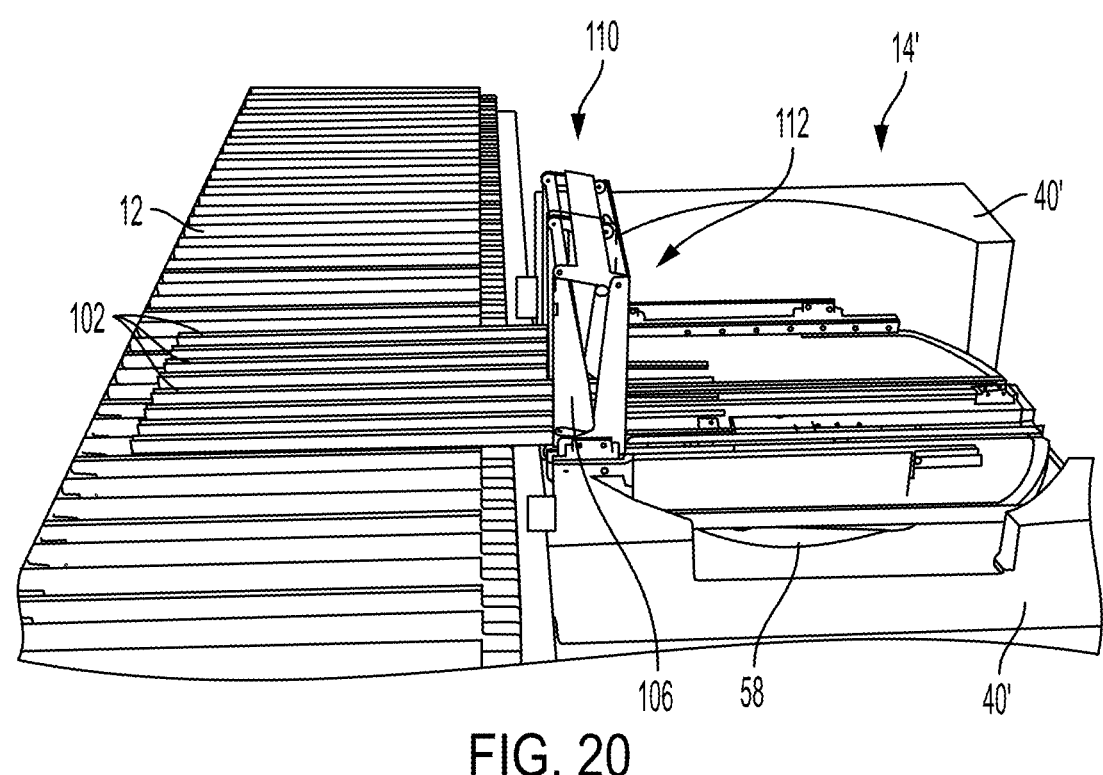
FIG. 20 shows an illustrative diagrammatic view of the mobile shuttle unit of FIG. 19 with the payload extended over a shelf of the shelving system.
FIG. 21 shows an illustrative diagrammatic view of a mobile shuttle unit in accordance with another aspect of the present invention that includes bi-directionally extendable payload tines.

In accordance with further aspects, systems of the invention may include sets of tines that are mounted in a cantilever fashion on an elevator base that is movable translation system. FIG. 15 shows an exploded view of an upper portion of a mobile shuttle unit 14' (shown in FIGS. 19 and 20). The upper portion is supported by an attached gear 56 that is rotated by a rotation system 58 that is supported by a mobile unit chassis 40' as discussed above with reference to FIGS. 1-14. As shown in FIG. 15, a payload 94 rides along translation rails 96 that are attached to a translation base 98. The payload 94, rails 96 and translation base 98 are rotatable with respect to the mobile unit chassis 40' by the rotation system 58 (a portion of which is shown in FIGS. 19 and 20). The payload 94 includes tines 102 that extend from one of two suspended seats 104, 106 that raise and lower the tines 102 (as discussed below). The seats 104, 106 are suspended from cam mechanisms 110, 112 behind protective covers.

Figure 16:
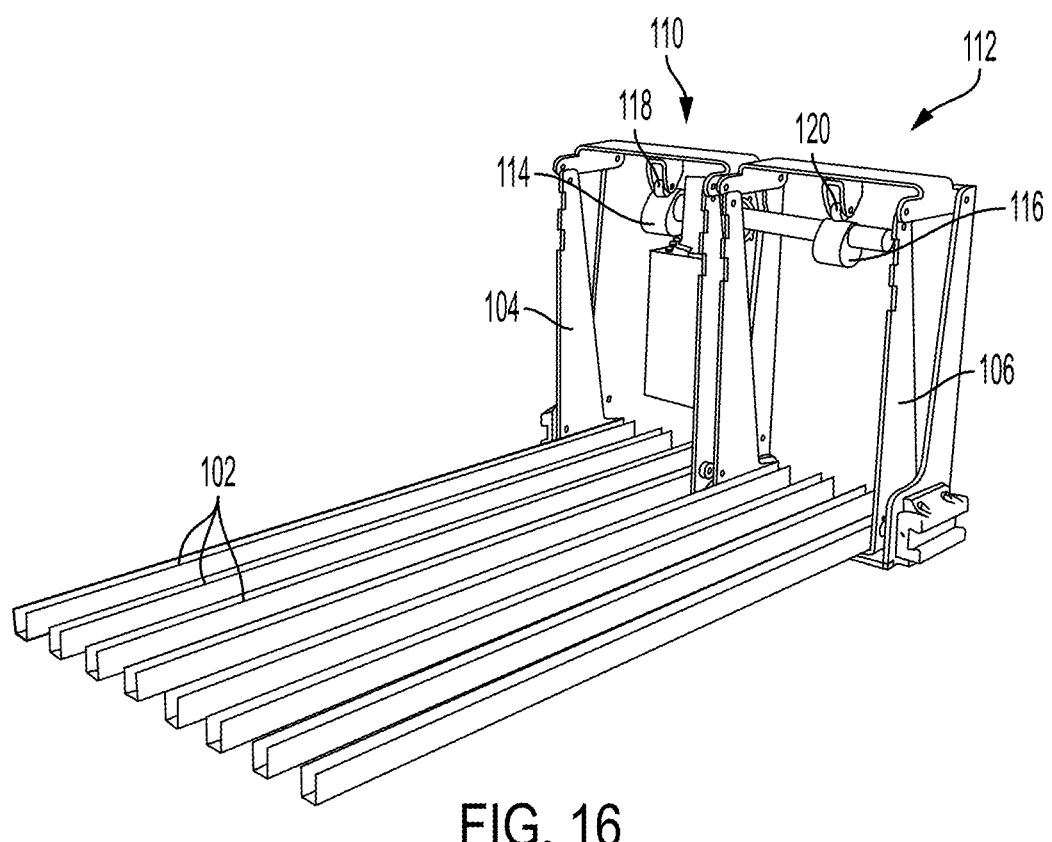
FIG. 16 shows an illustrative diagrammatic view of the payload portion of FIG. 15 with the tines in a lowered position.
Figure 17:
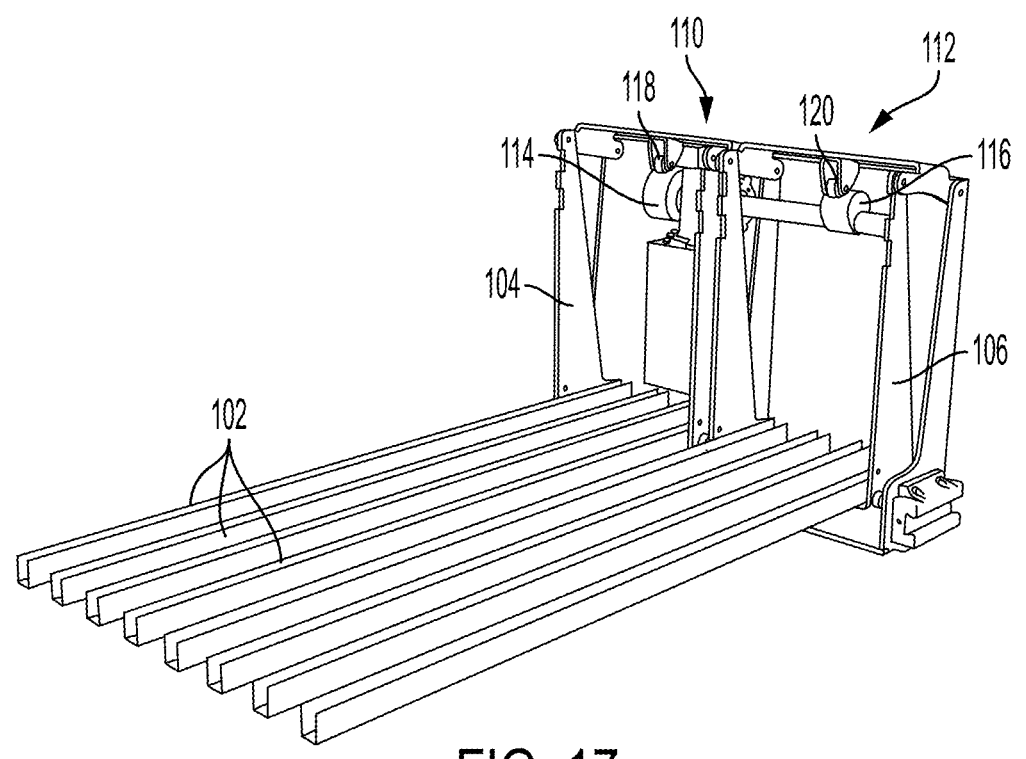
FIG. 17 shows an illustrative diagrammatic view of the payload portion of FIG. 15 with the tines in a raised position.
Figure 18:
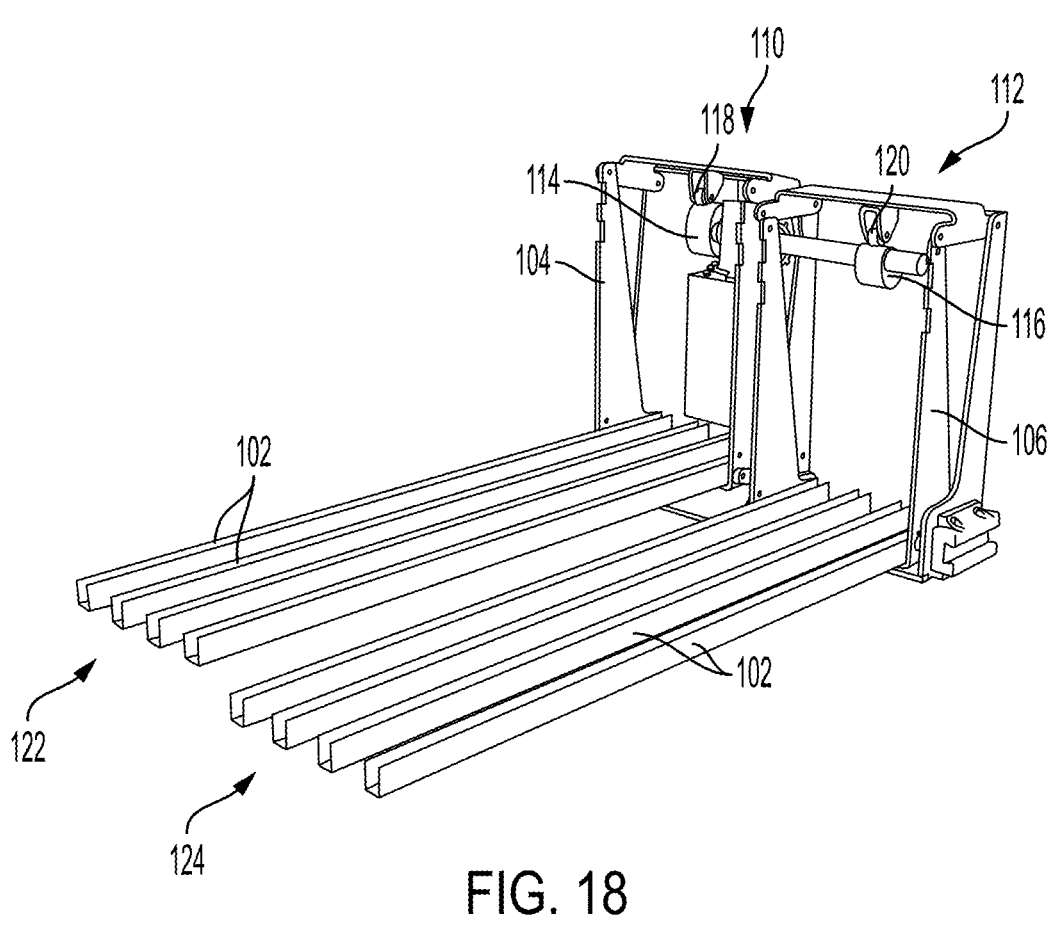
FIG. 18 shows an illustrative diagrammatic view of the payload portion of FIG. 15 with one set of tines in a raised position and one set of tines in a lowered position.

As shown in FIG. 16, when cam mechanisms 114, 116 are rotated such that they do not act on cam-followers 118, 120, the suspended seats 104, 106 (and the tines 102) remain in a lowered position. With further reference to FIG. 17, when the cam mechanisms 114 and 116 are rotated such that cam-followers 118, 120 are urged upward, the suspended seats 104, 106 are urged upward as well, bringing the tines 102 to their raised position. With further reference to FIG. 18, when one cam mechanisms 114 is rotated such that it contacts cam-follower 118 but the other cam mechanism 116 does not contact cam-follower 120, one set of tines (shown at 122) is raised while another set of tines (shown at 124) is not raised. Again, one payload elevation system may be used with multi-position cams to provide segmented elevation of the payload tines. This permits greater flexibility in handling and placing differently sized objects onto the shelfs, freeing the system from using oversized designated discrete storage locations, and permitting smaller objects to be stored closer together.

FIG. 19 shows the mobile shuttle unit 14' adjacent a shelf 12. Only one shelf is shown for clarity; the units 14' may be used between rows of shelves that are provided in levels as discussed above with reference to FIGS. 2-14. FIG. 20 shows the tines 102 on the seats 104, 106 advanced over the shelf 12. Because the tines 102 are sized to fit between crests and valleys of the corrugated shelf 12, the extended tines (when raised/lowered) may be used to place objects onto the shelves 12 or remove objects from the shelves. Again, because the system records where objects are placed, the system has a record at all times of all objects locations on the shelves. Again, all operations may be controlled by the one or more computer processing systems 100.

Figure 22:
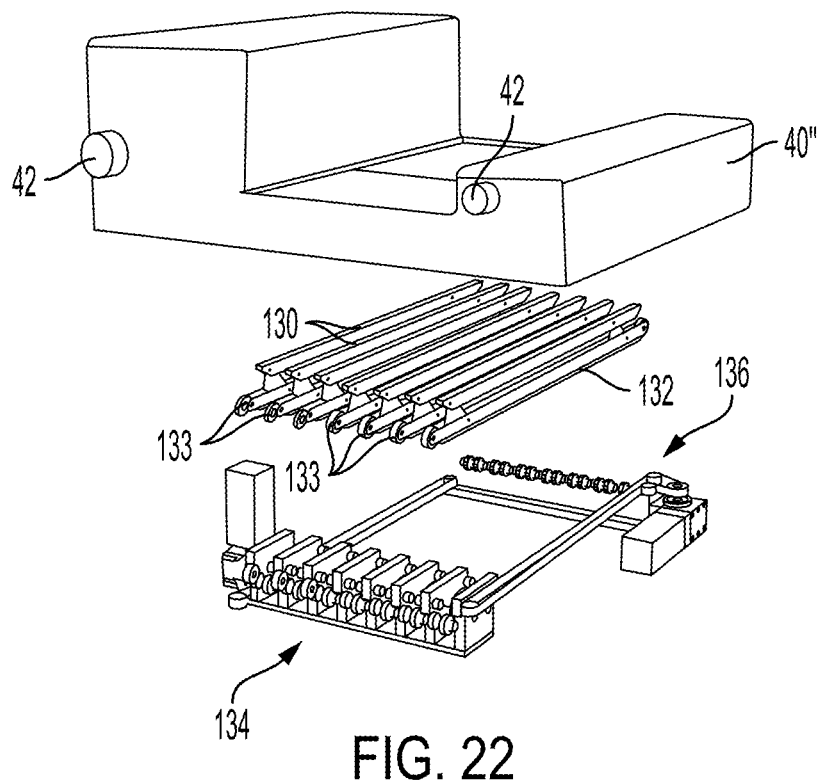
FIG. 22 shows an illustrative diagrammatic exploded view of the mobile shuttle unit of FIG. 21 with its mobile bridge at a first end.
Figure 23:
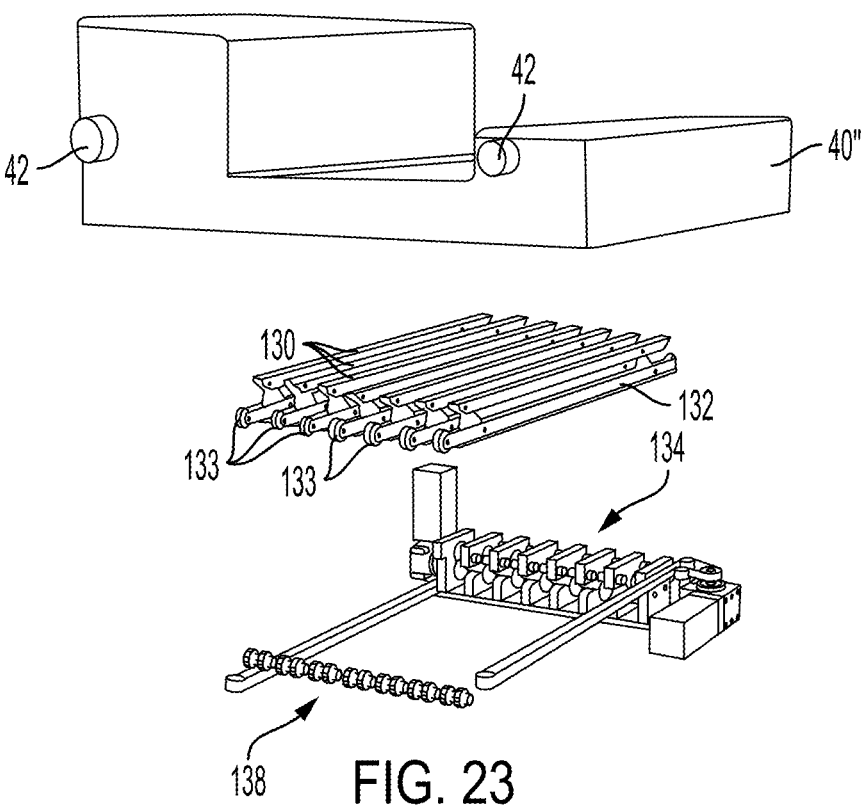
FIG. 23 shows an illustrative diagrammatic exploded view of the mobile shuttle unit of FIG. 21 with its mobile bridge at an opposite second end.

In accordance with further aspects, systems of the invention may include a bi-directional translation system that, rather than rotating the payload, may transfer a payload (or retrieve a payload) from either of two opposing shelfs. FIG. 21 shows a mobile shuttle unit 14" that includes a mobile unit chassis 40" with wheels 42 as discussed above. The mobile shuttle unit 40" includes tines 130 that are mounted on elevationally adjustable runners 132. Each of the tines 13 may be raised and lowered with respect to their respective runners 132 as discussed below with reference to FIGS. 31-34. The runners 132 are supported by and travel with a bridge 134 (with a slidable drive roller) that is movable between ends of the mobile chassis unit 40". FIG. 22 shows an exploded view of the upper portion of the mobile chassis unit with the bridge 134 at one end, and FIG. 23 shows an exploded view of the mobile chassis unit with the bridge 134 having moved to the opposite end.

Figure 24A:
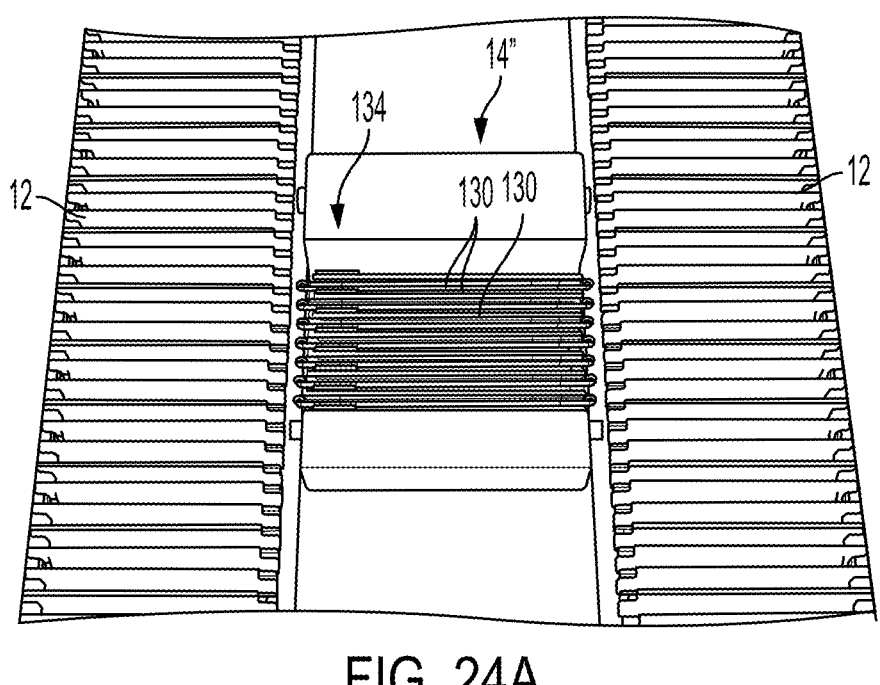
FIGS. 24A-24D show illustrative diagrammatic views of the mobile shuttle unit of FIG. 21 showing the payload not extended (FIG. 24A), showing the payload extended in a first direction (FIG. 24B), showing the mobile bridge having moved to an opposite side from that shown in FIG. 22 (FIG. 24C), and showing the payload extended in an opposite second direction (FIG. 24D)
Figure 24B:
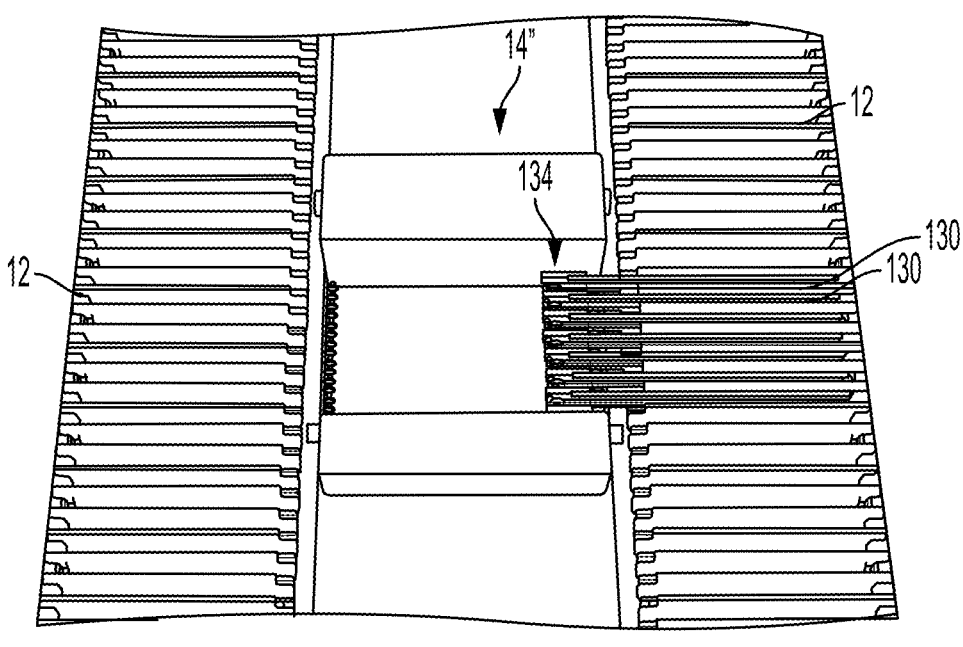
Figure 24C:
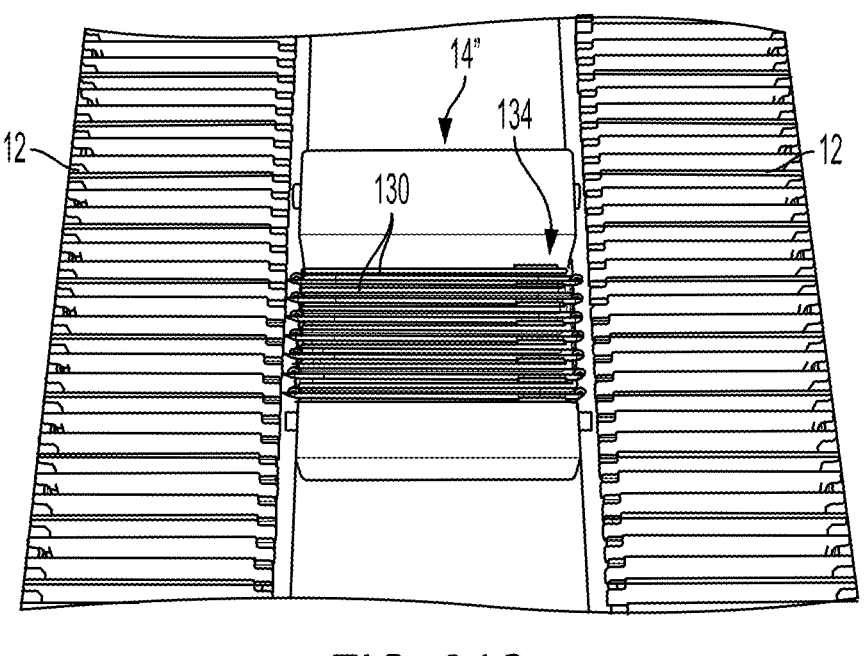
Figure 24D:
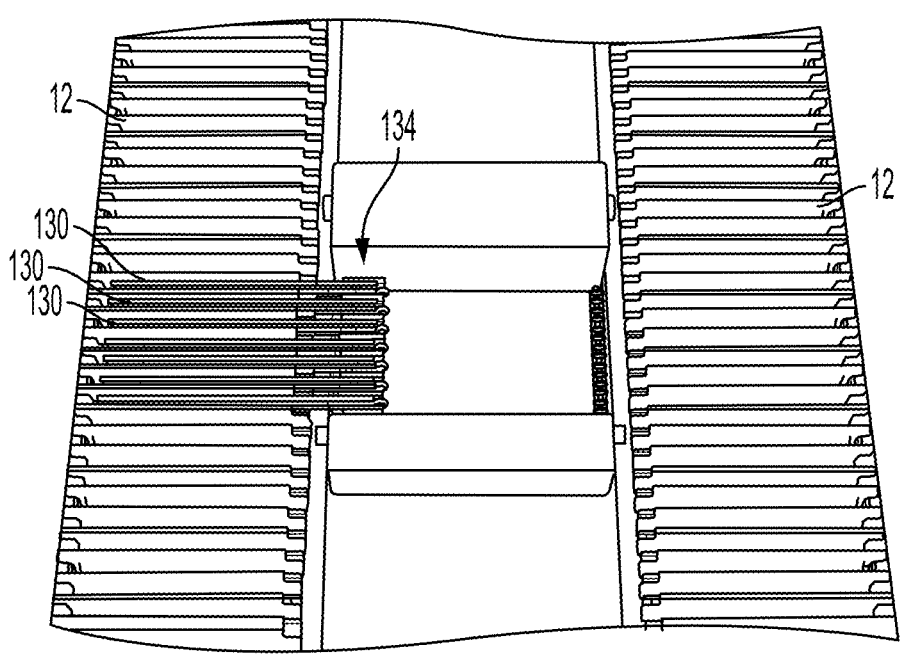

The runners 132 also travel over support rollers 136, 138 and are supported thereby as the runners extend out over a shelf until the roller tip engages the shelf valley. The support rollers 136, 138 support the load, while the bridge 134 drives the runners and tines outward. FIG. 24A shows the bridge 134 adjacent a side of the mobile shuttle unit 14", and FIG. 24B shows the tines 130 extended over a first shelf 12. The bridge 134 may then be moved to the opposite side of the unit 14" (as shown in FIG. 24B) and FIG. 24C shows the bridge 134 adjacent the opposite side of the mobile shuttle unit 14". FIG. 24D shows the tines 130 extended over a second shelf 12.

Figure 25A:
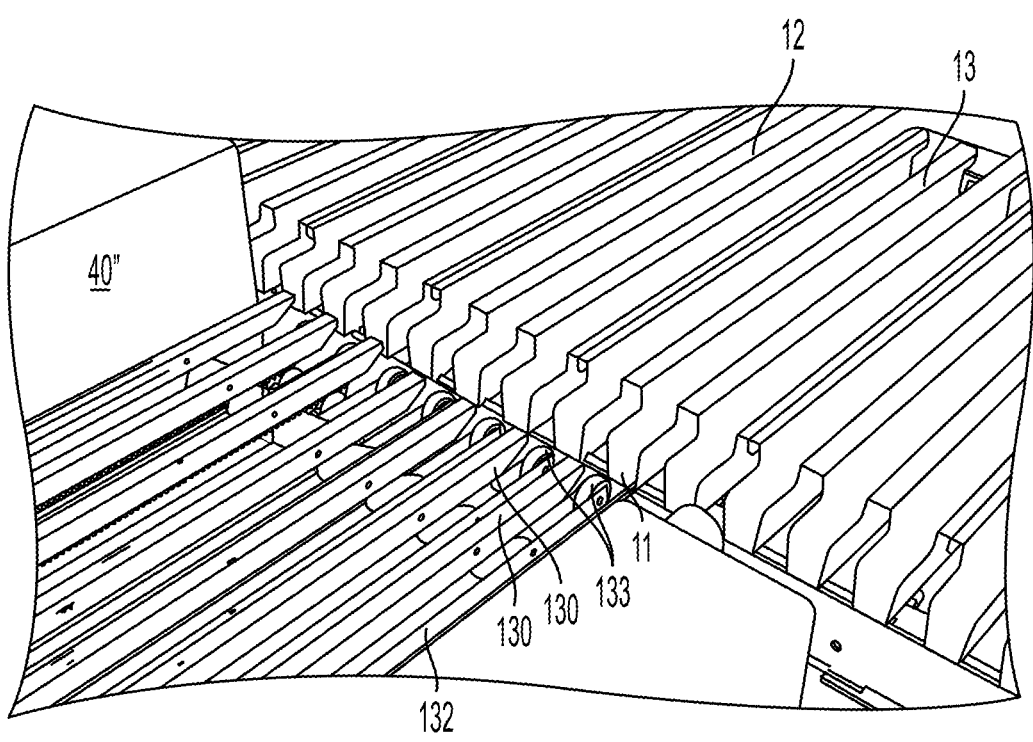
FIGS. 25A and 25B show illustrative diagrammatic enlarged views of the tines of the payload of the mobile shuttle unit of FIG. 21 showing rollers on the ends of the tines supported by the mobile shuttle unit prior to transfer (FIG. 25A) and following transfer wherein the rollers are in contact with lower surfaces within a shelving system (FIG. 25B)
Figure 25B:
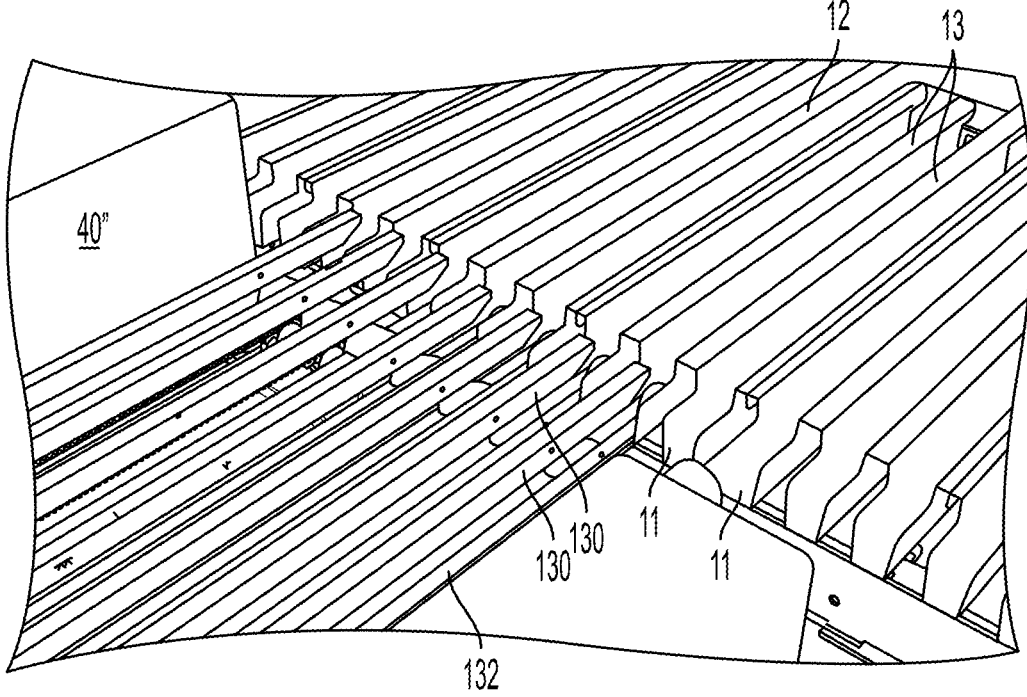

Similar to the system show in FIGS. 9A and 9B, FIGS. 25A, 25B show the tines 130 are each supported by runners 132, but the runners 132 are bi-directional with lead rollers 133 on each end thereof. FIG. 25A shows runners about to engage a lower portion of a shelf and FIG. 25B shows the runners having engaged the lower of portion of the shelf thereby acting to shift some of any weight of a load on the runners from the carrier 14 to the shelf. The runners 132 are aligned with and enter the valleys 11 of the corrugated shelf such that the lead rollers 133 enter the valleys 11 of the shelf and begin to distribute the load to the shelf during transfer. FIGS. 24B and 24D show the payload having been extended into the shelf 12 by the translation system 136. The payload may be extended in an elevated position when an object is being placed onto the shelf (and then lowered when withdrawn) or may be extended in a lowered position when removing an object from the shelf (and then raised when withdrawn).

Figure 26A:
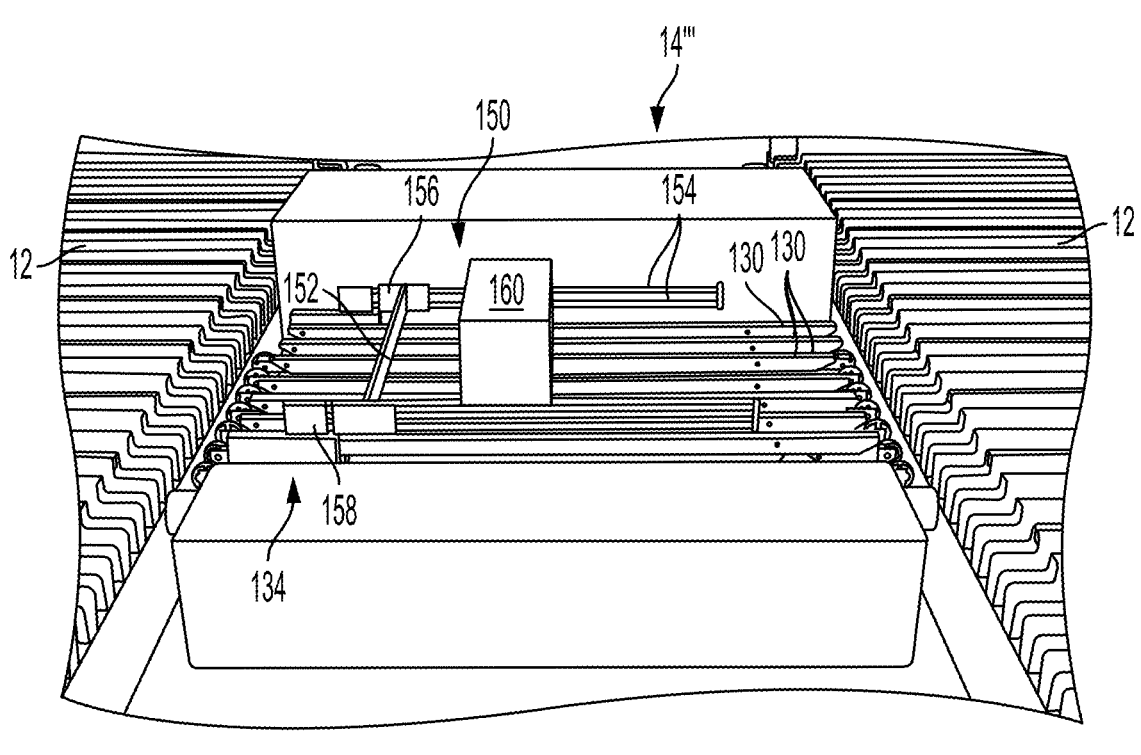
FIGS. 26A-26D show illustrative diagrammatic views of the mobile shuttle unit in accordance with a further aspect of the present invention that includes a payload position adjustment system showing an object in a first position on the payload (FIG. 26A), showing the object having been moved to a second position on the payload (FIG. 26B), showing the object having been transferred to a first position on a shelving system (FIG. 26C), and showing a further object transferred to a second position on the shelving system that is in front of the first position (FIG. 26D)
Figure 26B:
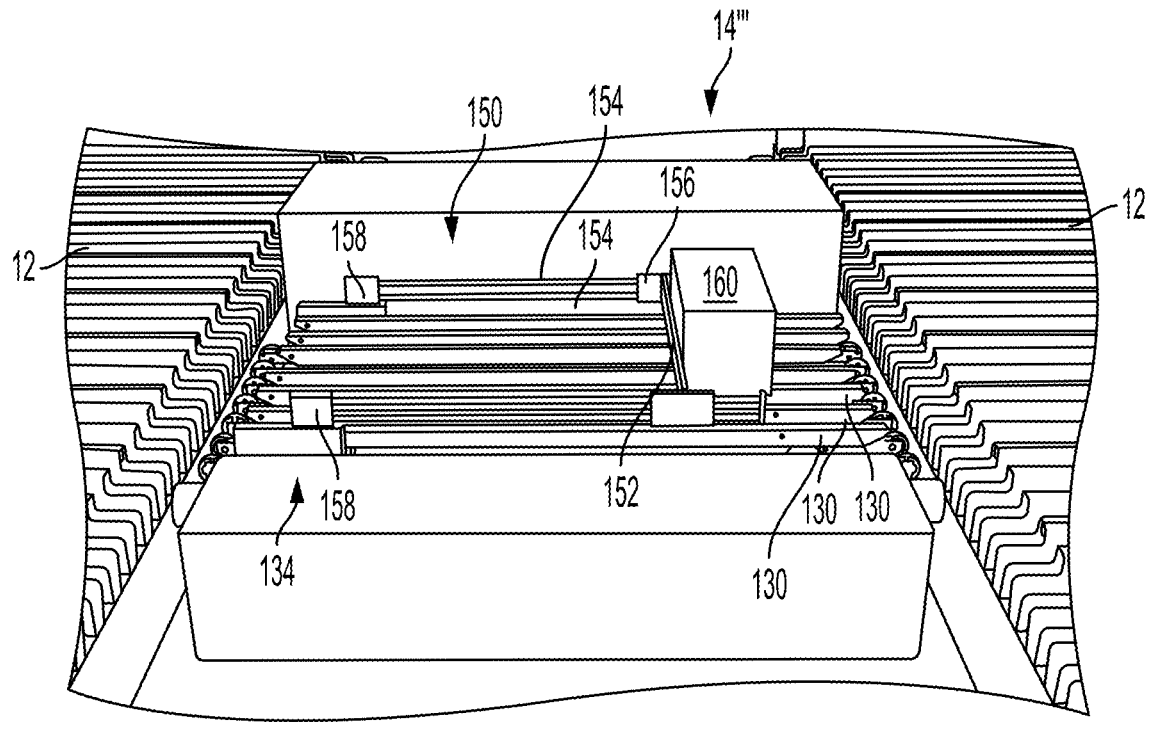
Figure 26C:
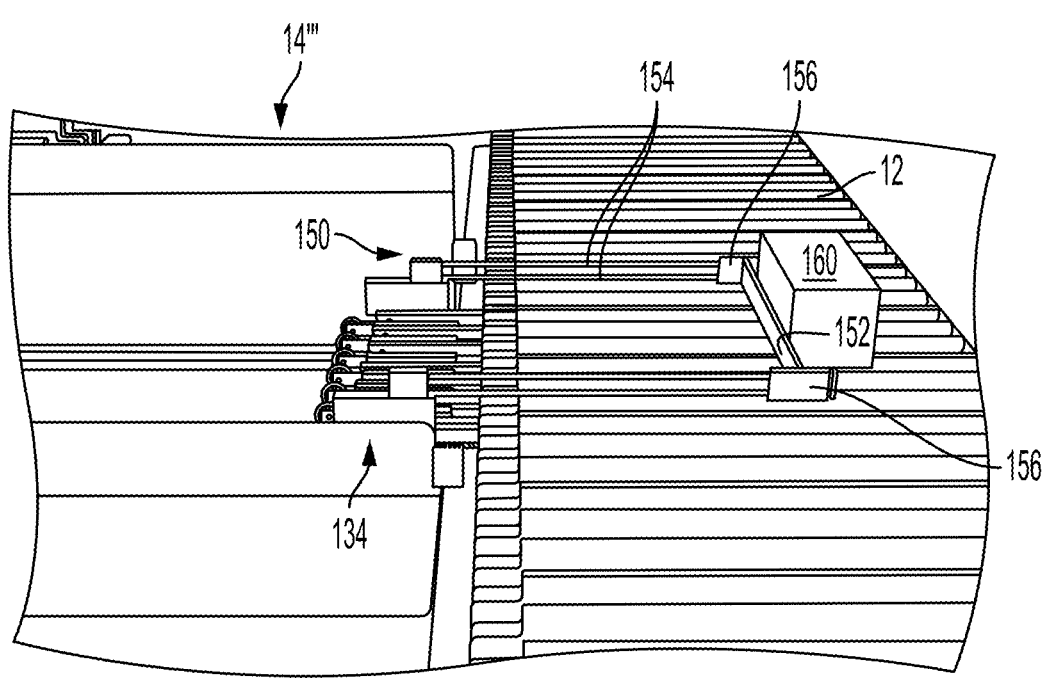
Figure 26D:
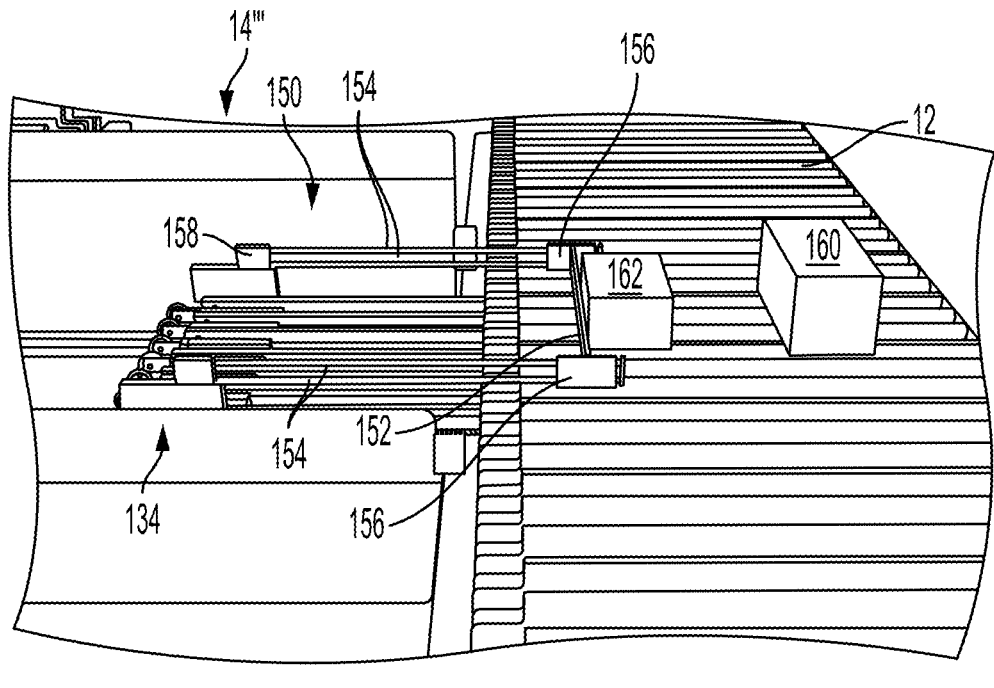

The automated shuttle carrier 14 may further include a payload position adjustment system for adjusting a position of an object on the payload receiving portion of the carrier. For example, FIG. 26A shows the carrier 14''' with a payload position adjustment system 150 for adjusting a position of an object 160 on the tines 130. The payload position adjustment system 150 includes a push bar 152 that may be moved by a power system 156 via rails 154 that are attached to bases 158 on the bridge 134. FIG. 26B shows the push bar 152 having urged the object 160 to a forward position on the tines 130. In FIGS. 26A and 26B the tines 130 are raised to a height sufficient to provide that the tines 130 are higher than the highest portions of the shelf 12. In this arrangement, the tines 130 may be moved among the corrugations of the shelf to bring the object 160 above the shelf 12. With reference to FIG. 26C, the push bar 152 in then drawn back toward the bridge 134 and the tines 130 are lowered such that the object 160 remains on a distal portion of the shelf. The push bar 152 is first withdrawn and then the support structure is lowered to prevent the push bar 152 from colliding with the shelf. In accordance with further aspects, the payload position adjustment portion may accommodate elevational changes of the tines 130 with respect to the shelf 12. A further object may then be loaded onto an automated mobile carrier and again moved to a forward position on the payload receiving surface. With reference to FIG. 26D, the further object 162 may then be similarly deposited onto the shelf but in proximal position on the shelf. In FIGS. 26A and 26B the tines 130 are raised with respect to the shelf. In FIGS. 26C and 26D the tines 130 are lowered with respect to the shelf. In this way, multiple objects may be positioned at a shelf location that otherwise may have only been able to receive one object.

Figure 27:
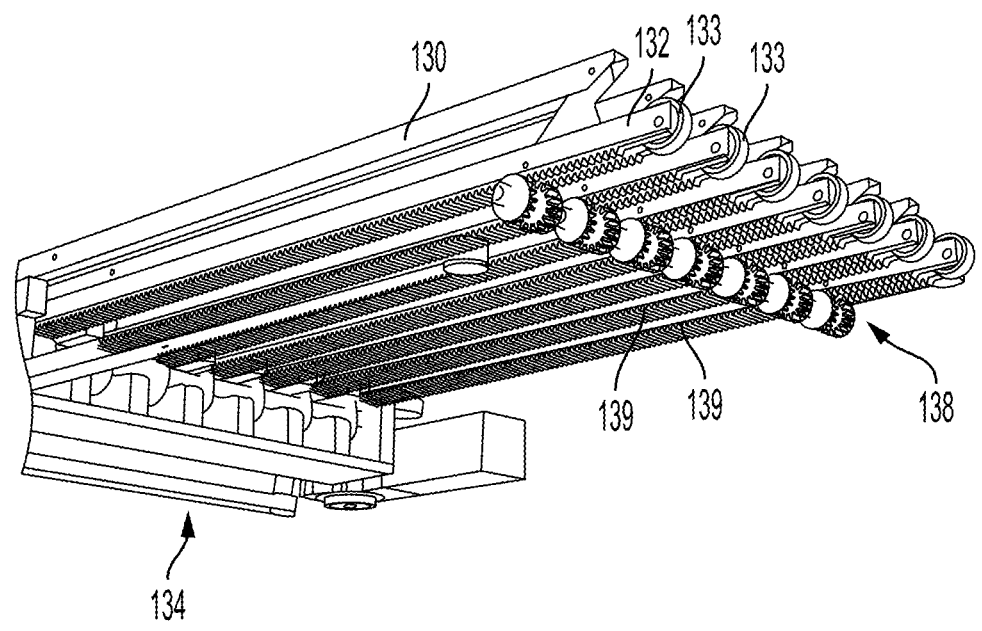
FIG. 27 shows an illustrative diagrammatic underside view of the translation system of the mobile shuttle unit of FIG. 21.
Figure 28:
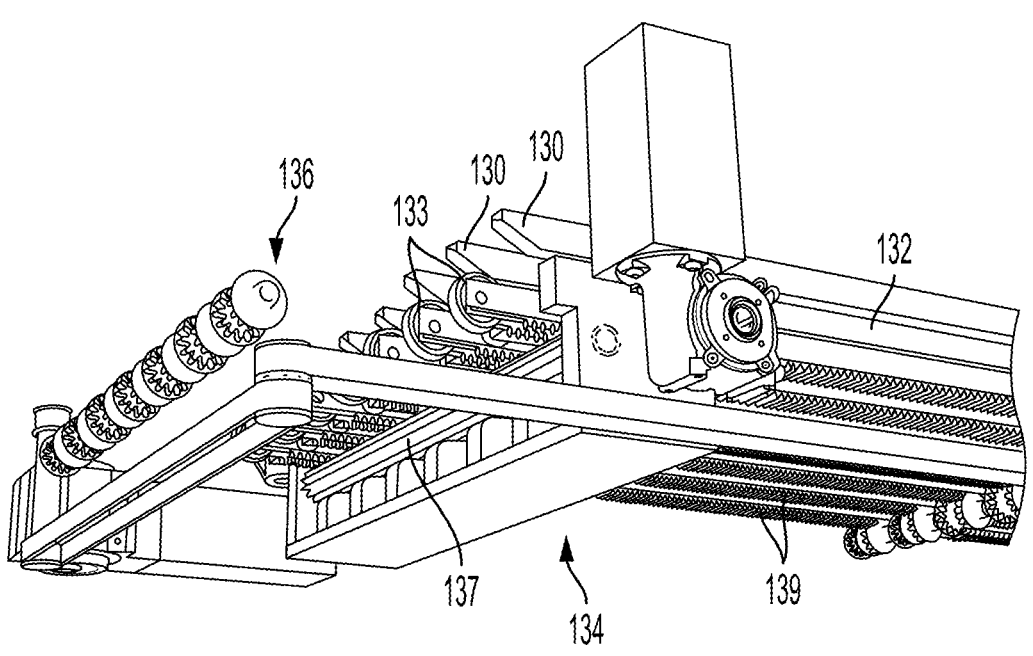
FIG. 28 shows an illustrative diagrammatic underside view of the translation system of FIG. 27 with the bridge having begun to move to an opposite end of the mobile shuttle unit.

FIGS. 27 and 28 show the runners 132 travelling over the non-actively driven pinion gears 138 (and thereby remaining mutually aligned) to extend away from the mobile chassis unit housing under a drive force from the bridge 134. FIG. 27 shows an underside view of the runners and pinion gears, and FIG. 28 shows the bridge having moved from one side of the carrier. A drive bar 137 engages rack gears 139 on the underside of the runners 132 to move the tines outward. The pinion gears 136 and 138 are not actively driven and serve to maintain alignment of the plurality of tines. To move in the other direction, the bridge 134 (including the drive bar) are moved to the opposite side as shown in FIGS. 29-32. Each side of the unit 14" may include the bi-directional tines for moving the tines in either of opposite directions (e.g., for accessing opposing shelves 12 as discussed above), and this is achieved without rotating the payload.

Figure 29:
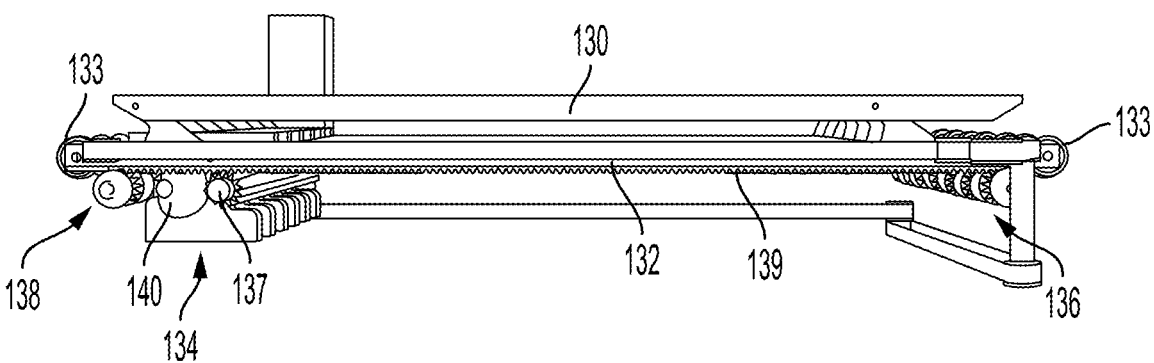
FIG. 29 shows an illustrative diagrammatic side view of the translation system of FIG. 27 with the tines raised and the bridge at the first end.
Figure 30:
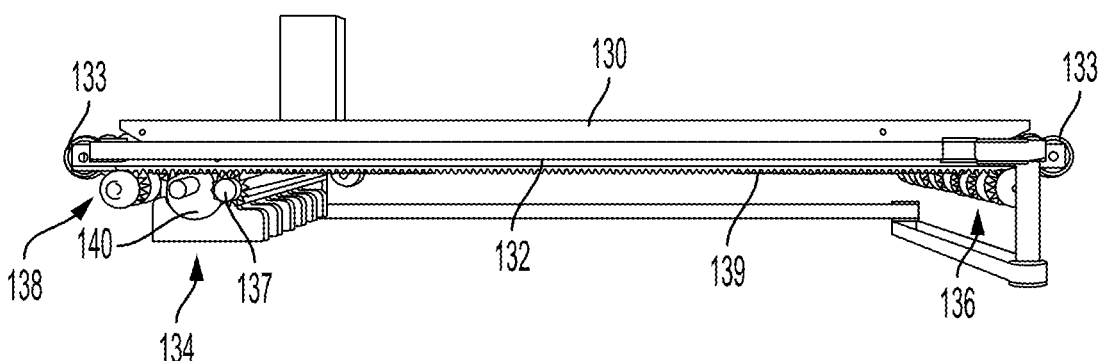
FIG. 30 shows an illustrative diagrammatic side view of the translation system of FIG. 29 with the tines lowered and the bridge at the first end.
Figure 31:
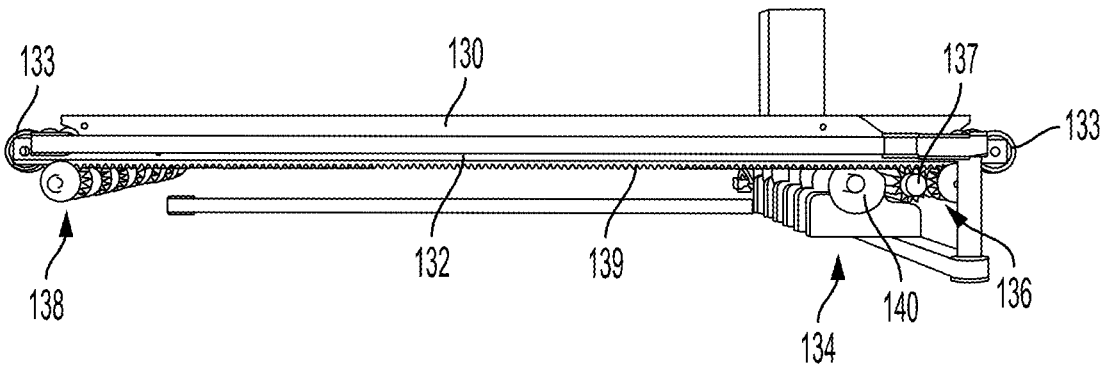
FIG. 31 shows an illustrative diagrammatic side view of the translation system of FIG. 29 with the bridge having been moved to the opposite send end.
Figure 32:
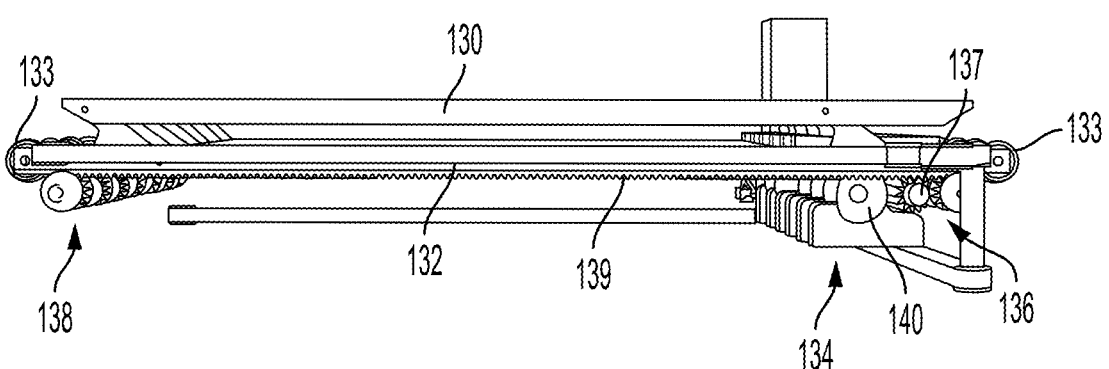
FIG. 32 shows an illustrative diagrammatic side view of the translation system of FIG. 29 with the bridge at the second end and the tines raised.

FIG. 29 shows the tines 130 in a raised position since cams 140 are rotated against camming blocks (that also serve as linkages, e.g., using a four-bar linkage) such that the tines 130 are elevated with respect to the runners 132 when elevated from either end, and Figure shows the tines 130 in a lowered position since cams 140 are rotated such that the tines 130 are not elevated with respect to the runners 132. As discussed above, the cams 140 may be formed of different shapes, permitting different sets of the tines to be raised and lowered together or independently by providing differently shaped cams. As also discussed above, the bridge 134 may then be translated to the opposing side of the mobile shuttle unit (as shown in FIG. 31), and the cams 140 may then be again rotated such that the tines 130 again become elevated with respect to the runners 132 (as shown in FIG. 32). By moving the bridge 134 (with the drive bar 137) between the ends of the mobile shittle unit 14" the tines may be extended in either of the two opposing directions to access a pair of opposing shelves. When the drive bar 137 and bridge 134 are moved between the ends (under a reciprocating belt drive system or by other linear translation means), the bar is permitted to rotate as it travels along the rack gears 139 on the undersides of the runners 132. When driving the tines outward, the drive bar 137 is rotationally locked. In accordance with further aspects, the drive bar may be used to maintain alignment of the runners, and the pinion gears 136, 138 may be used to translationally moved the payload.

Figure 33:
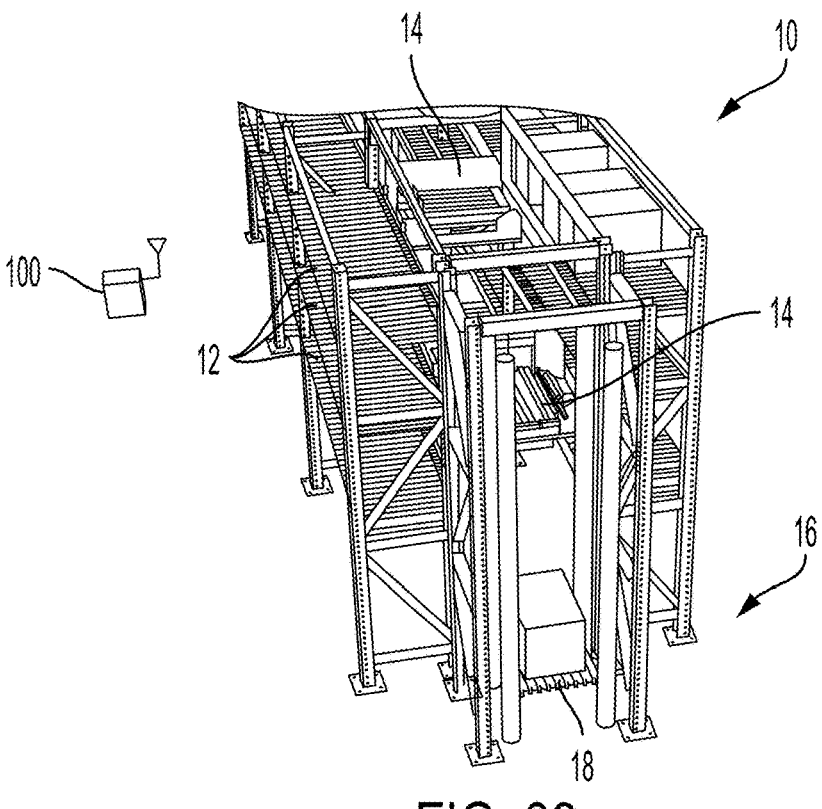
FIG. 33 shows an illustrative diagrammatic elevational end view of the system of FIG. 1 showing an elevator platform for moving objects vertically.
Figure 34:
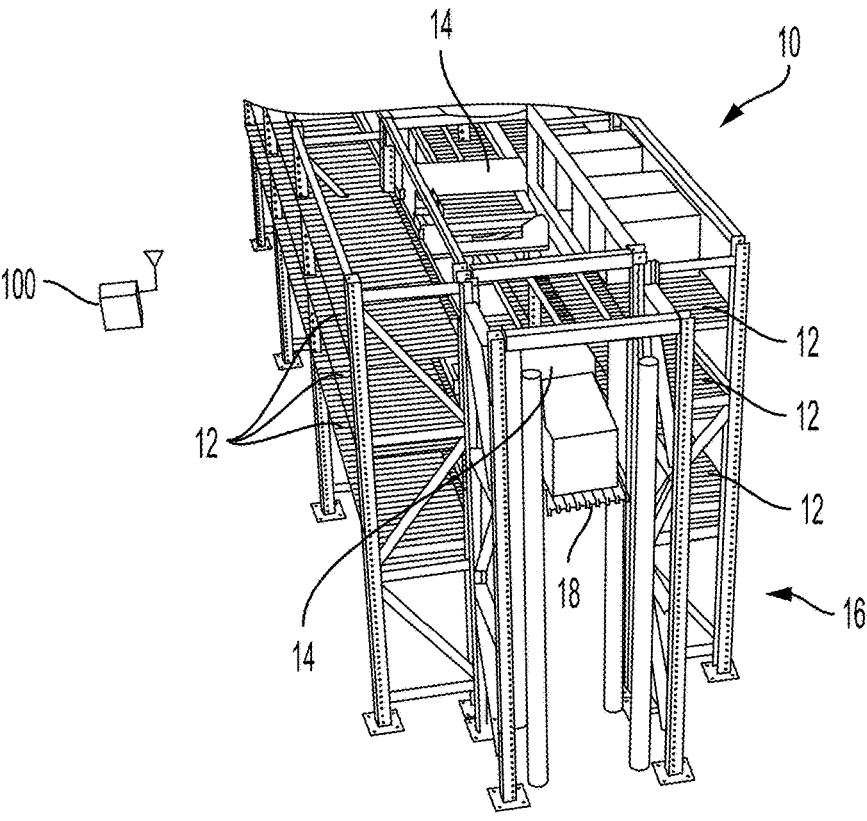
FIG. 34 shows an illustrative diagrammatic elevational end view of the system of FIG. 33 with the elevator platform having moved an object vertically to an elevated set of shelves.

With reference to FIGS. 33 and 34, the system 10 may receive input objects and provide retrieved objects via an elevator platform 18 that moves among the processing ends of each of the rows. FIG. 33 shows the elevator platform 18 having just been loaded (e.g., by a programmable motion device or by human personnel) and FIG. 34 shows the elevator platform 18 raised to a destination level with the shuttle unit 14 engaging the object from the elevator platform. Again, the elevator platform and the shelves themselves are formed of corrugated platforms that permit tines of the mobile shuttle units to enter the platform and then rise to engage an object. In accordance with other aspects, the elevator platform may be provided by a roller conveyor section that includes rollers spaced apart by distances that permit the tines to be positioned between (and above) the rollers as discussed below with reference to FIG. 45. Delivering an object works in the reverse order with the tines while holding an object being lowered below a surface. Operation of the system (and all of the systems disclosed herein) may be provided by one or more computer processing systems 100 in communication with the mobile shuttle units and conveyor systems herein described.

Figure 35:
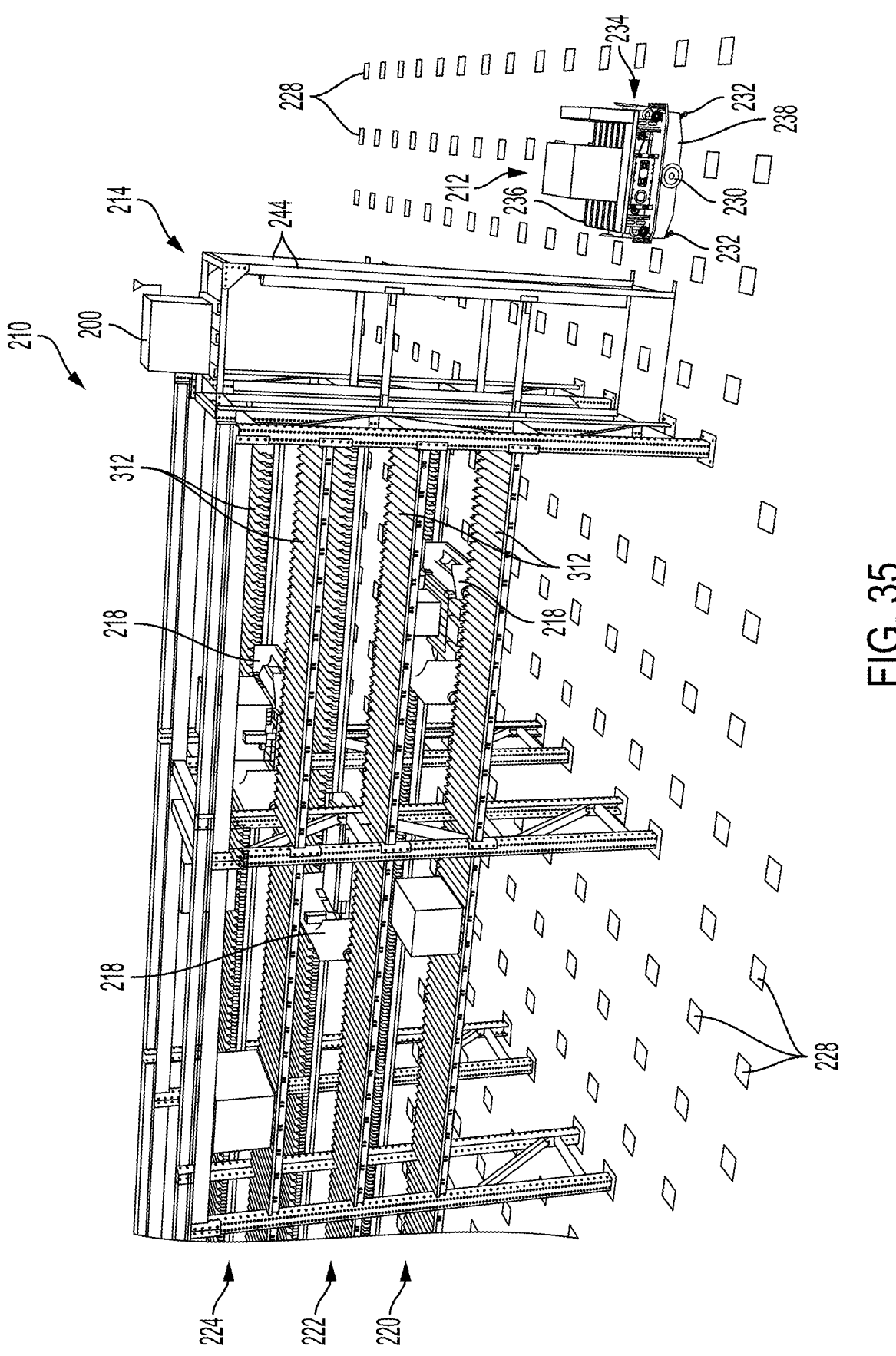
FIG. 35 shows an illustrative diagrammatic side elevational view of a system in accordance with another aspect of the present invention that includes automated mobile carriers.

In accordance with further aspects and with reference to FIG. 35, the invention provides an object processing system 210 that includes a plurality of automated mobile carriers 212 that may be moved toward and up vertical structures 214 for providing objects to or removing objects from multiple levels of shelving 216 via shuttle carriers 218. The shuttle carriers 218 are each provided on a shelf level (e.g., 220, 222, 224) between a pair of opposing shelves on each level. Navigation of each automated mobile carrier 212 about the environment may be facilitated by unique markers 228 that each carrier 212 uses (via detection units on the underside thereof) to either confirm the appropriate position and orientation of the carrier or to be used to instruct the carrier how to adjust its movement to in further travel to bring the carrier into alignment with the markers 228. In accordance with further aspects, navigation of the automated mobile carriers may be provided by any of a variety of techniques, such as wheel-rotation counting, camera detection and analysis, 3D scanning detection and analysis, echo location, and global or local position systems. Each automated mobile carrier 212 includes two independently operable drive wheels 230 that may move the carrier in forward or backward directions, as well as turn the carrier by powering one drive wheel more than the other, or by rotating each drive wheel in mutually opposing directions to cause the carrier to rotate in place. Casters 232 may be used to facilitate maintaining a level payload receiving portion 236 on which an object or bin of objects may be placed for movement. The payload receiving portion 236 may be formed of a plurality of spaced-apart ribs and is supported by a support structure 234. The support structure 234 is elevationally-adjustably mounted on a carrier base 238 (as discussed in more detail below).

The object processing system may be used, for example, in an ASRS system or other object processing systems that require both long-term and medium-term storage (low throughput to storage ratios) as well as short term storage (high throughput to storage ratios), e.g., where the storage is turned over daily. Long-term and medium-term storage systems require access to a large number of storage locations, while short term storage systems require fast access to the storage locations.

Figure 36:
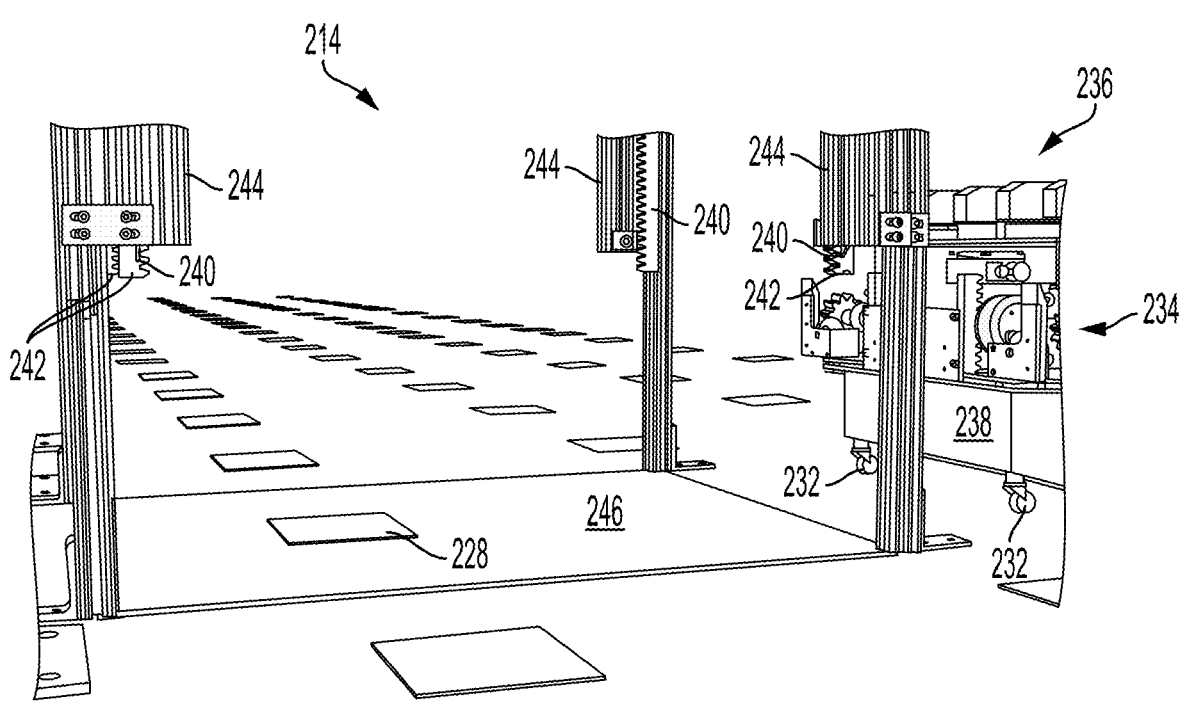
FIG. 36 shows an illustrative diagrammatic enlarged side view of an automated mobile carrier of FIG. 35 approaching a vertical structure.
Figure 37:
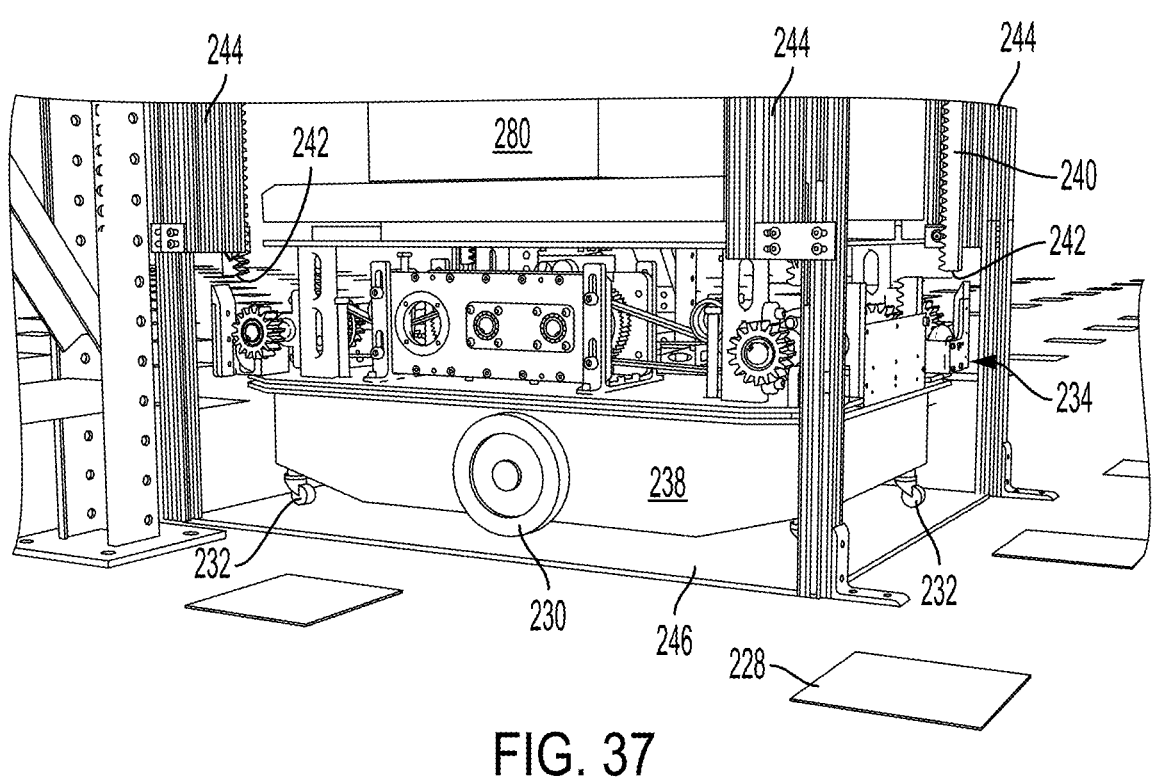
FIG. 37 shows an illustrative diagrammatic view of the automated mobile carrier of FIG. 36 having entered the vertical structure.

With further reference to FIG. 36, the vertical structure includes a plurality of vertically extending lift gear racks 240, for example, providing one in each of the four corners of the vertical structure 214 and each rack 240 includes a lowermost end 242 that terminates well above the floor. The vertical structure 214 may (or may not) include support legs 244 and a vertical structure base plate 246. The automated mobile carrier 212 may be driven into the base of the vertical structure 214, and the lowermost ends 242 of the vertically extending lift gear racks clear at least an outer portion of the automated mobile carrier 212. FIG. 37 shows the automated mobile carrier 214 having entered the base of the vertical structure. The outermost portions of the automated mobile carrier 212 (in the corners thereof) clear the lowermost ends 242 of the lift gear racks 240. As noted above, the vertical structure may omit the support legs that extend up from the floor as well as the base plate, wherein the vertical structure includes support members that terminate well above the floor.

Figure 38A:
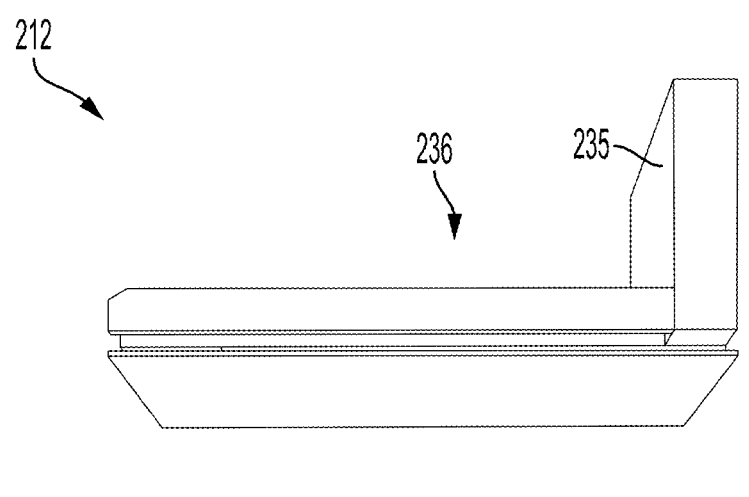
FIGS. 38A and 38B show illustrative diagrammatic exploded views of the automated mobile carrier of FIG. 37 showing an exploded side view (FIG. 38A) and an exploded end view (FIG. 38B)
Figure 38A:
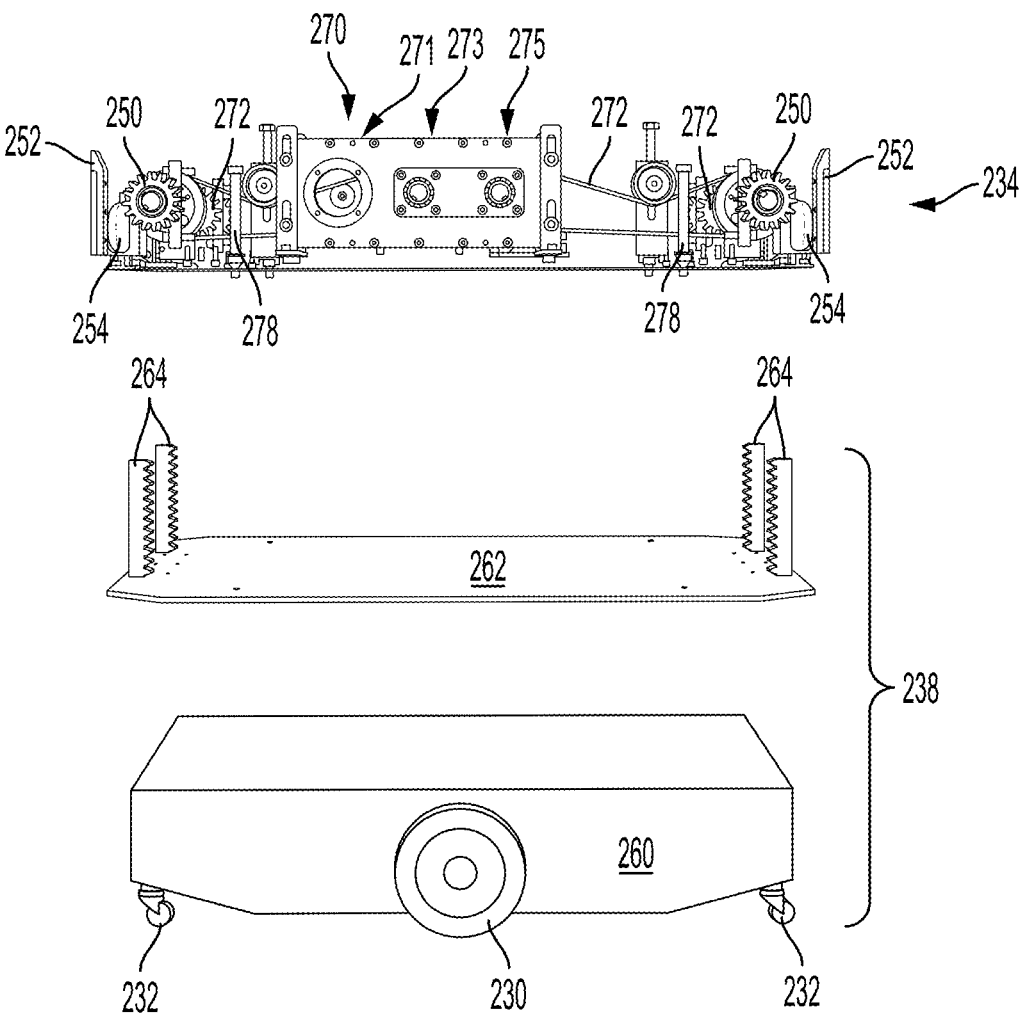
Figure 38B:
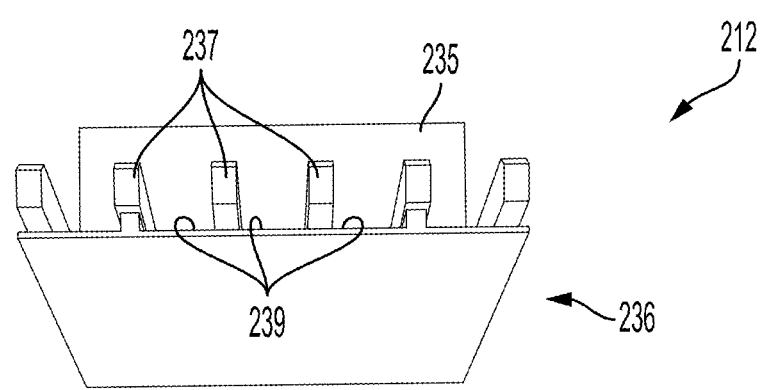

With further reference to FIGS. 38A and 38B, the automated mobile carrier 212, includes the payload receiving portion 236 that includes the support ribs 237 that rise from a floor providing floor areas 239 and a back wall 235. FIG. 38A shows a side exploded view of the automated mobile carrier 212, and FIG. 38B shows an end exploded view of the automated mobile carrier 212. The lift pinion gears 250 extend outside the outer periphery of the payload receiving portion 236. The support structure 34 includes a motor 270 with a drive gear 271 on its shaft. The drive gear 271 drives a first side gear 273, which in turn drives a second side gear. Each of the side gears 273, 275 drives a separate belt 272, and each belt 272 drives a multi-purpose drive shaft 274. Each of the multi-purpose drive shafts is coupled to two lift pinion gears 250 (one at each end thereof), and is coupled to a pair of base pinion gears 276.

The motor 270 is provided as part of the support structure 234. The underside of the carrier includes one or more perception systems on the underside thereof for detecting indicia on the markers 228. The bi-directional independently operable drive wheels 230 are controlled by motors in the carrier base 238.

The automated mobile carrier 212 may re-adjust its position within the base of the vertical structure 214 via actuation of either or both independently actuatable bi-directional drive wheels 230. The carrier 212 is able to be moved such that the lifting system remains below the lowermost ends 242 of the lift gear racks 240 during entry, repositioning and exit of the carrier 212 with respect to the vertical structure 214. In this way, the carrier 212 may position itself under the lift gear racks 240 such that the lift gear racks may be engaged by the lift gears 276.

With reference again to FIG. 38A, the carrier base 238 includes a chassis 60 with the wheels 230, wheel motors 256 and casters 232. The carrier base 238 also includes a base top 262 that includes four base gear racks 264 that extend upward form the base top 262. The base top 262 is secured to the top of the chassis 260. The support structure 234 includes a support structure base 263 and two multi-purpose drive shafts 274 that are driven by a single motor 270 via belts 272. With further reference to FIG. 38B, each multi-purpose drive shaft 274 includes two attached base pinion gears 250 (at ends thereof) and two attached lift pinion gears 276. The base pinion gears 276 (when powered by the motor 70), cause the support structure 234 to climb the base gear racks 264 of the carrier base 238, causing the support structure 234 to vertically separate from the carrier base 238.

Figure 39A:
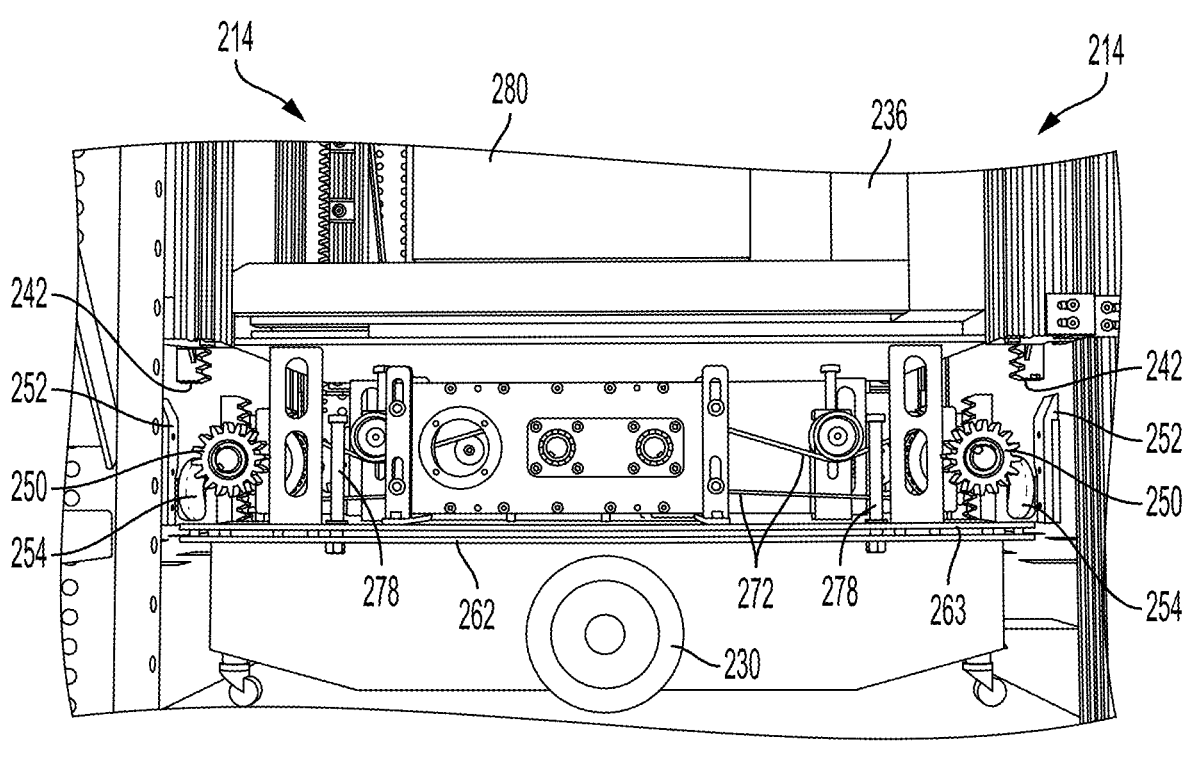
FIGS. 39A and 39B show illustrative diagrammatic side views of the automated mobile carrier of FIG. 37 showing the automated mobile carrier in a centered position for vertical engagement (FIG. 39A) and vertically engaging the vertical structure (FIG. 39B)
Figure 39B:
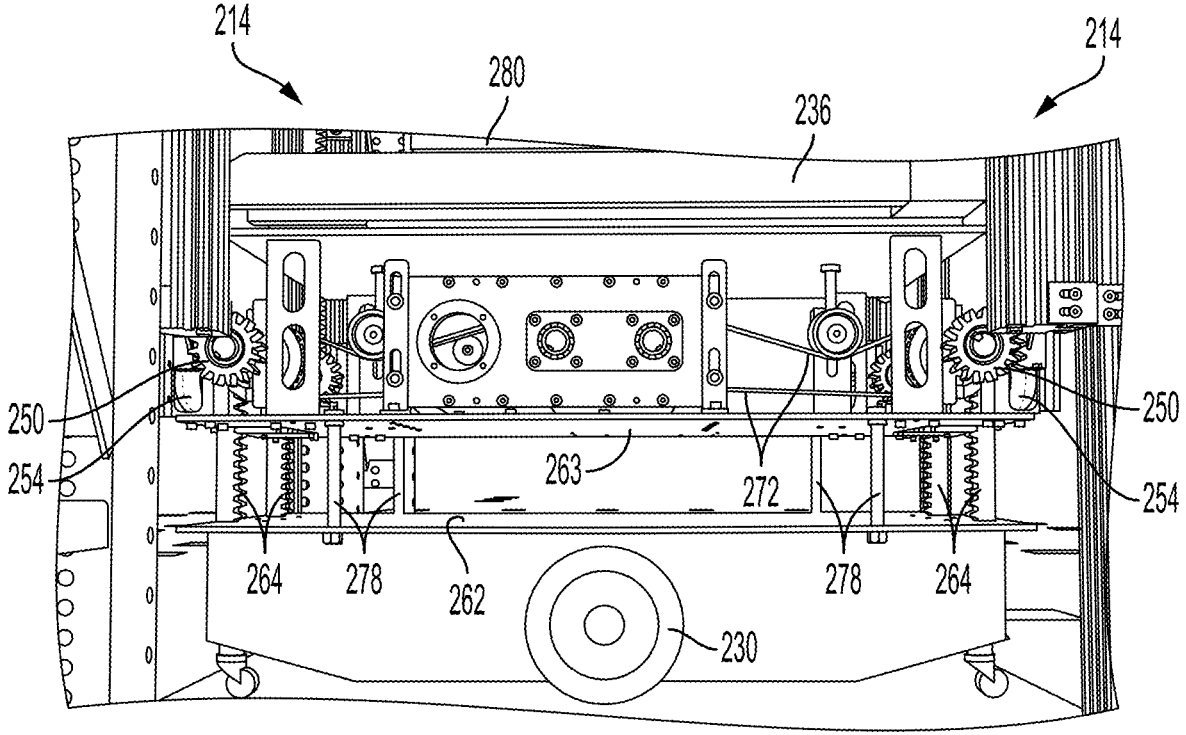

In particular, FIG. 39A shows the carrier 212 at the base of the vertical structure 214 with the support structure 234 of the carrier 212 resting on top of the carrier base 236. With reference to FIG. 39B, when the base pinion gears 276 are activated and climb the base gear racks 264, the support structure 234 vertically separates (lifts away) from the carrier base 236. The extent of separation is contained by capped slide rods 278, which maintain a maximum distance between the support structure 234 and the carrier base 238. Continued actuation of the lift pinions 250 (by the motor 270) causes the entire carrier 212 to rise along the lift gear racks 240.

The motor 270 drives the drive gear 271, which directly drives the side gear 273, which drives the side gear 275. Each of the side gears 273, 275 drives a belt 272 that engages and drives one of the multi-purpose drive shafts 274. In particular, when the motor runs in a first direction the drive gear runs clockwise, the side gear 273 runs counterclockwise and the side gear 275 runs clockwise. This causes the base pinion gears on each side to climb the base gear racks 264 causing the lift pinion gears to contact the lift gear racks, and continued rotation subsequently causes the lift pinion gears 250 to climb the lift gear racks 240 causing the carrier 212 to rise along the vertical structure 214. Running the motor 270 in an opposite second direction causes the lift pinion gears to lower the carrier 212 along the lift gear racks 240 of the vertical structure, and when the base pinion gears 276 contact the base gear racks 264, the support structure 234 is again brought into contact with the carrier base 238. The capped slide rods 278 terminate the separation of the support structure 234 from the carrier base 238 such that continued movement of the support structure 234 (via the lift pinion gears 250) causes the carrier 212 to rise along the lift rack gears 240.

The base pinion gears 276 climb the base gear racks 264 as driven by the motor via the belt 272. The support structure base 263 is initially in contact with the base top 262, and the support structure base is free to slide along the capped slide rods 278. When the base pinion gears 276 near the top of the base gear racks 264, the lift pinion gears 250 engage the lift gear racks 240. As the shafts 274 continue to rotate, the load of the carrier is lifted by the lift pinion gears 250 as they climb the lift gear racks 240. When the lift pinion gears 250 approach the lift gear racks 240, a tapered end of the slide guide 252 facilitates engagement of the pinion gears 250 with the racks 240, and as the pinion gears 240 travel along the racks 240, alignment is maintained, at least in part, by the slide guide 252 and the freely rotating roller guide 254.

With reference again to FIG. 35, each level of the shelving 220, 222, 224 includes a shuttle carrier 218 that moves objects to and from the automated mobile carrier 212 as well as to and from the shelving 216. Each shuttle carrier 218 is able to move along the shelving between two rows of shelves, and is able to rotate its payload receiving portion between positions facing each of the two opposing shelves as well as facing the automated mobile carrier 212. FIG. 35, for example, shows the shuttle carrier 218 on level 220 facing shelving in the foreground, shows the shuttle carrier 218 on level 222 facing the vertical structure 214, and shows the shuttle carrier 218 on level 224 facing shelving on the distal side (away from the foreground).

Each shuttle carrier may receive an object from a mobile carrier 218, move along a row between a plurality of shelving locations, and provide the object to any of the shelves on either side along the row. The mobile shuttle carriers 218 are also adapted to retrieve objects from the shelves and bring the retrieved objects to a mobile carrier 218. The system 210 may receive input objects and provide retrieved objects via the mobile carrier 218 that moves among the processing ends of each of the rows. Operation of the system (and all of the systems disclosed herein) may be provided by one or more computer processing systems 200 in communication with the mobile shuttle carriers 218 and the automated mobile carriers 212 herein described.

As discussed above, each mobile shuttle carrier (in accordance with an aspect of the invention) includes a mobile unit chassis with four wheels (e.g., two of which are powered by motors within the chassis housing as discussed above with reference to FIG. 3) for moving the carrier along rails that are mounted to the inner sides of the shelves. The position of each mobile shuttle carrier along the shelving is monitored by sensor systems on the carriers and the shelving. A payload receiving portion that includes tines is provided on a translation system for moving the payload with respect to a translation base. The translation base includes an attached gear that is driven by a rotation system with respect to the chassis. The tines are provided as two sets, each set of which is mounted for elevational movement by independent elevation actuation systems.

In accordance with certain aspects therefore, the system provides positioning of the shuttle tines such that they longitudinally aligned with valleys in the shelving of the shelf system. In accordance with further aspects, the system may separate areas of the shelving (aisles, vertical levels, longitudinal bays) by package size and the position is less variable in the longitudinal direction. In these cases the tines must still align but the one for one relationship of tine to valley is not as important where, for example, a subset of the shuttles within the fleet may only see large packages for instance and can have wider spacing of the payload tines and interface at 5× the shelf pitch.

Figure 40:
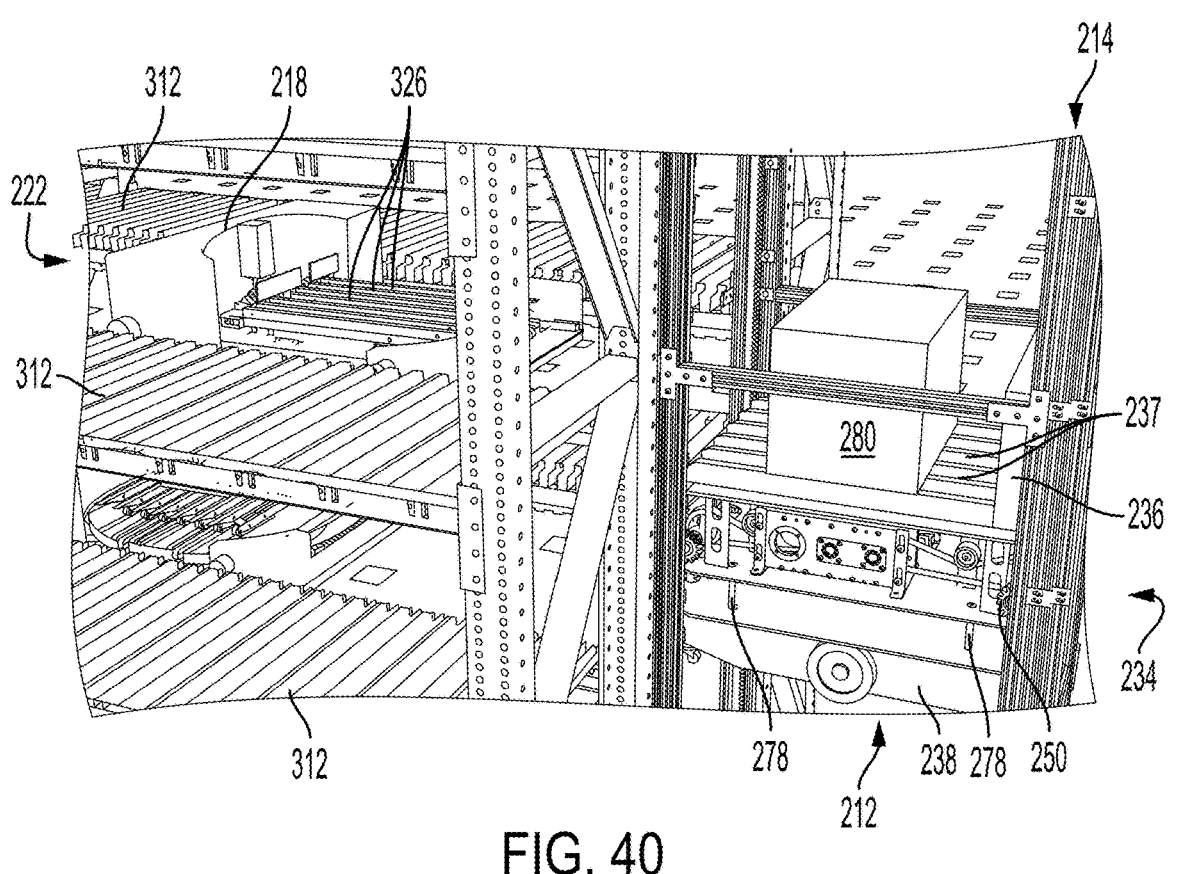
FIG. 40 shows an illustrative diagrammatic exploded view of the automated mobile carrier of FIG. 37 having been raised to an elevated position in the vertical structure.

As described above, the rotation of the shafts 274 causes the mobile carrier 212 to move upward and downward along the lift gear racks 240 as driven by the lift gears 276. FIG. 40 shows the mobile carrier 218 having risen along the lift gear racks 240 carrying an object 280 to a position that is adjacent the middle shelf level 222. Note that the shuttle carrier 218 of the shelf level 222 includes a payload receiving portion with tines 326 that are rotated to face the mobile carrier 212. The tines 326 may be lowered such that as the shuttle carrier 218 approaches the mobile carrier 212 the tine 326 pass between the support ribs 237 of the payload receiving portion 236.

Figure 41A:
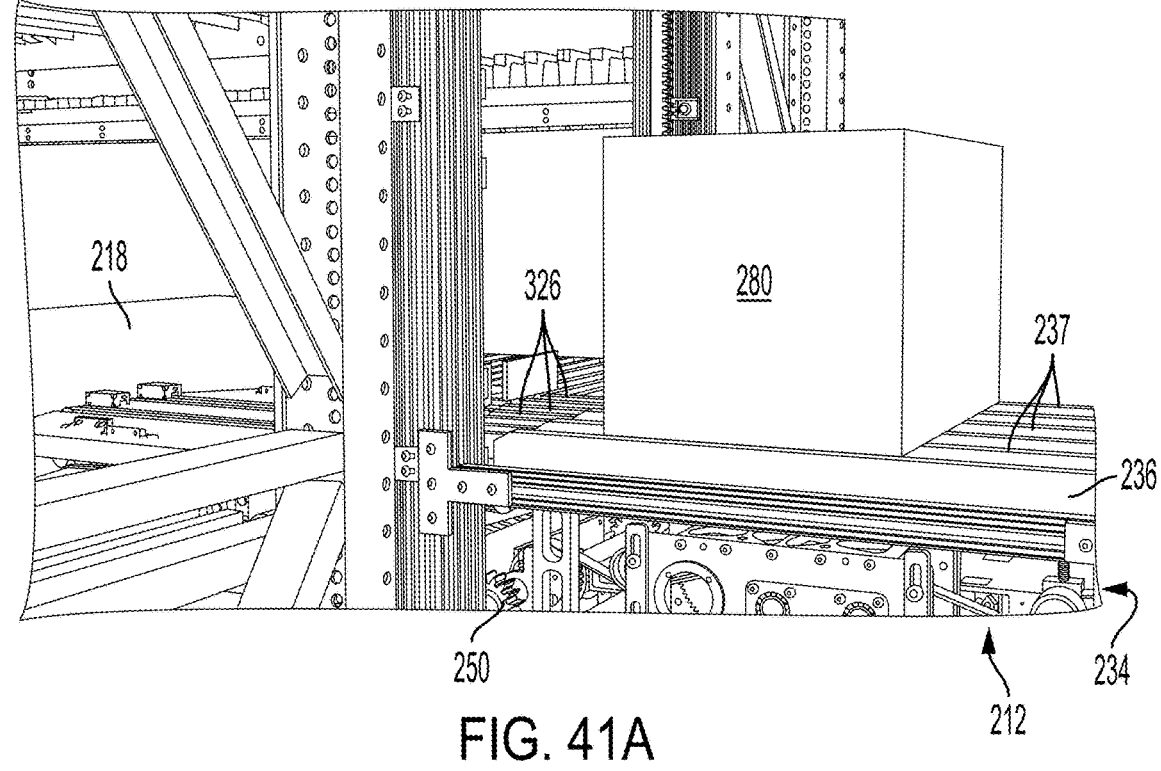
FIGS. 41A-41C show illustrative diagrammatic enlarged views of the automated mobile carrier of FIG. 40 showing the mobile shuttle unit approaching the automated mobile carrier (FIG. 41A), showing the mobile shuttle unit having engaged an object on the automated mobile carrier (FIG. 41B), and showing the mobile shuttle unit having drawn the object from the automated mobile carrier onto the mobile shuttle unit (FIG. 41C)
Figures 41B, 41C:
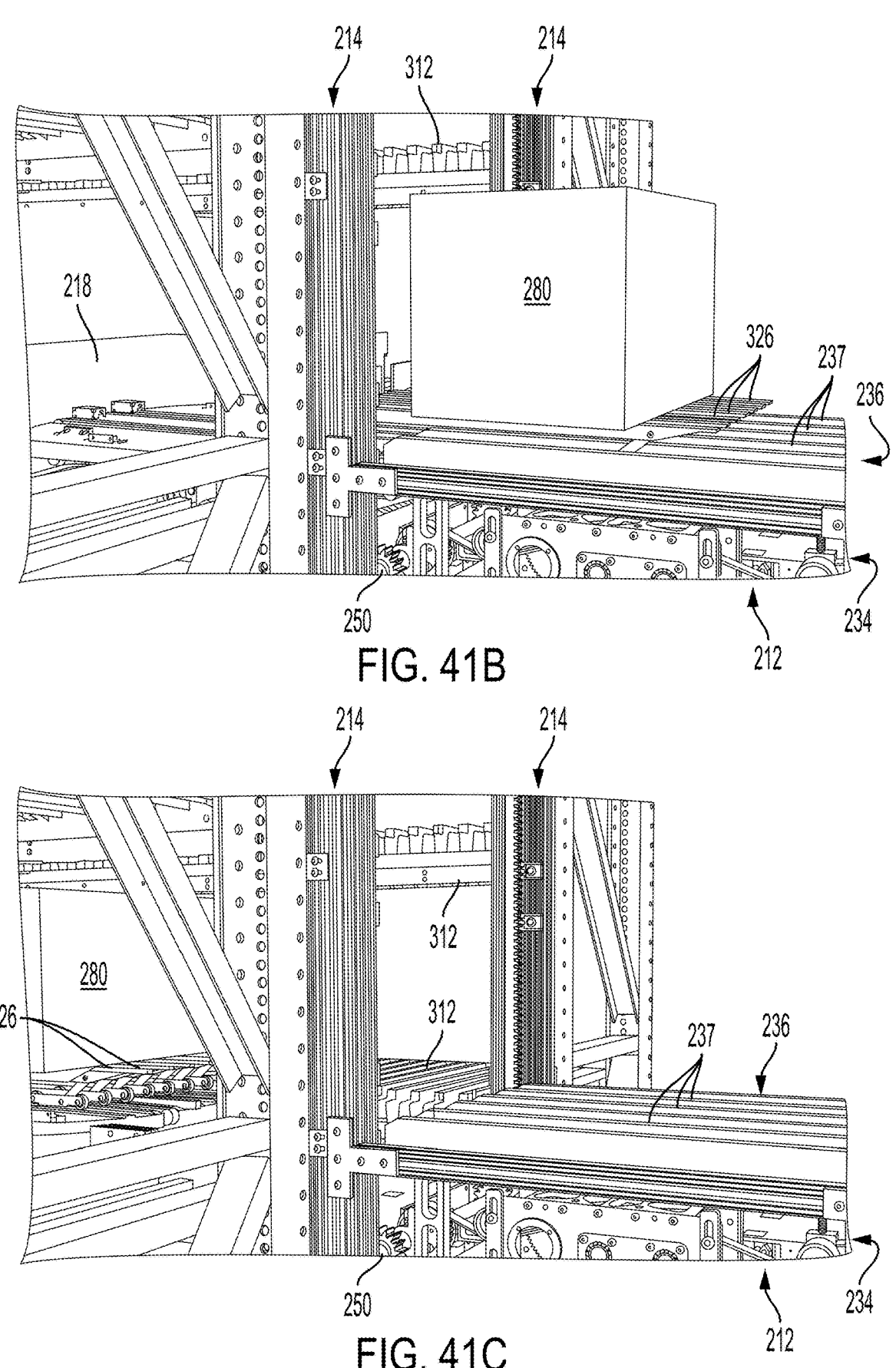

FIG. 41A shows the tines 326 in a lowered position, and FIG. 41B shows the tines 326 as having been raised, thereby shifting the load to the object 280 onto the tines 326. Placing an object onto a mobile carrier involves the reverse process (raising the tines, moving between the support ribs, and lowering the tines). FIG. 41C shows the object 280 having been transferred to the mobile carrier 2318 for delivery to a storage location among the plurality of shelves 12. In the lowered position, the tines 326 are at an elevation below a crest height of the adjacent shelving 312 as well as the support ribs 237 of any adjacent mobile carrier 212. In the raised position, the tines 326 are above the crest height of the adjacent shelving 312 and the support ribs 237 of any adjacent mobile carrier 212. The shelving may be provided in a roughly corrugated form, providing alternating crests and valleys. The translation system 352 may be engaged to extend the payload into the corrugated shelf 312 (either above the shelf or interleaved between the crests) to deposit objects onto the shelf 312 or retrieve objects from the shelf 312. The payload receiving portion 350, translation system 352 and translation base 354 may be rotated 90 degrees in either direction from center (facing a mobile carrier 218) by the rotation system 358 (e.g., for loading or distribution with respect to the shelves 312.

The tines 326 are each supported by runners, and the runners each includes one or more lead rollers. The corrugated shelf includes crests 13 and valleys 11 (shown in FIG. 9B), and the runners are aligned with and enter the valleys 11 such that the lead roller(s) enter the valleys 11 of the shelf and begin to distribute the load to the shelf during transfer. The corrugated shelves may be continuous (as shown) or discontinuous (e.g., formed of disconnected u-shaped troughs) along the shelf direction. The payload receiving tines 326 becomes extended into the shelf 312 by the translation system as discussed above. The payload receiving tines 326 may be extended in an elevated position when an object is being placed onto the shelf (and then lowered when withdrawn) or may be extended in a lowered position when removing an object from the shelf (and then raised when withdrawn).

The tine elevation actuation systems are independently actuatable to raise either a first set of associated tines and/or a second set of associated tines. Actuation is provided by a pair of cams one of which may be urged against a first cam follower of a first rocker base, and the other of which may be urged against a second cam follower of a second rocker base. Actuation of the cams is provided by a motor system with the cams mounted on a double ended shaft. When a rocker base is pushed down, an associated set of tines is raised.

Each mobile shuttle unit therefore provides rotational adjustment of its payload, elevational adjustment of its payload and translational adjustment of its payload. Because the system records where objects are placed, the system has a record at all times of all objects locations on the shelves. One payload elevation system for example, may be used with multi-position cams to provide segmented elevation of the payload tines. This permits greater flexibility in handling and placing differently sized objects onto the shelfs, freeing the system from using oversized designated discrete storage locations. Smaller objects may thereby be stored closer together. This concept can be referred to as longitudinally heterogeneous storage.

Again, FIG. 40 shows the mobile carrier 212 being lifted while a shuttle carrier 218 is approaching a loading area, and FIG. 41A shows the mobile carrier 312 and the shuttle carrier 18 at the loading area. Also in FIG. 41A, the tines 326 of the shuttle carrier 218 are lowered, and are inserted into the payload supporting portion 236 between the ribs 237. With reference to FIG. 41B, when the tines 326 are raised (by the rotation of the cams 366, 368, the object 280 is lifted and supported instead by the tines 326. As shown in FIG. 41C, the tines 326 are drawn back inward of the shuttle carrier 218 bringing the payload object 280 with them. The tines 326 may then be lowered or (preferably) remain in the raised position as the shuttle carrier 218 is moved along the rails 344 to the designated destination shelf location. The rotational system 352 is then engaged to turn the payload to align the free ends of the tines 326 toward the destination location shelf (which is either of the opposing side shelves 312). The shuttle carrier 218 turned toward a first side shelf 312 for moving the object 80 to the right side (as shown) shelf. The shuttle carrier 218 turned toward a left side (as shown) shelf 312 and having moved the raised tines into the left side shelf for moving the object 280 to a second opposite side shelf.

Figure 42A:
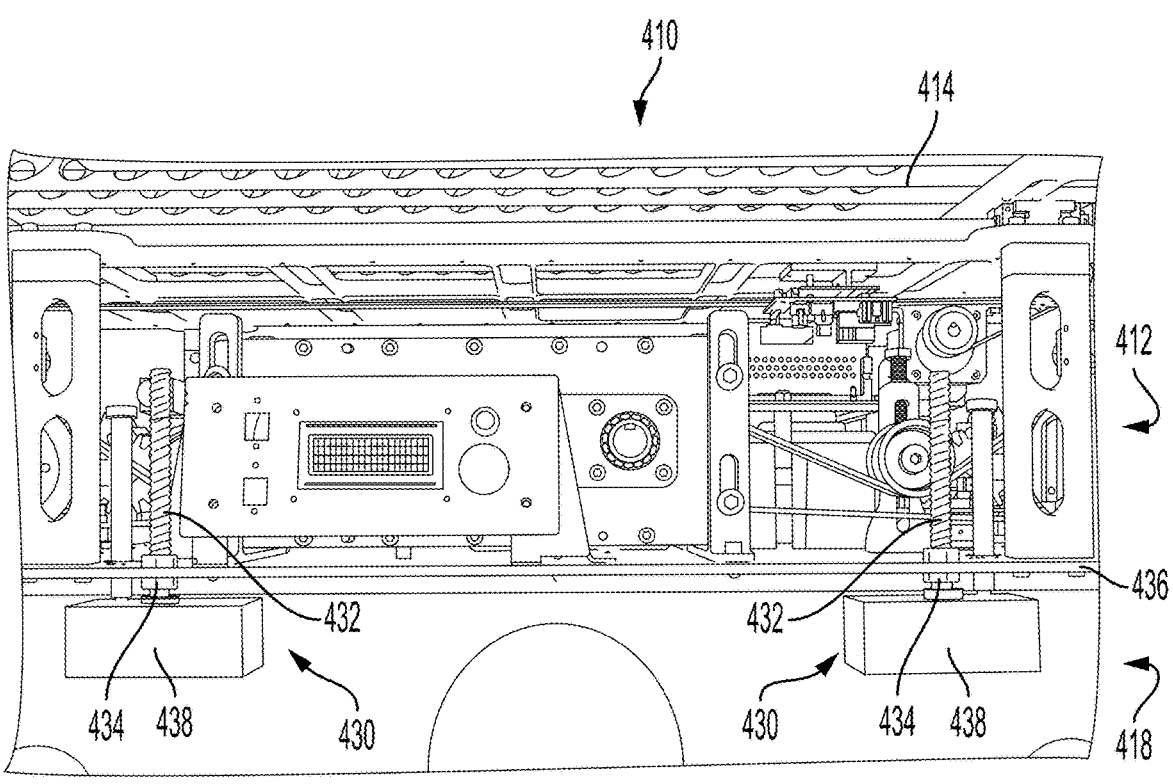
FIGS. 42A and 42B show illustrative diagrammatic enlarged views of a portion of the automated mobile carrier of FIG. 40 showing a support structure that is lowered with respect to a base of the automated mobile carrier (FIG. 42A) and showing the support structure as raised with respect to the base (FIG. 42B)
Figure 42B:
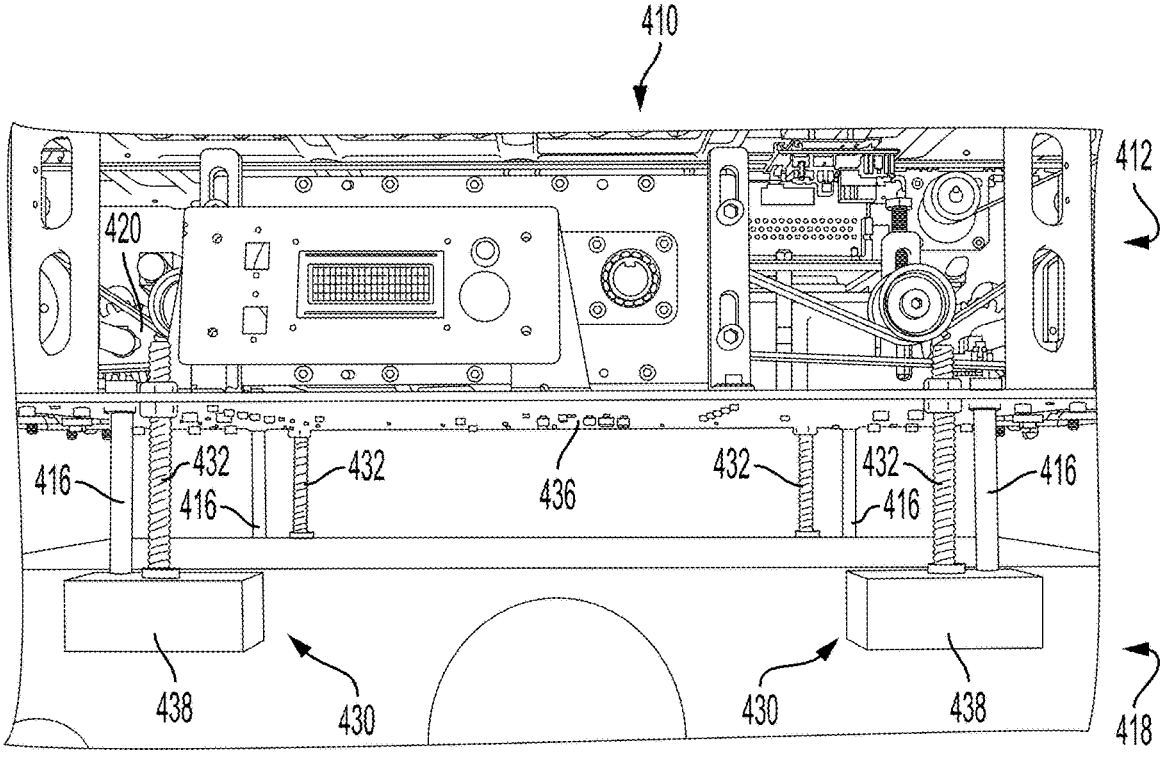

FIGS. 42A, 42B show an automated mobile carrier 410 in accordance with another aspect of the present invention that includes a support structure 412 with a payload receiving portion 414 that may be raised and lowered with respect to a carrier base 418 as optionally guided (at least in part) by capped slide rods 416. Once raised, lift pinion gears 420 engage lift rack gears of a vertical structure, and move along the vertical structure as guided by slide guides 122 and roller guides 124 as discussed above. The carrier 410 also includes screw drive systems 430 (e.g., four screw drive or ball screw systems). Each screw drive system 430 includes a screw 432 and a fitted drive nut 434 (e.g., threaded or provided with bears that serve as threads). The drive nuts 434 are fixed to the support structure floor 436, and when the screw drive power system turns each screw 432, the drive nuts 434 urge the support structure floor 436 (and entire support structure 412) upward. Reversing the direction of rotation of the screws 432 returns the support structure to the lower position with respect to the carrier base 418. FIG. 42A shows the support structure 412 in the lowered position with respect to the carrier base 418, and FIG. 42B shows the support structure 412 in the raised position with respect to the carrier base 418. When the support structure 412 is raised, the lift pinion gears 420 engage lift rack gears of a vertical structure and move along the vertical structure as guided by slide guides 422 and roller guides 424 as discussed above. Further, the raising (and lowering) of the support structure relative the carrier base using the screw drive systems 430 is also used to move objects between the carrier and a floor shelf as discussed above with reference to FIGS. 39-41C.

Figure 43A:
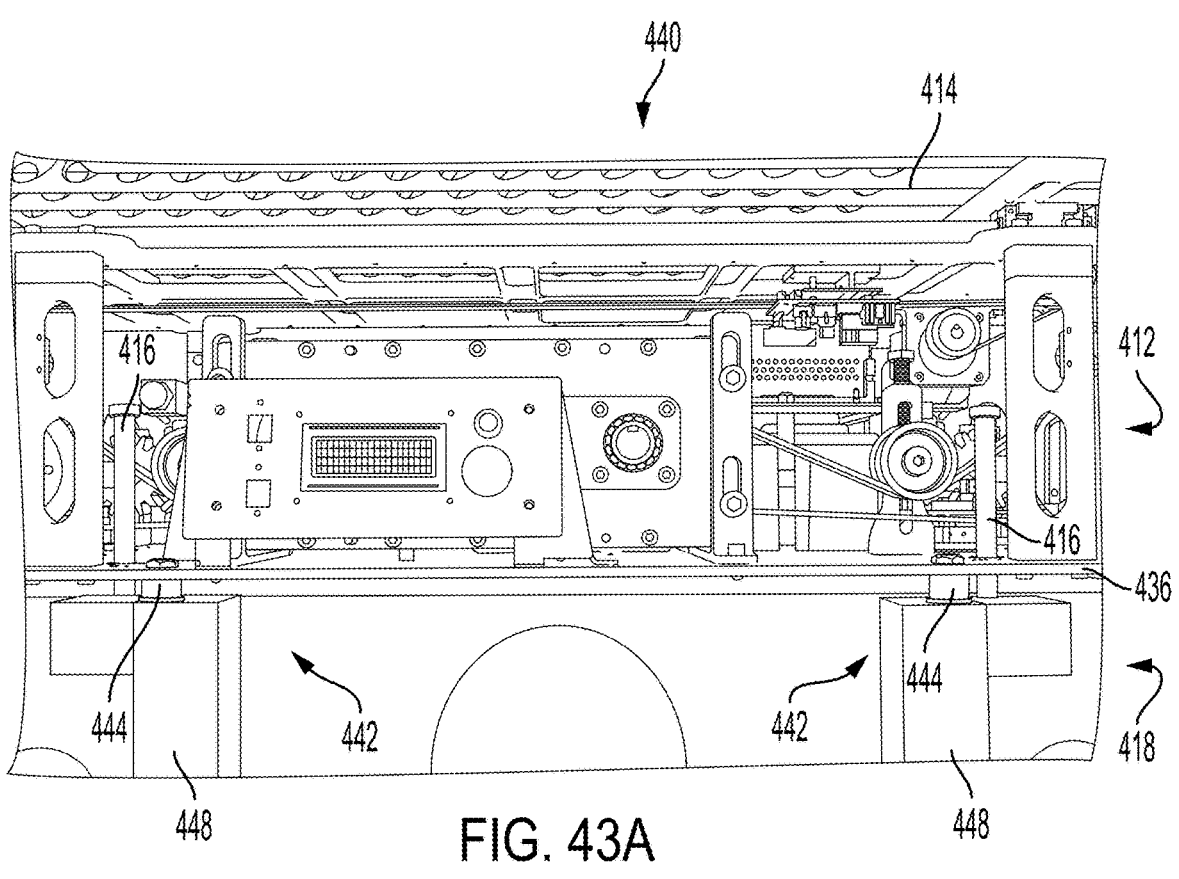
FIGS. 43A and 43B show illustrative diagrammatic enlarged views of a portion of an automated mobile carrier in accordance with another aspect of the invention that includes vertical linear drive systems showing a support structure that is lowered with respect to a base of the automated mobile carrier (FIG. 43A) and showing the support structure as raised with respect to the base (FIG. 43B)
Figure 43B:
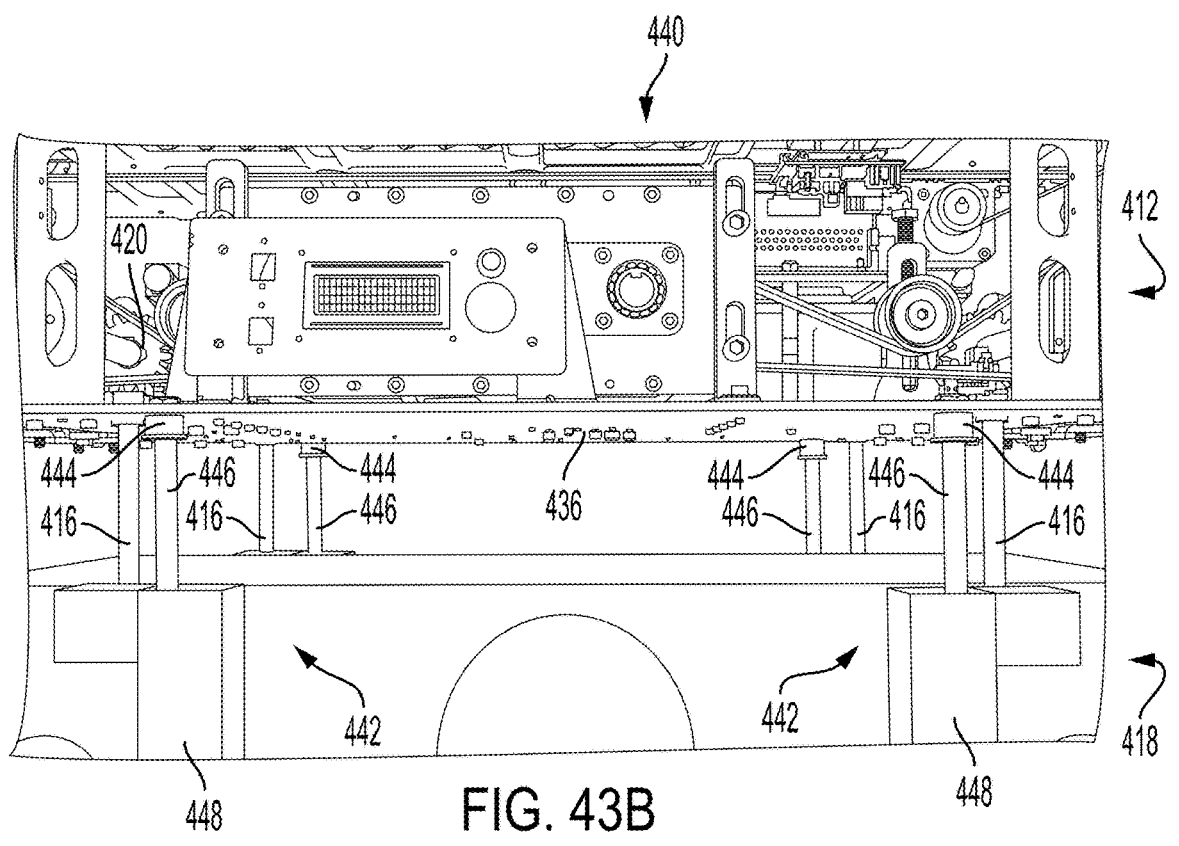

FIGS. 43A, 43B show an automated mobile carrier 440 in accordance with another aspect of the present invention that similarly includes a support structure 412 with a payload receiving portion 414 that may be raised and lowered with respect to a carrier base 418 as optionally guided (at least in part) by capped slide rods 416. Once raised, lift pinion gears 420 engage lift rack gears of a vertical structure, and move along the vertical structure as guided by slide guides 122 and roller guides 124 as discussed above. The carrier 440 also includes linear drive systems 442 (e.g., four linear drive systems). Each linear drive system 442 includes a linear drive rod 446 (shown in FIG. 43B), the distal end of which 444 is fixed to the support structure floor 436 and the proximal end is within a linear drive power control system 448. When the linear drive power system drives the rod 446 upward, the ends 444 urge the support structure floor 436 (and entire support structure 412) upward. Reversing the power of the drive power system 448 returns the support structure to the lower position with respect to the carrier base 418. FIG. 43A shows the support structure 412 in the lowered position with respect to the carrier base 418, and FIG. 43B shows the support structure 412 in the raised position with respect to the carrier base 418. When the support structure 412 is raised, the lift pinion gears 420 engage lift rack gears of a vertical structure and move along the vertical structure as guided by slide guides 422 and roller guides 424 as discussed above. Further, the raising (and lowering) of the support structure relative the carrier base using the linear drive systems 442 is also used to move objects between the carrier and a floor shelf as discussed above with reference to FIGS. 39-41C.

Figure 44A:
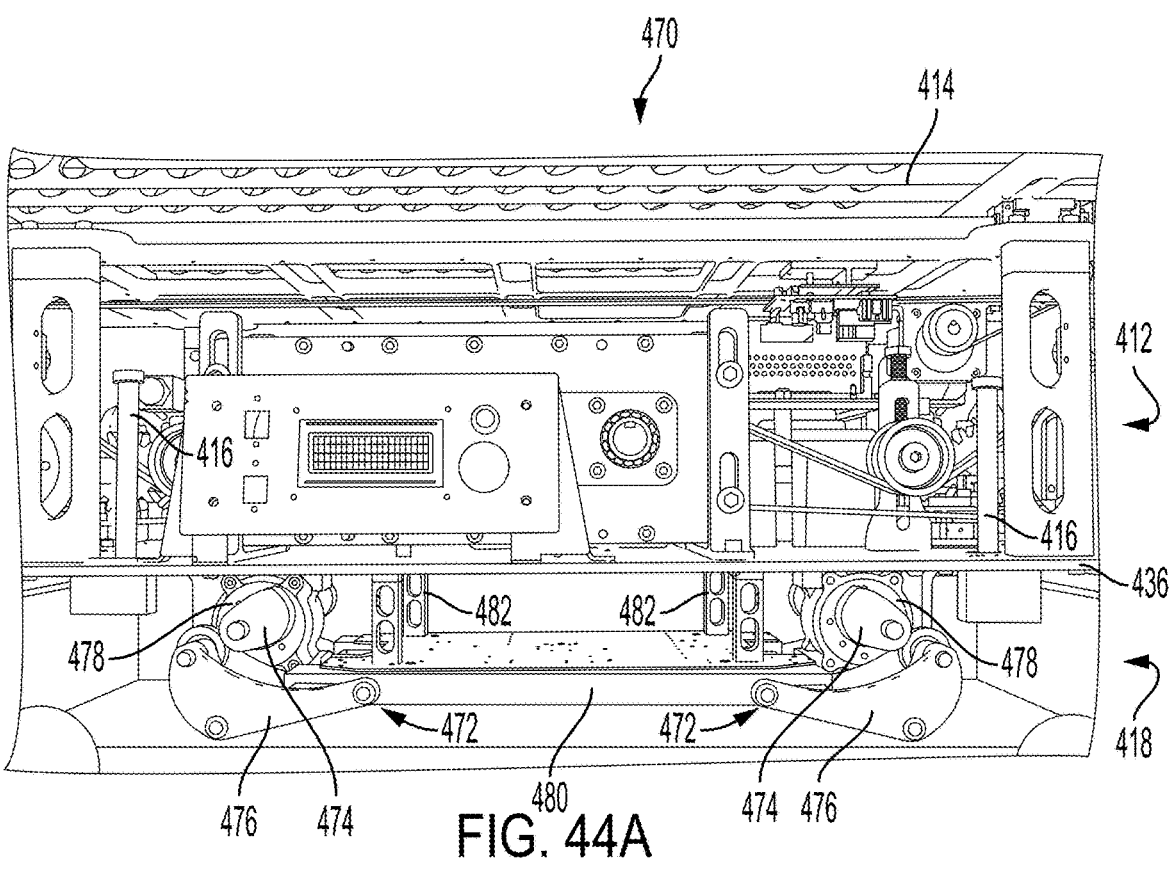
FIGS. 44A and 44B show illustrative diagrammatic enlarged views of a portion of an automated mobile carrier in accordance with another aspect of the invention that includes cam elevation systems showing a support structure that is lowered with respect to a base of the automated mobile carrier (FIG. 44A) and showing the support structure as raised with respect to the base (FIG. 44B)
Figure 44B:
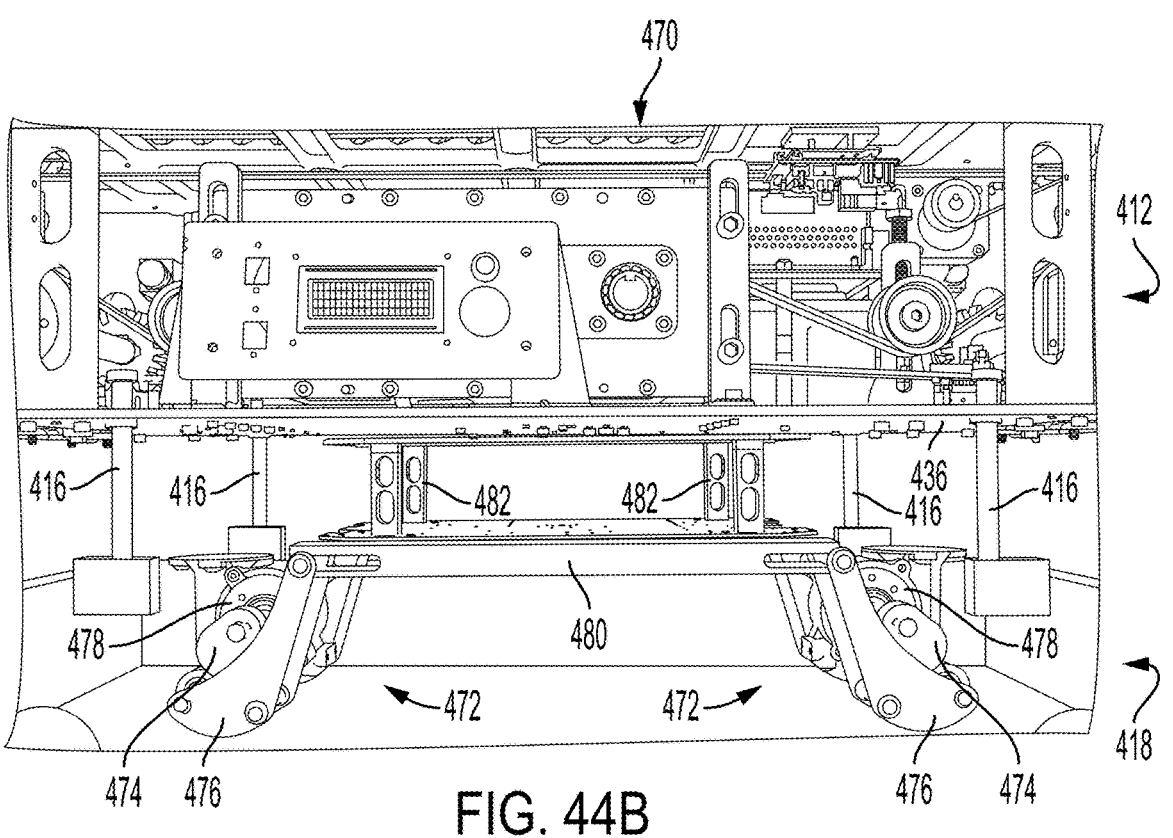

FIGS. 44A, 44B show an automated mobile carrier 470 in accordance with another aspect of the present invention that similarly includes a support structure 412 with a payload receiving portion 414 that may be raised and lowered with respect to a carrier base 418 as optionally guided (at least in part) by capped slide rods 416. A side wall portion of the carrier base is removed to show the lifting system within discussed below. Once raised, lift pinion gears 420 engage lift rack gears of a vertical structure, and move along the vertical structure as guided by slide guides 122 and roller guides 124 as discussed above. The carrier 470 also includes cams 474 that are urged against followers attached to rockers 476. The cams 474 are rotated by drive systems 478. The ends of the rockers 476 are attached to cross beams 480 that support a sub-support structure 482 that in turn supports the support structure 412. FIG. 44A shows the cams 474 rotated such that the rockers are positioned to permit the cross beams 480, sub-support structure 482 and support structure 412 to remain in a lowered position. FIG. 44B shows the cams 474 rotated such that the rockers urge the cross beams 480 upward, which lifts the sub-support structure 482 and the support structure 412. Using the motor 478, the cams are used to lift and lower the support structure 412 with respect to the carrier base 418. Again, when the support structure 412 is raised, the lift pinion gears 420 engage lift rack gears of a vertical structure and move along the vertical structure as guided by slide guides 422 and roller guides 424 as discussed above. Further, the raising (and lowering) of the support structure relative the carrier base using the linear drive systems 442 is also used to move objects between the carrier and a floor shelf as discussed above with reference to FIGS. 39-41C. In accordance with an aspect, the automated mobile shuttle includes, for example, a mobile base unit for moving the automated mobile shuttle in at least one direction, a payload for supporting at least one object on a payload receiving portion, a payload rotation system for rotating the payload receiving portion about a first axis that is orthogonal with respect to the at least one direction of movement of the automated mobile shuttle, a payload translation system for translating the payload in at least a second direction that is orthogonal with respect to the first axis; and a payload elevation system for raising and lowering either the payload surface receiving portion along a third direction that is parallel with the first axis. In accordance with an aspect therefore, the system provides four major axes of motion, including drive movement of the carrier, rotation of the payload, extension of the payload and lifting of the payload. The degrees of freedom among the major axes of motion yields flexibility in providing longitudinally heterogenous storage as discussed herein.

Mobile shuttle position feedback (sometimes referred to as localization) can be achieved by many means familiar to those in the field of mobile robotics, which include but are not limited to measures of odometry, integrated calculation using inertia feedback from measurement units (IMU), unique localization markers (sometimes referred to as fiducials), non-unique localization markers with area markers/homing positions (e.g., counting pulses from regularly spaced flags), or even fixed point continuous measurement such as time-of-flight laser sensors, or multi-beacon triangulation.

It is further understood that even with mobile shuttles that engage a rack system, the shuttles (including in some cases shuttle-lift-transports) may leave the racks altogether to perform a package exchange or other operation outside the racks. Additionally, the choice of drive should pair with the choice of localization technology as well as the previously mentioned additional mobilities outside the captive-rails embodiment to achieve the overall system goal.

In accordance with various aspects, the system provides versatility of payload handing using a multitude of closely pitched tines that have the ability to interface favorably with almost any package wider than 2× the tine pitch. Moreover, the design can be scaled up or down to accommodate differing environments. For example, the tines may be pitched closer together to handle even small objects or significantly farther apart for consistently large objects. In accordance with an aspect, the smallest objects may be a least 3 inches or 5 inches in its shortest dimension. With this aspect smaller objects would be transportable when grouped into larger carrying units (e.g., in boxes, bins, trays or totes).

In accordance with a further aspect, the invention provides a shuttle carrier payload portion that includes a roller tip that shares the load after lift during extraction between the rollers resting on the shelf valleys and the guide or rollers within the shuttle body. The same load sharing occurs during shelf insertion and exchanges with system level induct and discharge devices. This strategy that provides support from two ends is significant with regard the components selection for a given load.

Figure 45:
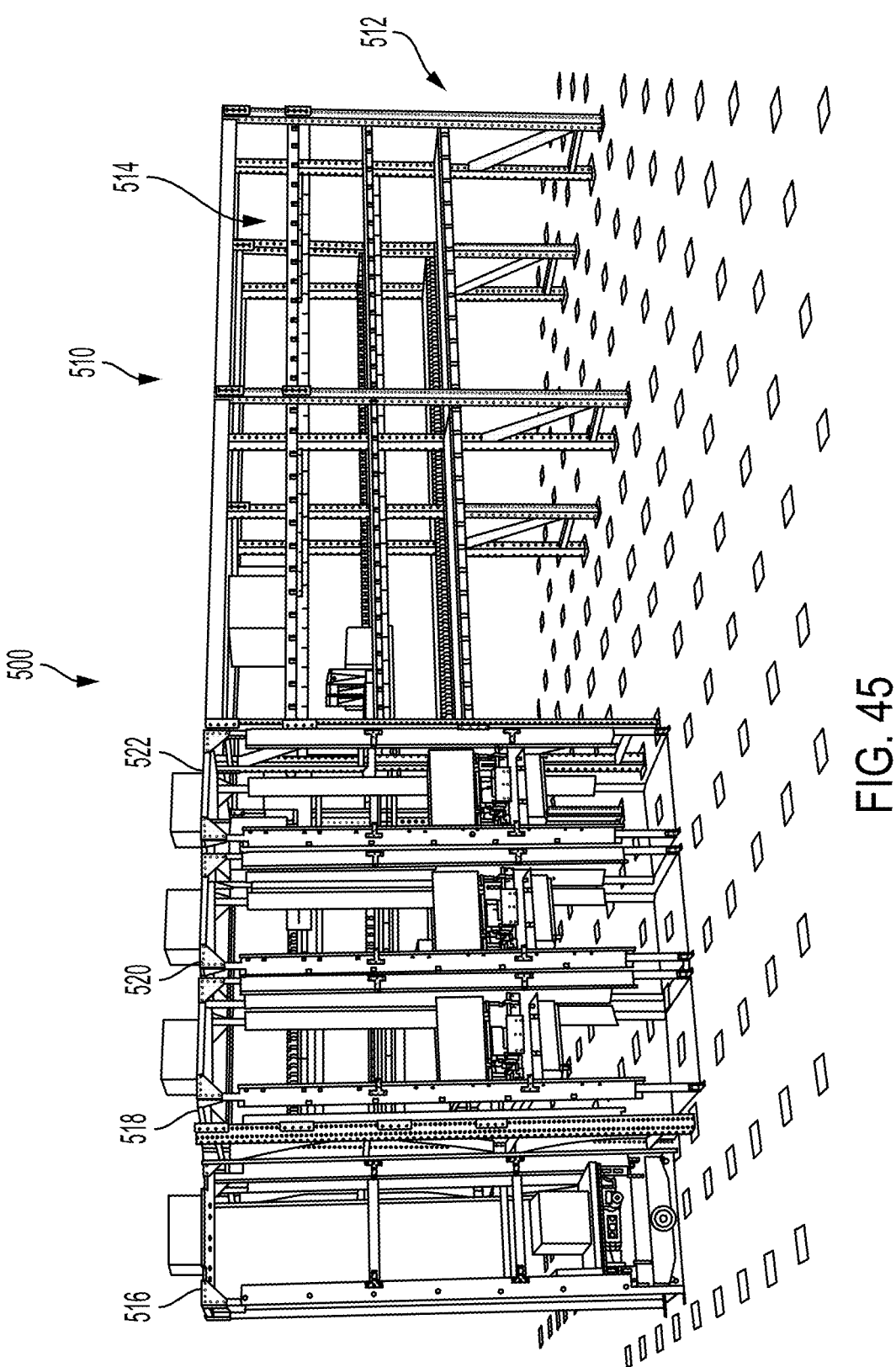
FIG. 45 shows an illustrative diagrammatic side view of an object processing system in accordance with a further aspect of the present invention that includes a plurality of vertical structures that may be used for storage of objects.
Figure 46:
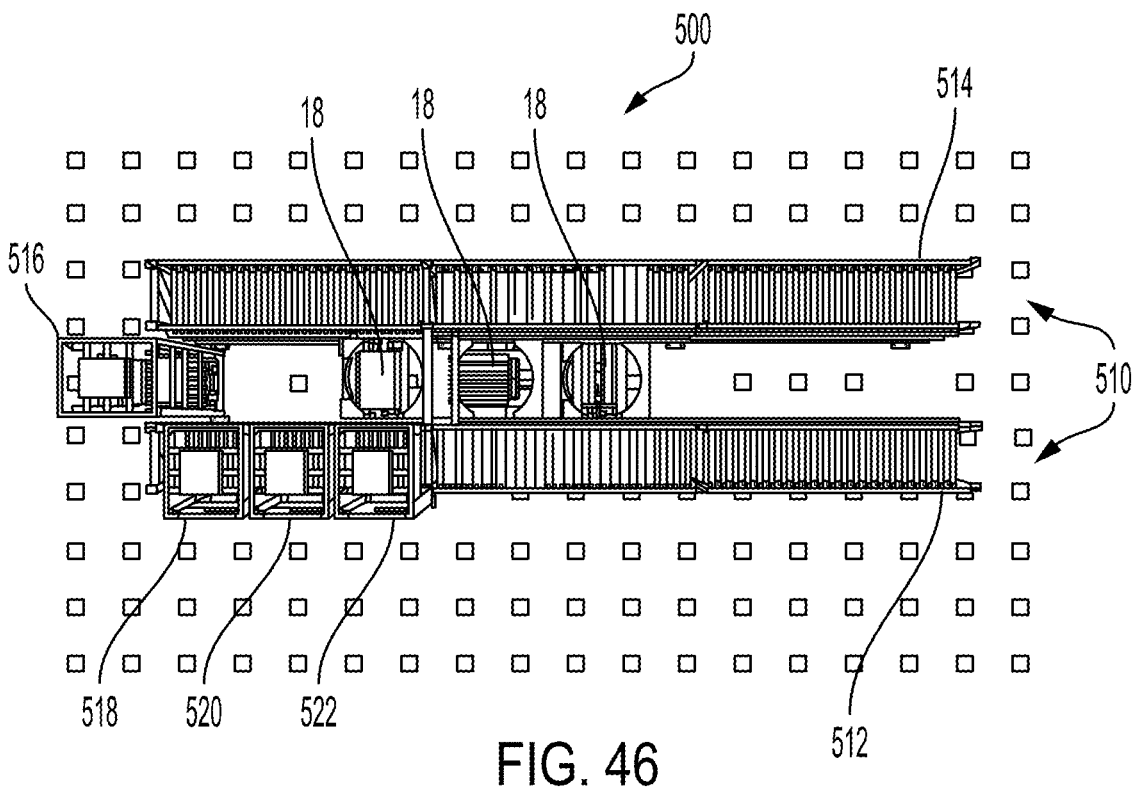
FIG. 46 shows an illustrative diagrammatic top view of the object processing system of FIG. 45.
Figure 47:
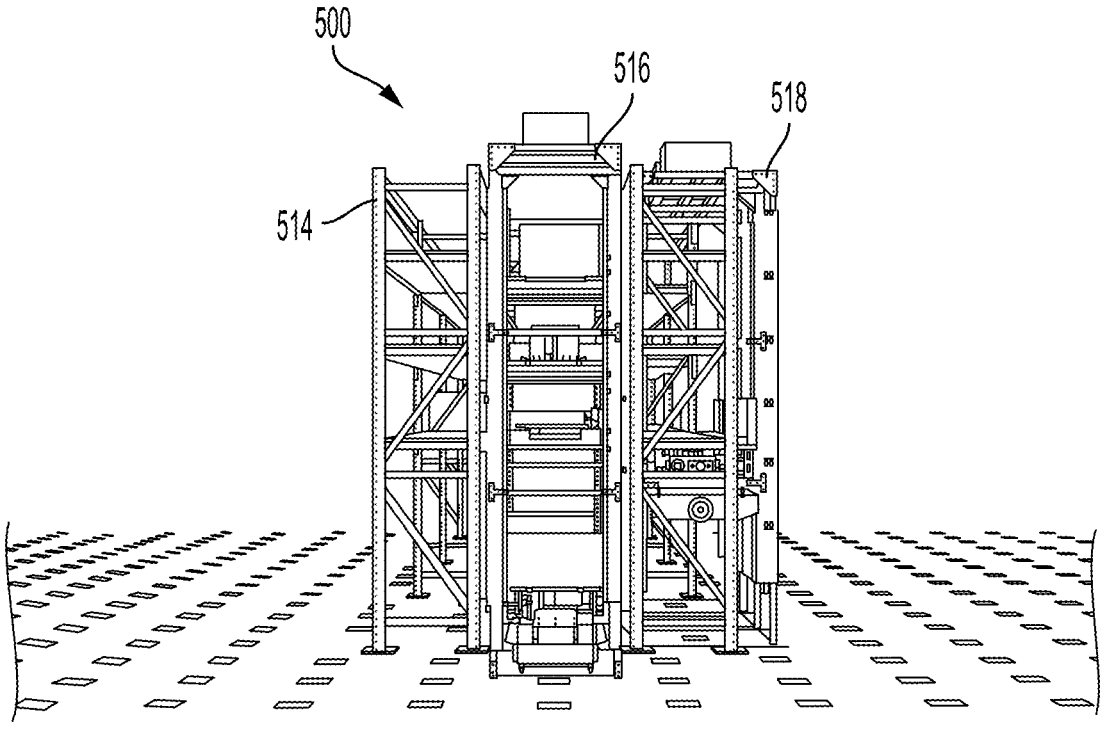
FIG. 47 shows an illustrative diagrammatic end view of the object processing system of FIG. 45.
Figure 48:
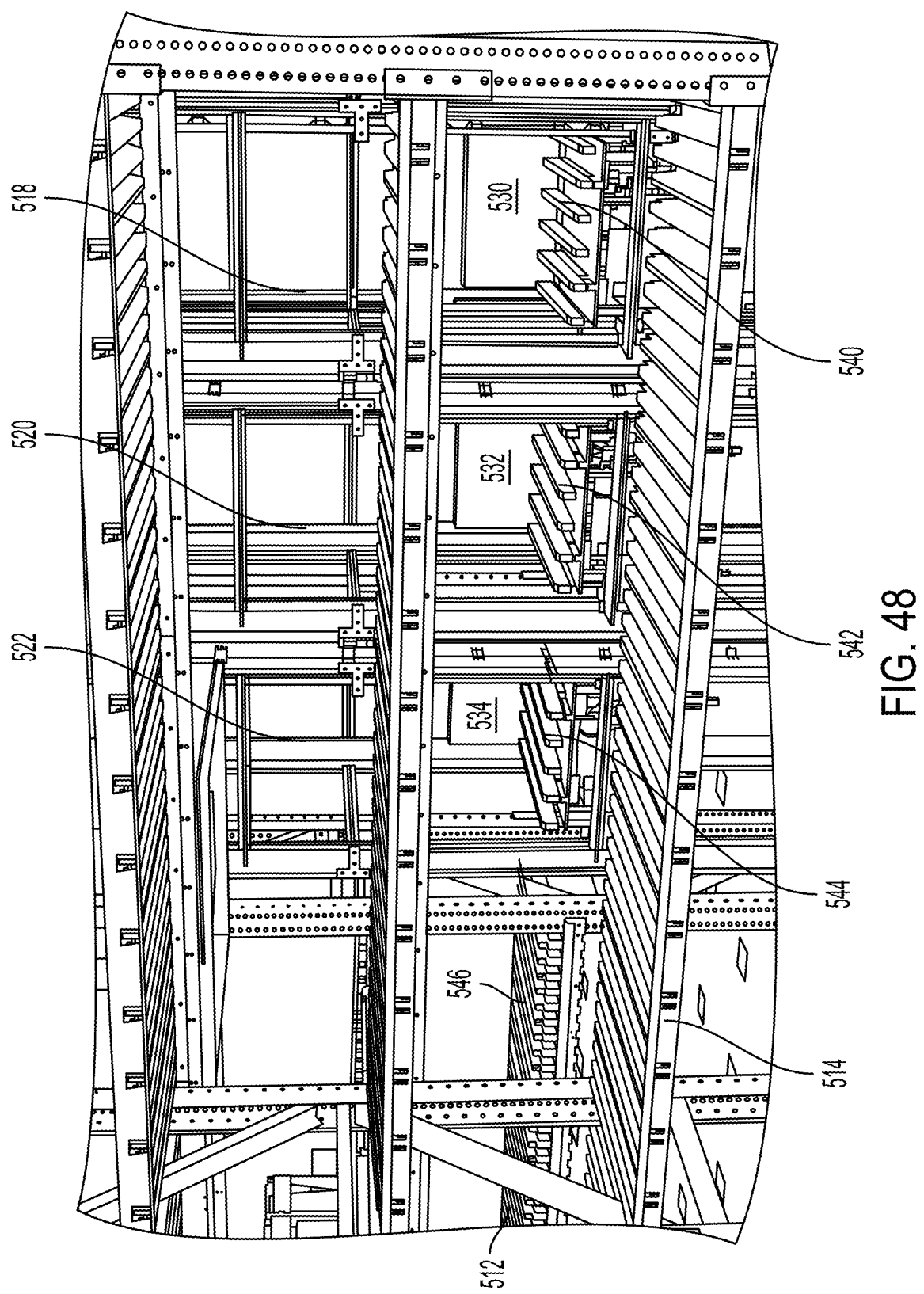
FIG. 48 shows an illustrative diagrammatic enlarged side view of a portion of the object processing system of FIG. 45.

As discussed above, the vertical lift structure (e.g., 14, 314) may be provided at the end of a set of mutually facing shelving (as shown in FIGS. 1 and 27). In accordance with further aspects, the sets of shelving may include vertical lift structures in other arrangements with shelves or sets of shelves. For example, FIG. 45 shows an object processing system 500 that includes a set 510 of mutually facing shelving 512, 514. The system 500 includes a first vertical lift structure 516 as discussed above, as well as additional vertical lift structures 518, 520, 522. Each of the vertical lift structures 516, 518, 520, 522 is able to receive an automated mobile carrier as discussed above with reference to the vertical lift structure 14, 314. FIG. 46 shows a top view of the system 500, and FIG. 47 shows an end view of the system 500. The use of multiple vertical lift structures may increase throughput of objects to and from the shelving 512, 514. Additionally, and as shown in FIG. 48, when an automated mobile carrier is positioned within a vertical lift structure, the carrier itself may function as a shelf (e.g., when not needed for moving objects. FIG. 48 shows carriers 530, 532, 534 within vertical lift structures 518, 520, 522 respectively, and the carriers 530, 532, 534 are positioned such that their payload receiving portions 540, 542, 544 are level with a shelf level 546 of shelving 512. The payload receiving portions 540, 542, 544 may function as shelves (exchanging objects with automated shuttle carriers 18 (shown in FIG. 46) in this way until needed for transport.

Figure 49:
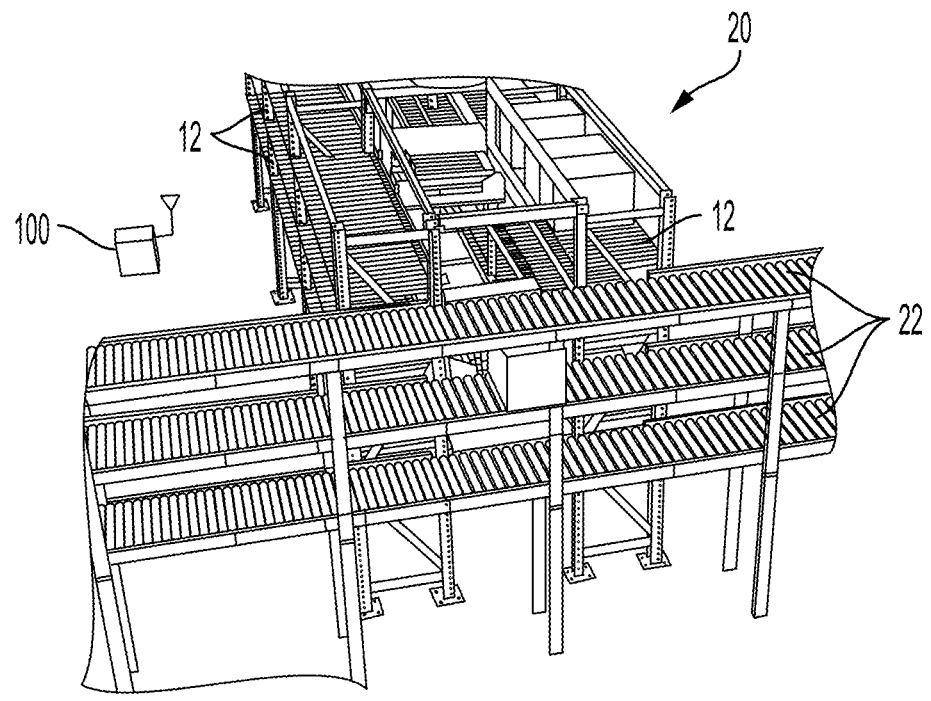
FIG. 49 shows an illustrative diagrammatic view of an object processing system in accordance with another aspect of the present invention that includes a plurality of processing conveyors to feed objects in place of an elevation system at the shelving system.
Figure 50:
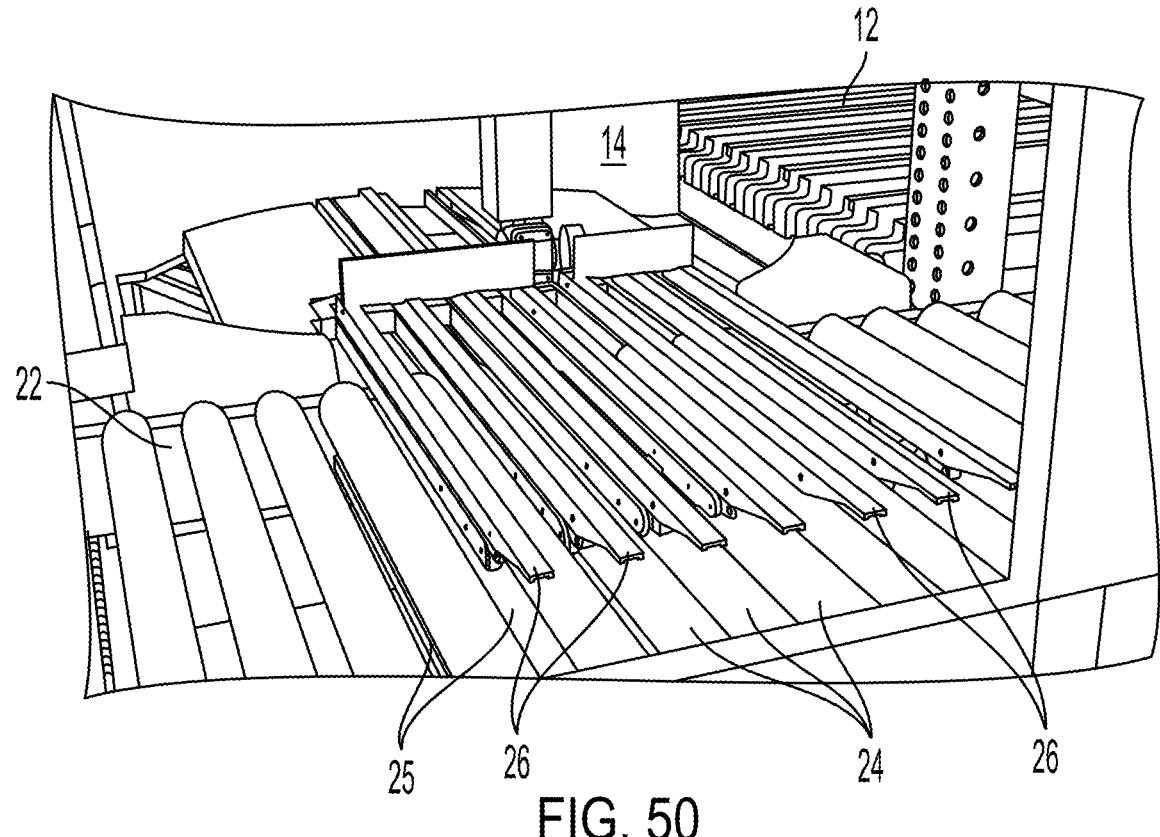
FIG. 50 shows an illustrative diagrammatic enlarged view of a portion of the mobile shuttle unit payload engaging a portion of the plurality of processing conveyors of FIG. 49.
Figure 51:
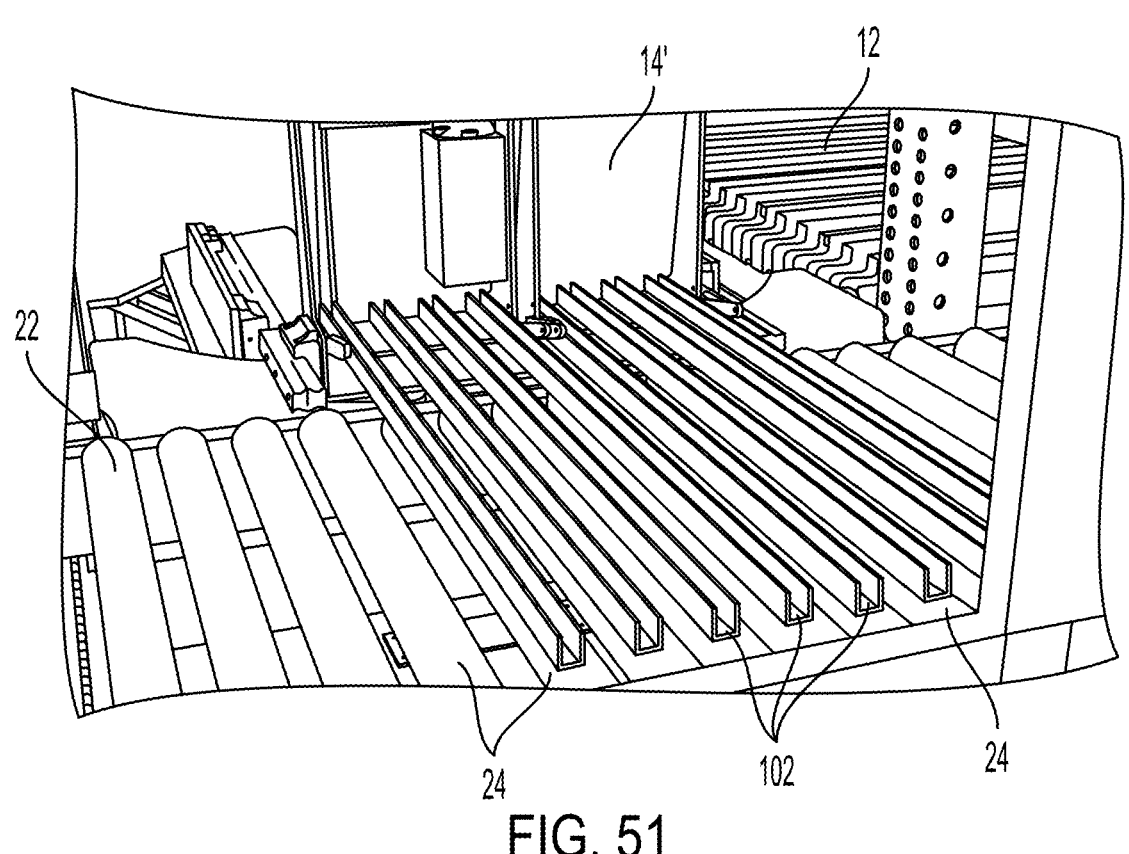
FIG. 51 shows an illustrative diagrammatic enlarged view of a portion of the payload of the mobile shuttle unit of FIG. 15 engaging a portion of the plurality of processing conveyors of FIG. 49.

FIG. 49 shows a system 20 that may receive input objects and provide retrieved objects via any of plurality of processing conveyors 22, each of which is associated with a level of the plurality of levels of rows of shelves. With further reference to FIG. 50, which shows an enlarged portion of the interchange between a mobile shuttle unit 14 and a processing conveyor 22, the tines are sized to also fit between adjacent rollers 24 of the processing conveyor 22. Similar to the interchange between the mobile shuttle units 14 and the shelves 12, the mobile shuttle units 14, 14' may retrieve objects from and place objects onto the processing conveyors 22 by lowering the tines 26 (while holding an object) between the rollers, and by advancing the tines between the rollers horizontally and then raising the tines to lift the object from the rollers. This is shown as detailed in FIG. 50 using shuttle unit 14 with a plate 25 forming a surface (e.g., the valley) under the rollers 24 against which the lead rollers engage. FIG. 51 shows the shuttle unit 14' positioning tines 102 between rollers to achieve transfer to and from the conveyor 22. It is understood however, that providing a fixed valley (e.g., a floor) below the rollers allows the system to also be more effective with shuttle units 14 and 14' with heavy loads due to the load sharing.

Figure 52:
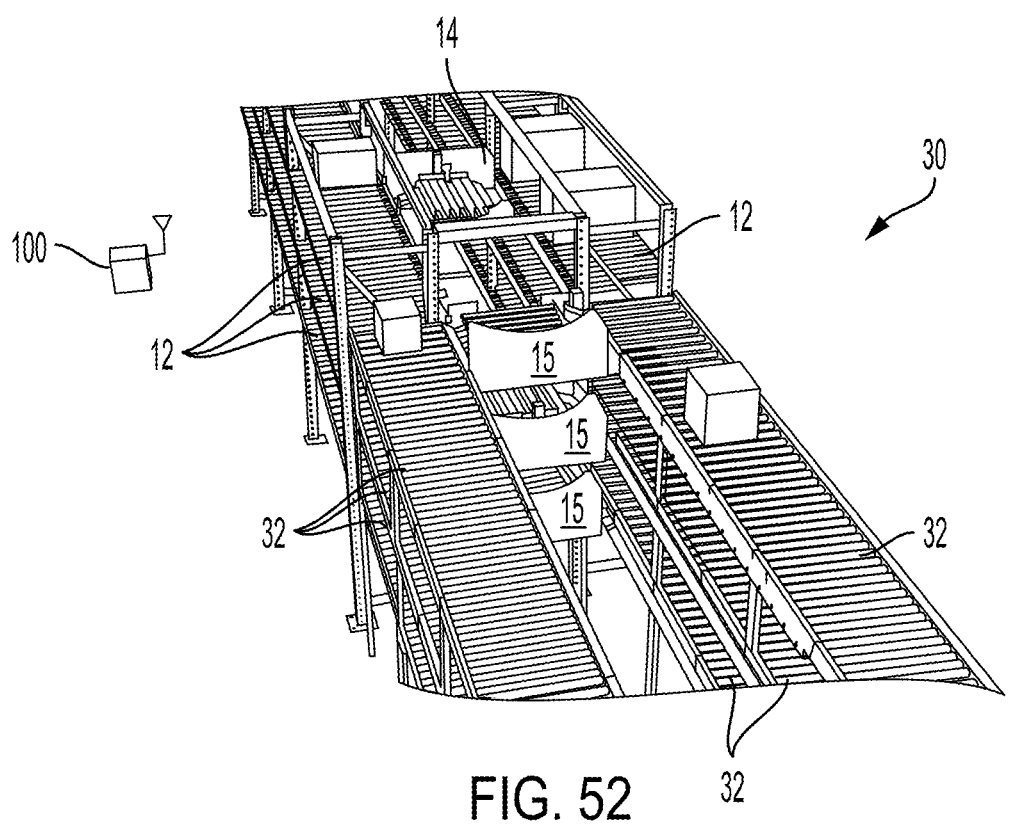
FIG. 52 shows an illustrative diagrammatic view of an object processing system in accordance with another aspect of the present invention that includes a plurality of processing conveyors to make available objects to any of a plurality of fee mobile shuttle units in place of the elevation system at the shelving system.

FIG. 52 shows a system 30 in which a mobile shuttle unit 14 is able to receive and provide objects to and from the shelves via processing end that includes a plurality of processing conveyors 32 that are each in-line with the shelves 12 and include mobile unit 15. Each mobile unit 15 is the same as the mobile shuttle units 14 except that they units 15 remain at the exchange area simply moving objects between the units 14, 15. One side of the conveyors 32 (e.g., the left side of the drawing) may be biased (e.g., gravity biased) to urge objects thereon toward the shelving 12, while the other side (e.g., the right side of the drawing) may be biased (e.g., gravity biased) to urge objects thereon away from shelving 12. Again, the processing conveyors 32 include rollers that are sized to permit the tines of the mobile shuttle units 15 to fit below a top surface of such that objects may be moved onto and from the processing conveyors by the mobile shuttle unit as discussed above with reference to FIGS. 50 and 51, but without requiring the mobile shuttle units to rotate the payload.

Objects, for example, may be received along any of each processing conveyor 22 that runs in a cross-direction with respect to the shelving 12, or may run in a direction generally parallel with the shelving 12 as shown in FIG. 52, wherein they may be provided from storage along each pair of processing conveyors 32 at each level. In accordance with further aspects, conveyor elevators may be used just outside the drop off area to gather the various levels to single entrance/exit discharges.

Those skilled in the art will appreciate that numerous modifications and variations may be made to the above disclosed embodiments without departing from the spirit and scope of the present invention.

What is claimed is:

1. An object processing system including at least one automated mobile shuttle comprising:
 a mobile chassis unit for moving the at least one automated mobile shuttle in a first direction;
 a payload for supporting at least one object thereon, said payload including a plurality of tines; and
 a payload translation system for translating the payload toward a receiving surface in at least a second direction that is orthogonal with respect to the first direction, said payload translation system providing that the plurality of tines are adapted to engage recessed areas within the receiving surface.

2. The object processing system as claimed in claim 1, wherein the receiving surface includes a corrugated surface including crests and valleys, and the recessed areas for engaging the tines are provided by the valleys of the corrugated surface.

3. The object processing system as claimed in claim 2, wherein each tine includes a lead roller for contacting a valley of the receiving surface.

4. The object processing system as claimed in claim 1, wherein the payload includes a payload surface including at least a first payload surface portion and a second payload surface portion, wherein the second payload surface portion is independently elevationally movable with respect to the first payload surface portion.

5. The object processing system as claimed in claim 1, wherein the object processing system further includes a payload elevation system for raising and lowering the tines with respect to the mobile chassis unit.

6. The object processing system as claimed in claim 5, wherein the payload elevation system includes a cam driven elevation system for lifting at least one end of the first payload surface portion.

7. The object processing system as claimed in claim 1, wherein the object processing system further includes a payload rotation system for rotating the payload with respect to the mobile chassis unit.

8. The object processing system as claimed in claim 1, wherein the plurality of tines are coupled at one end to a cantilevered elevation system.

9. The object processing system as claimed in claim 1, wherein the payload translation system includes a bi-directional roller system for extending the payload in each of two opposing directions beyond the mobile chassis unit.

10. The object processing system as claimed in claim 9, wherein the bi-directional roller system includes a slidable drive roller.

11. The object processing system as claimed in claim 1, wherein the object processing system includes a plurality of storage shelves and a plurality of automated mobile shuttles that move among the plurality of storage shelves.

12. An object processing system including at least one automated mobile shuttle comprising:
 a mobile chassis unit for moving the automated mobile shuttle in at least one direction;
 a payload for supporting at least one object on a payload surface, said payload surface including a first payload surface portion and a second payload surface portion; and
 a segmented payload elevation system for independently raising and lowering either the first payload surface portion or the second payload surface portion along a third direction that is orthogonal with respect to the at least one direction.

13. The object processing system as claimed in claim 12, wherein the object processing system further includes a payload translation system for translating the payload in at least a second direction that is orthogonal with respect to the first axis.

14. The object processing system as claimed in claim 12, wherein the object processing system further includes a payload rotation system for rotating the payload about a first axis that is orthogonal with respect to the at least one direction.

15. The object processing system as claimed in claim 12, wherein the segmented payload elevation system includes a linkage elevation system for lifting the first payload surface portion at each of two opposing ends thereof.

16. The object processing system as claimed in claim 12, wherein the segmented payload elevation system includes a cantilevered elevation system for lifting the first payload surface portion at one end thereof in a cantilevered fashion.

17. The object processing system as claimed in claim 12, wherein the first payload surface includes at least one first surface tine that is sized to fit between crests of a corrugated storage shelf of the object processing system, and wherein the second payload surface includes at least one second surface tine that is sized to fit between the crests of the corrugated storage shelf of the object processing system.

18. The object processing system as claimed in claim 17, wherein the first and second payload surfaces each includes a plurality of tines that are sized to fit between the crests of the corrugated storage shelf of the object processing system.

19. The object processing system as claimed in claim 12, wherein the payload translation system includes a bi-directional roller system for extending the payload in each of two mutually opposing directions beyond the mobile chassis unit.

20. The object processing system as claimed in claim 19, wherein the bi-directional roller system includes a slidable drive roller.

21. The object processing system as claimed in claim 12, wherein the object processing system includes a plurality of storage shelves and a plurality of automated mobile shuttles that move among the plurality of storage shelves.

22. A method of handling a payload of an automated mobile shuttle, said method comprising:

providing a mobile chassis unit for moving the automated mobile shuttle in at least one horizontal direction;

supporting at least one object on a payload surface of a payload, said payload surface including at least one tine;

moving the payload in a second horizontal direction such that the at least one tine that moves between crests of a corrugated storage shelf of the object processing system; and independently raising and lowering either the first payload surface portion or the second payload surface portion along a third vertical direction.

23. The method of claim 22, wherein the method further includes rotating the payload about a first axis that is orthogonal with respect to the one horizontal direction.

24. The method of claim 22, wherein the moving the payload in the second horizontal direction includes engaging a valley of the corrugated storage shelf with a lead roller of the at least one tine to thereby distribute a load of the payload to the storage shelf.

25. The method of claim 22, wherein the independently raising and lowering either the first payload surface portion or the second payload surface portion includes rotating a cam-based elevation system for lifting the first payload surface portion at each of two opposing ends thereof.

26. The method of claim 22, wherein the independently raising and lowering either the first payload surface portion or the second payload surface portion includes lifting the first payload surface portion at one end thereof in a cantilevered fashion.

27. The method of claim 22, wherein the method further includes providing a plurality of levels of storage shelves, and at least one automated mobile carrier including a lifting system for moving the automated mobile carrier vertically along the vertical structure.

28. The method of claim 27, wherein the automated mobile carrier further includes a carrier base including at least two wheels for moving the automated mobile carrier in at least one direction that is generally orthogonal with respect to the vertical direction, a payload receiving portion for receiving at least one object thereon to be moved by the automated mobile carrier, and a support structure on the carrier base for supporting the payload receiving portion, said support structure including an engagement system for engaging the support structure of the mobile carrier with the vertical structure at least in part by moving the support structure away from the carrier base.

29. The method of claim 22, wherein the method further includes changing a position of an object on the payload surface.

30. The method of claim 29, wherein the changing the position of the object on the payload surface involves moving the object toward away from a center of the payload surface.

31. The method of claim 30, wherein the method further includes depositing more than one object at a location of the storage shelf.

\* \* \* \* \*